(12) United States Patent
Yoshida et al.

(10) Patent No.: US 7,250,996 B2
(45) Date of Patent: Jul. 31, 2007

(54) LIQUID CRYSTAL DISPLAY AND METHOD OF MANUFACTURING THE SAME

(75) Inventors: Hidefumi Yoshida, Kawasaki (JP); Yasutoshi Tasaka, Kawasaki (JP); Kunihiro Tashiro, Kawasaki (JP); Katsufumi Ohmuro, Kawasaki (JP); Tsuyoshi Kamada, Kawasaki (JP); Kazuya Ueda, Kawasaki (JP); Masakazu Shibasaki, Kawasaki (JP)

(73) Assignees: Fujitsu Limited, Kawasaki (JP); AU Optronics Corporation, Hsinchu (TW)

( * ) Notice: Subject to any disclaimer, the term of this patent is extended or adjusted under 35 U.S.C. 154(b) by 224 days.

(21) Appl. No.: 10/955,247

(22) Filed: Sep. 30, 2004

(65) Prior Publication Data
US 2005/0122452 A1 Jun. 9, 2005

(30) Foreign Application Priority Data
Dec. 9, 2003 (JP) .............................. 2003-410742

(51) Int. Cl.
*G02F 1/1335* (2006.01)
*G02F 1/1337* (2006.01)
*G02F 1/1343* (2006.01)
*G02F 1/1333* (2006.01)

(52) U.S. Cl. ...................... 349/114; 349/130; 349/146; 349/138

(58) Field of Classification Search ................ 349/114, 349/61, 138, 155, 130, 146
See application file for complete search history.

(56) References Cited

U.S. PATENT DOCUMENTS 5,703,667 A * 12/1997 Ochiai .......................... 349/65

(Continued)

FOREIGN PATENT DOCUMENTS

JP 57-155582 9/1982

(Continued)

OTHER PUBLICATIONS

Jisaki et al, "Development of Transflective LCD for High Contrast and Wide Viewing Angle by Using Homeotropic Alignment," Asia Display/IDW '01, pp. 133-136.

(Continued)

*Primary Examiner*—Mike Qi
(74) *Attorney, Agent, or Firm*—Greer, Burns & Crain, Ltd

(57) ABSTRACT

The invention relates to a transflective liquid crystal display capable of display in both of transmissive and reflective modes and a method of manufacturing the same and provides a transflective liquid crystal display which can achieve high display characteristics in both of the transmissive and reflective modes. A configuration is employed which includes a liquid crystal display panel having a pair of substrates and a liquid crystal layer sealed between the substrates, a pixel region including a reflective area having a reflector for reflecting light entering from the side of one of the pair of substrates and a transmissive area for transmitting light entering from the side of the other of the pair of substrates toward the one of the pair of substrates, a backlight unit having a reflector and a light guide plate for reflecting the light which has entered the transmissive area from the side of the one of the pair of substrates and which has been transmitted by the area to cause the light to enter the transmissive area again from the side of the other of the pair of substrates, and a color filter layer formed only in the transmissive area of the pixel region.

17 Claims, 41 Drawing Sheets

U.S. PATENT DOCUMENTS

| | | | |
|---|---|---|---|
| 6,476,889 B2 | 11/2002 | Urabe et al. | 349/106 |
| 6,614,496 B1 * | 9/2003 | Song et al. | 349/114 |
| 6,765,639 B2 * | 7/2004 | Maeda | 349/115 |
| 6,850,298 B2 * | 2/2005 | Fujimori et al. | 349/114 |
| 6,900,852 B2 * | 5/2005 | Okada et al. | 349/39 |
| 6,900,863 B2 * | 5/2005 | Okamoto et al. | 349/114 |
| 6,924,859 B2 * | 8/2005 | Ishii et al. | 349/114 |
| 2001/0004276 A1 | 6/2001 | Urabe et al. | 349/106 |
| 2002/0113927 A1 | 8/2002 | Ha et al. | |
| 2002/0159010 A1 | 10/2002 | Maeda et al. | |
| 2003/0063244 A1 | 4/2003 | Fujimori et al. | 349/113 |
| 2003/0122998 A1 | 7/2003 | Iijima et al. | |
| 2003/0128319 A1 | 7/2003 | Maeda | |
| 2003/0142255 A1 | 7/2003 | Ishii et al. | 349/113 |
| 2006/0103794 A1 | 5/2006 | Iijima et al. | |

FOREIGN PATENT DOCUMENTS

| | | |
|---|---|---|
| JP | H11-183892 | 7/1999 |
| JP | H11-242226 | 9/1999 |
| JP | 2000-047215 | 2/2000 |
| JP | 2000-111902 | 4/2000 |
| JP | H11-281972 | 10/2000 |
| JP | 2001-166289 | 6/2001 |
| JP | 2001-242452 | 9/2001 |
| JP | 2002-341366 | 11/2002 |
| JP | 2002-350853 | 12/2002 |
| JP | 2003-043239 | 2/2003 |
| JP | 2003-095392 | 4/2003 |
| KR | 2002-0083947 | 11/2002 |
| KR | 2003-0048362 | 6/2003 |
| KR | 2003-0068323 | 8/2003 |

OTHER PUBLICATIONS

Uchida et al., "A Bright Reflective LCD Using Optically Compensated Bend Cell with Gray-Scale Capability and Fast Response," SID 96 Digest, pp. 618-621.

* cited by examiner

LIQUID CRYSTAL DISPLAY AND METHOD OF MANUFACTURING THE SAME

BACKGROUND OF THE INVENTION

1. Field of the Invention

The present invention relates to a liquid crystal display and a method of manufacturing the same and, more particularly, to a transflective liquid crystal display capable of display in both of transmissive and reflective modes and a method of manufacturing the same.

2. Description of the Related Art

Recently, active matrix liquid crystal displays having a thin film transistor (TFT) at each of pixels are widely used as displays in every field of application. Under such a circumstance, transflective liquid crystal displays capable of display in both of reflective and transmissive modes have been put in use as displays for mobile terminals or notebook type personal computers.

FIGS. 47A and 47B show a configuration of a transflective liquid crystal display according to the related art disclosed in Non-Patent Document 1. FIG. 47A shows a configuration of a pixel of the transflective liquid crystal display, and FIG. 47B shows a sectional configuration of the transflective liquid crystal display taken along the line X-X in FIG. 47A. As shown in FIGS. 47A and 47B, the pixel region is divided into a transmissive area T and a reflective area R. In the reflective area R on a TFT substrate 102, an insulator (resin layer) 130 is formed such that the reflective area R has a cell thickness that is one-half of a cell thickness of the transmissive area T. A reflective electrode 116 having an irregular surface is formed on the insulator 130. In the middle of the transmissive area T on an opposite substrate 104, a protrusion 132 for regulating the alignment of a vertical alignment type liquid crystal 106 is formed. A pair of ¼ wave plates 120 are provided on respective sides of the TFT substrate 102 and the opposite substrate 104 that constitute the exterior of the panel. A pair of polarizers 122 is provided outside the ¼ wave plates 120, respectively. A step for forming and patterning the insulators 130 is required for this transflective liquid crystal display to make the cell thickness of the reflective areas R smaller than the cell thickness of the transmissive areas T. This results in a problem in that the manufacturing cost of the liquid crystal display is increased because of increased complicatedness of manufacturing steps.

As a solution to this problem, a transflective liquid crystal display having a configuration as shown in FIG. 48 was proposed in a Japanese Patent Application (numbered 2003-95329) made by the applicant. As shown in FIG. 48, a plurality of gate bus lines 150 extending in the horizontal direction in the figure are formed substantially in parallel with each other on a TFT substrate of a liquid crystal display. A plurality of drain bus lines 152 extending in the vertical direction in the figure are formed substantially in parallel with each other such that they intersect the gate bus lines 150, an insulation film, which is not shown, being interposed between them. A TFT 154 is formed in the vicinity of each of intersections between the gate bus lines 150 and the drain bus lines 152. Regions surrounded by the gate bus lines 150 and the drain bus lines 152 constitute pixel regions. Storage capacitor bus lines 156 substantially in parallel with the gate bus lines 150 are formed such that they extend across the pixel regions substantially in the middle thereof. A storage capacitor electrode 158 is formed on the storage capacitor bus line 156 at each pixel region.

A pixel electrode constituted by a transparent conductive film is formed at a pixel region. A pixel electrode has a rectangular circumference, and it has a plurality of electrode units 162 smaller than the pixel region, electrode blank sections (slits) 164 formed between adjoining electrode units 162, and connecting electrodes 166 for electrically connecting electrode units 162 separated by the slits 164 with each other. A plurality of spaces 168 are formed at the periphery of the electrode units 162, the spaces being cutouts on respective side edges which extend substantially in parallel with the gate bus lines 150 or drain bus lines 152. A black matrix (BM) 170 for shielding a region outside the pixel region from light is formed on the opposite substrate.

In this configuration, the storage capacitor electrode 158 is used as a reflector, and circular reflectors 172 are separately formed in the pixel region. The reflectors 172 are formed of the same material as that of a gate electrode or source and drain electrodes of the TFT 154 and are provided such that they substantially overlap the centers of the electrode units 162 when viewed in a direction perpendicular to a substrate surface. The reflectors 172 are in an electrically floating state.

In this configuration, the cell thickness of a reflective area is the same as the cell thickness of a transmissive area. Therefore, the birefringence of the reflective area is twice that of the transmissive area because light passes through the same liquid crystal layer twice to enter and exit the cell. A problem therefore arises in that yellow is displayed in the reflective area while white is displayed in the transmissive area when the same voltage is applied to the transmissive area and the reflective area. A measure taken to suppress birefringence is to decrease the tilt of liquid crystal molecules during display in the reflective mode by decreasing the applied voltage.

Although the configuration shown in FIG. 48 allows manufacturing steps simpler than those for the configuration shown in FIGS. 47A and 47B, it requires an applied voltage to be adjusted for display in the transmissive mode and for display in the reflective mode. Another problem arises in that when intense external light enters during display in the transmissive mode, the color of light reflected by a reflective area can be greatly different from the color of light transmitted by a transmissive area.

The followings are the description of related arts,

Patent Document 1: Japanese Patent Laid-Open No. JP-A-H11-183892

Patent Document 2: Japanese Patent Laid-Open No. JP-A-2002-341366

Patent Document 3: Japanese Patent Laid-Open No. JP-A-2001-166289

Patent Document 4: Japanese Patent No. 3380482

Patent Document 5: Japanese Patent Laid-Open No. JP-A-S57-155582

Patent Document 6: Japanese Patent Laid-Open No. JP-A-2001-242452

Patent Document 7: Japanese Patent Laid-Open No. JP-A-2002-350853

Patent Document 8: Japanese Patent Laid-Open No. JP-A-2000-47215

Patent Document 9: Japanese Patent Laid-Open No. JP-A-2000-111902

Patent Document 10: Japanese Patent Laid-Open No. JP-A-H11-242226

Patent Document 11: Japanese Patent Laid-Open No. JP-A-H11-281972

Non-Patent Document 1: Asia Display/IDW' 01, p. 133 (2001)

Non-Patent Document 2: SID 96 Digest, pp. 618-621

SUMMARY OF THE INVENTION

It is an object of the invention to provide a transflective liquid crystal display which can achieve high display characteristics in both of reflective and transmissive modes and a method of manufacturing the same.

The above-described object is achieved by a liquid crystal display characterized in that it has a pair of substrates provided opposite to each other, a liquid crystal layer sealed between the pair of substrates, a pixel region including a reflective area having a reflector for reflecting light entering from the side of one of the pair of substrates and a transmissive area for transmitting light entering from the other of the pair of substrates toward the one of the pair of substrates, a reflective section for reflecting light which has entered the transmissive area from the side of the one of the pair of substrates and which has been transmitted by the transmissive area and for causing the light to enter the transmissive area again from the side of the other of the pair of substrates, and a color filter layer formed only in the transmissive area of the pixel region.

The invention makes it possible to provide a transflective liquid crystal display which can achieve high display characteristics in both of the reflective and transmissive modes.

DESCRIPTION OF THE PREFERRED EMBODIMENTS

[First Mode for Carrying Out the Invention]

Figure 1A:
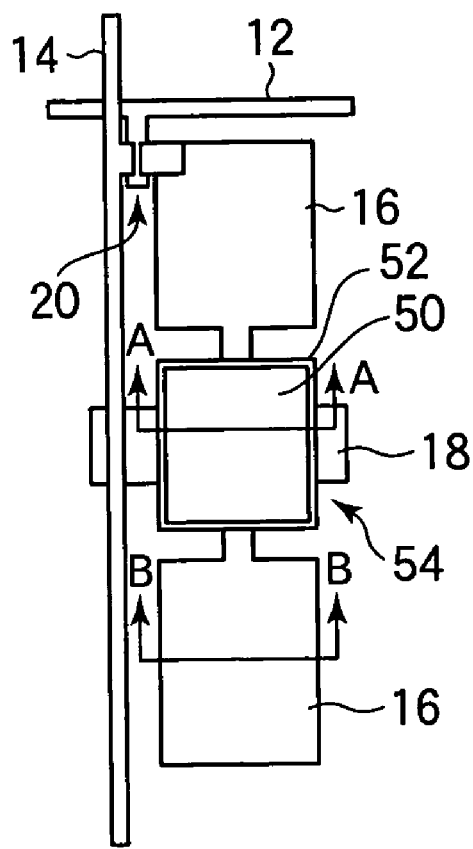
FIGS. 1A and 1B show a configuration of a liquid crystal display in a first mode for carrying out the invention.
Figure 1B:
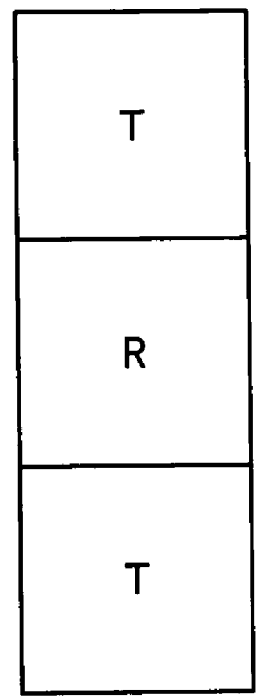
Figure 2A:
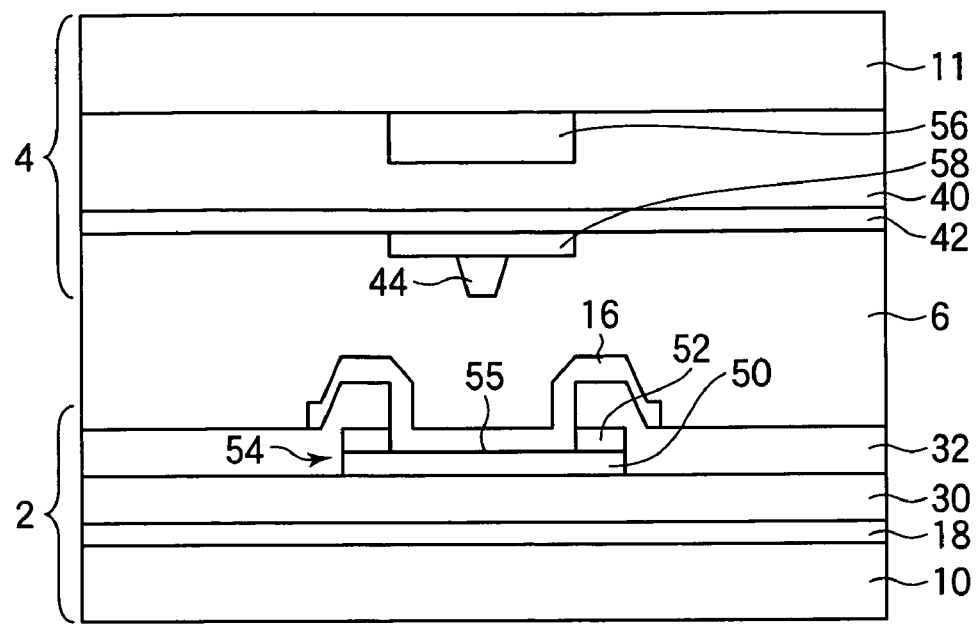
FIGS. 2A and 2B are sectional views showing the configuration of the liquid crystal display in the first mode for carrying out the invention.
Figure 2B:
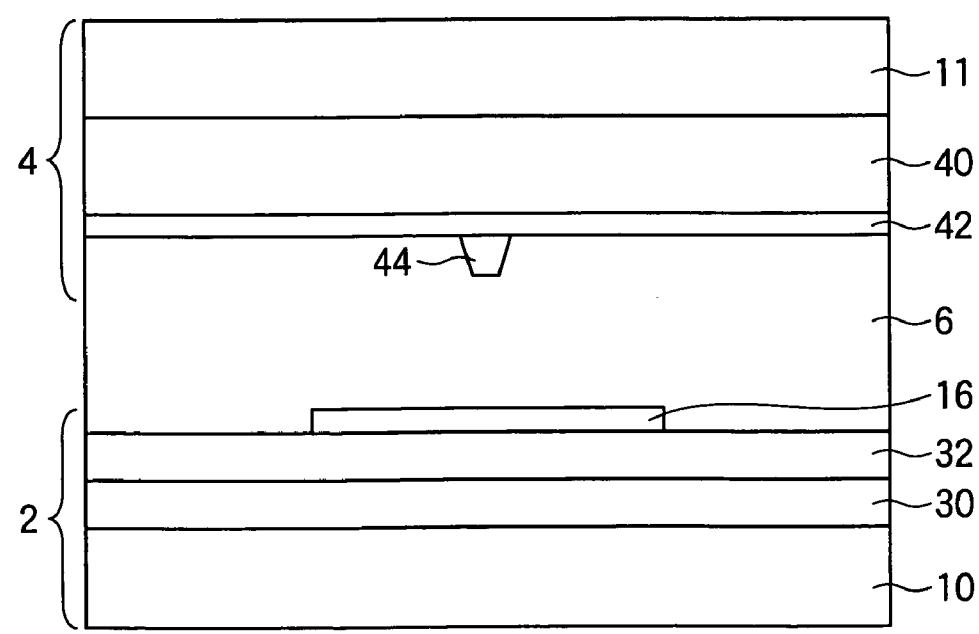

A liquid crystal display and a method of manufacturing the same in a first mode for carrying out the invention will now be described with reference to FIGS. 1A to 14. FIG. 1A shows a configuration of a pixel of a TFT substrate of the liquid crystal display in the present mode for carrying out the invention, and FIG. 1B shows a conceptual diagram of the pixel region. FIG. 2A shows a sectional configuration of the liquid crystal display taken along the line A-A in FIG. 1A, and FIG. 2B shows a sectional configuration of the liquid crystal display taken along the line B-B in FIG. 1A. As shown in FIGS. 1A to 2B, a liquid crystal 6 which is, for example, a vertical alignment type is sealed between a TFT substrate 2 and an opposite substrate 4 provided opposite to each other. The TFT substrate 2 is formed on a glass substrate 10, and it has gate bus lines 12 and storage capacitor bus lines 18 extending in the horizontal direction in FIG. 1A. For example, an insulation film 30 constituted by a silicon nitride film (SiN film) is formed throughout the substrate over the gate bus lines 12 and the storage capacitor bus lines 18. Drain bus lines 14 extending in the vertical direction in FIG. 1A are formed on the insulation film 30, the drain bus lines 14 having a multi-layer structure constituted by an aluminum (Al) layer 50 having a relatively high optical reflectivity and a molybdenum (Mo) layer 52 having a relatively low optical reflectivity. A protective film 32 is formed throughout the substrate over the drain bus lines 14.

TFTs 20 are formed in the vicinity of positions where the gate bus lines 12 and the drain bus lines 14 intersect each other. Gate electrodes of the TFTs 20 are formed of the same material as that of the gate bus lines 12. Source electrodes and drain electrodes of the TFTs are formed of the same material as that of the drain bus lines 14.

A pixel region is generally divided into three areas and, as shown in FIG. 1B, it has a reflective area R provided in a central section where a storage capacitor electrode (intermediate electrode) is formed and two transmissive areas T provided above and below the reflective area R in the figure, respectively. A reflector 54 formed of the same material as that of the drain bus lines 14 is formed on the protective film 32 in the reflective area R. A pixel electrode 16 constituted by a transparent conductive film such as an ITO is formed on the protective film 32 in the reflective area R and the transmissive areas T. A pixel electrode 16 of the reflective area R and the transmissive areas T in one pixel are electrically connected to each other. Exactly speaking, an area in which a reflector 54 is formed constitutes a reflective area R.

The pixel electrode 16 is electrically connected to the reflector 54 through an opening provided by removing the protective film 32 on the reflector 54 through etching. In addition, the Mo layer 52 of the reflector 54 is removed through etching along with the protective film 32. Therefore, the reflector 54 has a reflective surface 55 that is a part of the Al layer 50 having the higher optical reflectivity thus exposed. The reflector 54 also serves as one of electrodes of a storage capacitor.

The opposite substrate 4 has a transparent resin layer (transparent layer) 56 that is formed at least in a part of a reflective area R. A color filter (CF) layer 40 for each pixel is formed on the transparent resin layer 56. In the region where the transparent resin layer 56 is formed, since the thickness of the CF layer 40 is smaller than that in other regions, the absorption of light by the CF layer 40 is suppressed, and the reflective area R has an optical transmittance higher than that of the transmissive area T. A common electrode 42 constituted by a transparent conductive film such as an ITO is formed on the CF layers 40 throughout a display area of the substrate. A transparent resin layer (a transparent dielectric layer) 58 is formed on the common electrode 42 in the reflective area R to decrease an effective voltage applied to the liquid crystal 6 in the reflective area R. An alignment controlling protrusion 44 for controlling alignment of the liquid crystal 6 is formed of a resin on the transparent resin layer 58.

A method of manufacturing the TFT substrate 2 constituting the liquid crystal display in the present mode for carrying out the invention will now be described. First, a metal layer is formed on an entire surface of the glass substrate 10 and patterned to form the gate bus lines 12 and the storage capacitor bus lines 18. Next, a SiN film is formed throughout the substrate over the gate bus lines 12 and the storage capacitor bus lines 18 to provide the insulation film 30. An active semiconductor layer and a channel protection film for the TFTs 20 are formed on the insulation film 30, and the Al layer 50 and the Mo layer 52 are then formed in the order listed throughout the substrate and patterned to form source electrodes and drain electrodes of the TFTs 20, the drain bus lines 14 and the reflectors 54. Next, a protective film 32 is formed throughout the source electrodes, the drain electrodes, the drain bus lines 14 and the reflectors 54. The protective film 32 on the source electrodes of the TFTs 20 is then removed through etching to form contact holes. In the present mode for carrying out the invention, the protective film 32 on the reflectors 54 is removed through etching at the same time when the contact holes are formed. This step utilizes an etchant which dissolves SiN and Mo but does not dissolve Al. Thus, the Mo layers 52 are removed along with the protective film 32 on the reflectors 54 to expose the Al layers 50, and the reflective surfaces 50 having a high reflectivity are thus formed. Thereafter, the pixel electrodes 16 are formed in the transmissive areas T and the reflective areas R of the pixel regions. The pixel electrodes 16 are electrically connected to the source electrodes of the TFTs 20 through the contact holes.

In the present mode for carrying out the invention, reflectivity is improved by suppressing absorption of light at the CF layers 40 of the reflective areas R.

In the present mode for carrying out the invention, a voltage which is substantially applied to the liquid crystal 6 in a reflective area R is decreased by the transparent resin layer 58 formed on the common electrode 42 in the reflective area R. Thus, the voltage applied to the liquid crystal 6 varies between the respective transmissive areas T and the reflective area R. As a result, even when liquid crystal molecules in the transmissive areas T are greatly tilted, liquid crystal molecules in the reflective area R are not so much tilted. Thus, substantially equal optical effects are achieved in the transmissive areas T through which light passes once and the reflective area R through which light passes twice, and transmittance and reflectivity undergo similar changes in response to the applied voltage. Therefore, display is substantially equally performed in transmissive areas T and the reflective area R.

Further, in the present mode for carrying out the invention, the alignment controlling protrusions (banks) 44 formed on the common electrode 42 have a function of bending the direction of an electric field. Since liquid crystal molecules tend to become perpendicular to the direction of an electric field, liquid crystal molecules are thus aligned such that they are inclined toward the alignment controlling protrusions 44.

In the present mode for carrying out the invention, the reflectors 54 are formed of the same material as that of the source and drain electrodes of the TFTs 20 and the drain bus lines 14, and the reflectors have the reflective surfaces 55 which are exposed parts of the layers 50 of Al that is a metal having a high reflectivity. The reflective surfaces 55 are formed at the same time when the protective film 32 is patterned to form the contact holes. Thus, the reflectors 54 having a high reflectivity can be obtained without an additional manufacturing step. The reflectors 54 may be formed of the same material as that of the gate electrode of the TFTs 20 and the gate bus lines 12.

Furthermore, in the present mode for carrying out the invention, the pixel electrodes 16 made of an ITO are formed so as to cover the reflective surfaces 55, and the top surfaces of all the electrodes formed on the substrates 2 and 4, respectively, are constituted by an ITO. The substrates are thus electrically symmetric and are therefore less likely to cause image persistence.

Liquid crystal displays in the present mode for carrying out the invention will now be specifically described with reference to preferred embodiments of the same.

Embodiment 1-1

Figure 3:
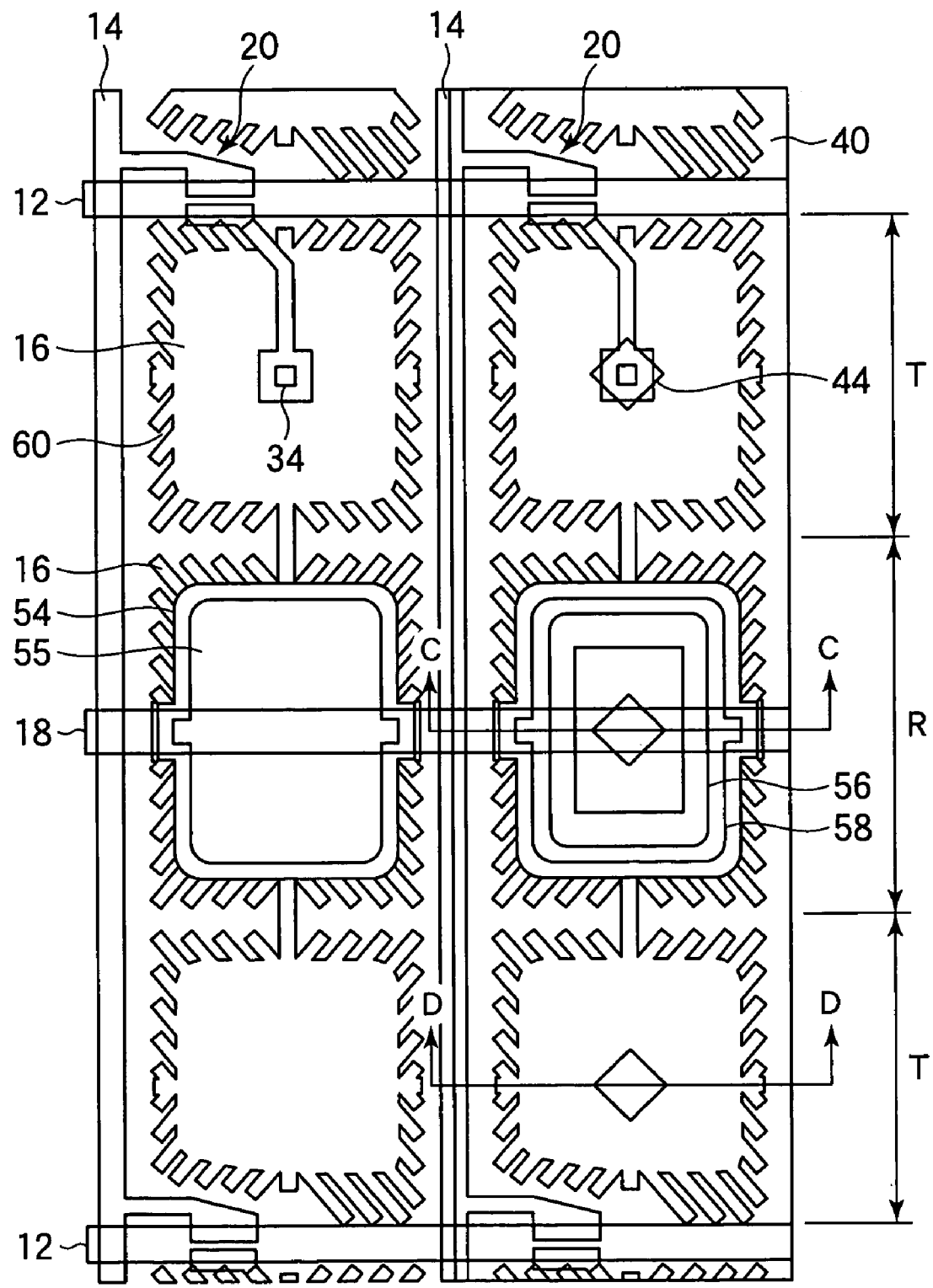
FIG. 3 shows a configuration of a liquid crystal display according to Embodiment 1-1 in the first mode for carrying out the invention.
Figure 4A:
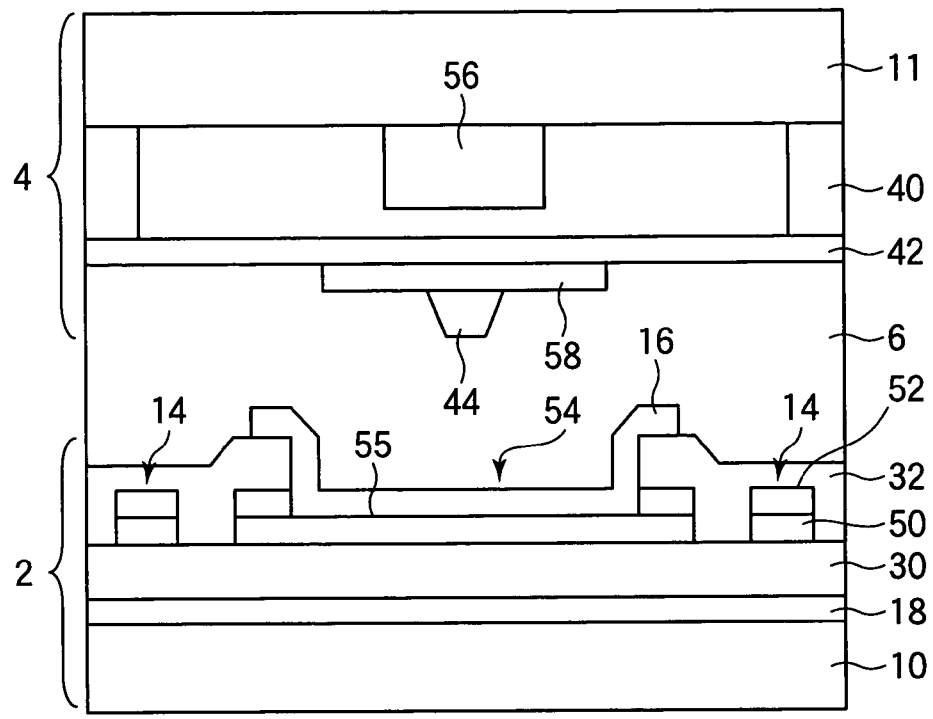
FIGS. 4A and 4B show sectional configurations of the liquid crystal display according to Embodiment 1-1 in the first mode for carrying out the invention.
Figure 4B:
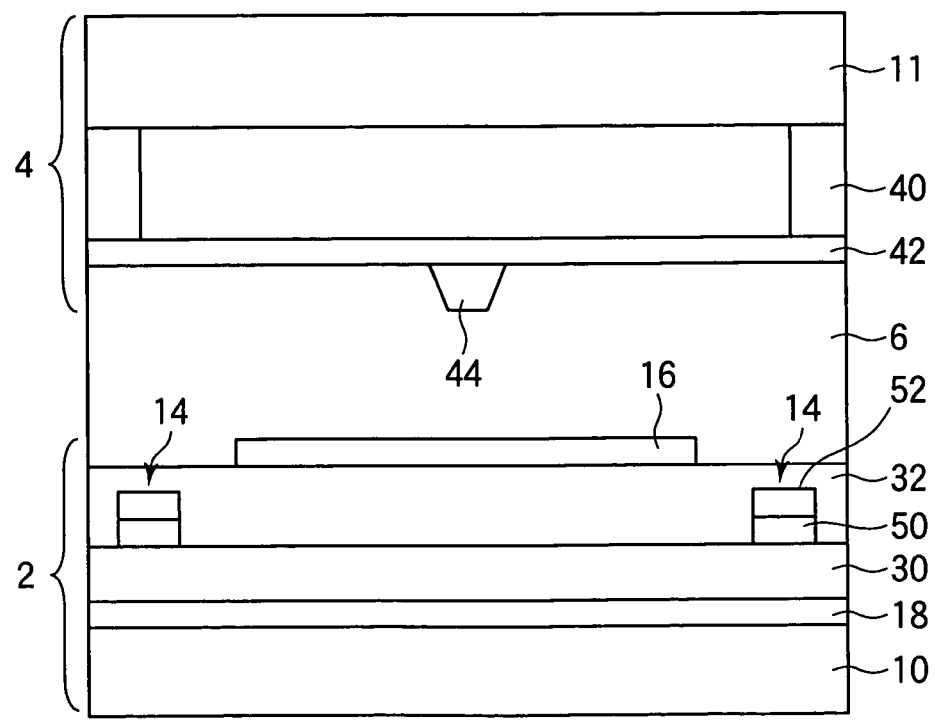

A liquid crystal display according to Embodiment 1-1 in the present mode for carrying out the invention will now be described. FIG. 3 shows a configuration of a pixel of the liquid crystal display of the present embodiment. A configuration of a TFT substrate 2 is shown on the left side of FIG. 3, and FIG. 3 shows the TFT substrate 2 and an opposite substrate 4 in an overlapping relationship with each other on the right side thereof. FIG. 4A shows a sectional configuration taken along the line C-C in FIG. 3, and FIG. 4B shows a sectional configuration taken along the line D-D in FIG. 3. As shown in FIGS. 3, 4A and 4B, one pixel region is divided into a reflective area R which is provided in the middle thereof and two transmissive areas T which are provided above and under the reflective area R respectively in FIG. 3.

In a transmissive area T, a pixel electrode 16 is formed in a substantially rectangular shape (e.g., a square shape). At the periphery of the pixel electrode 16, in order to stabilize alignment of a liquid crystal 6, a plurality of spaces 60 are formed by cutting side edges of the electrode diagonally to a gate bus line 12 and a drain bus line 14, the spaces being patterned in the form of microscopic spines. Alignment controlling protrusions 44 are formed of a photo-resist on the opposite substrate 4 in the middle of the transparent areas T, the protrusions 44 being rhombic in their plan configuration and having a height in the range from 1 to 2 μm.

In the reflective area R, a transparent resin layer 56 is formed of, for example, PC403 or PC441 (manufactured by JSR Corp.) in a part of the opposite substrate 4. A CF layer 40 is formed so as to cover the transparent resin layer 56. Reflectivity is improved in the region where the transparent resin layer 56 is formed because the CF layer 40 has a smaller thickness and therefore absorbs a smaller quantity of light. A transparent resin layer 58 is further formed on the common electrode 42 to decrease a voltage that is substantially applied to the liquid crystal layer in the reflective area R. The transparent resin layer 58 is also formed of PC403, for example. The thickness of the transparent resin layer 58 is set at an optimum thickness in the range from about 1 to 1.5 μm which will be described later. An alignment controlling protrusion 44 is formed of a photo-resist on the transparent resin layer 58 in the middle of the reflective area R, the protrusion being rhombic in its plan configuration and having a height in the range from 1 to 2 μm similarly to those in the transmissive areas T.

Figure 5:
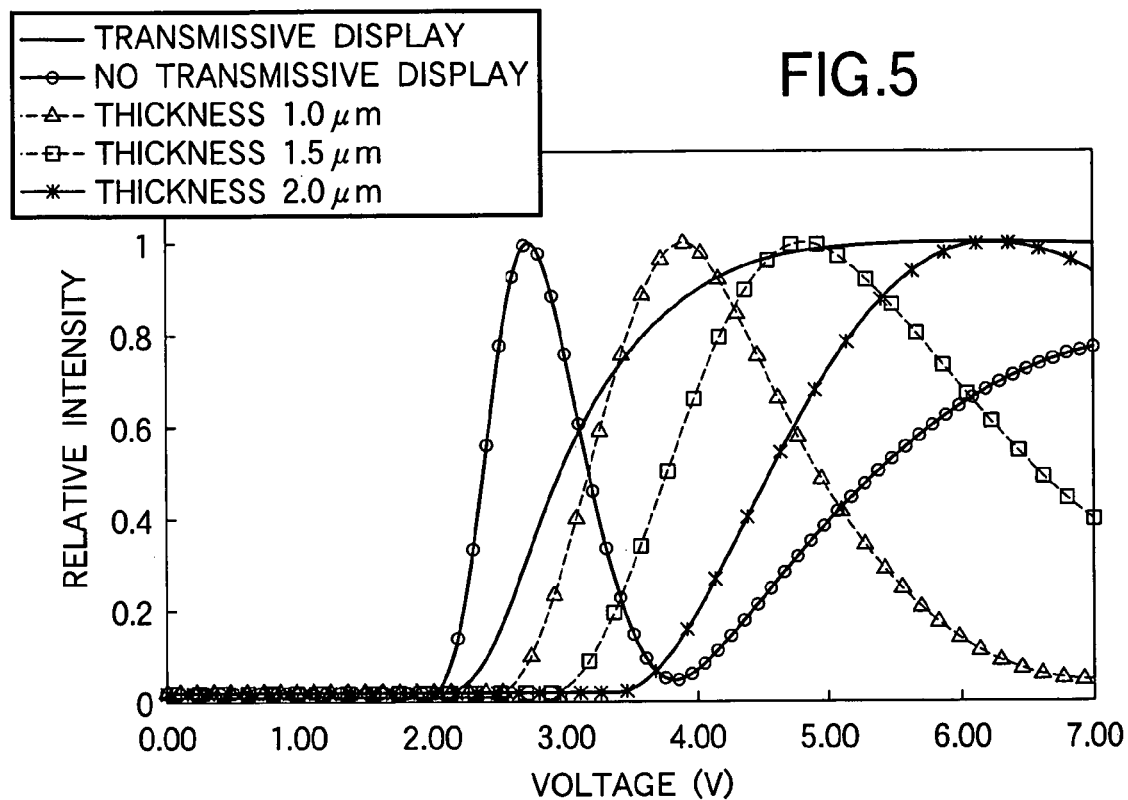
FIG. 5 is a graph showing a process of calculating an optimum thickness of a transparent resin layer.

FIG. 5 is a graph showing luminance/voltage characteristics relative to the thickness of the transparent resin layer 58. The abscissa axis of FIG. 5 represents voltages (V) applied between the electrodes 16 and 42, and the ordinate axis represents relative magnitudes of luminance of transmitted light and reflected light. As shown in FIG. 5, when the transparent resin layer 58 is not formed, luminance is reduced at a voltage which provides high luminance in the transmissive areas T. On the contrary, it will be understood that characteristics similar to those of transmissive display can be achieved when the transparent resin layer 58 is formed with a thickness in the range from 1.0 to 2.0 μm. In particular, when the transparent resin layer 58 has a thickness of 1.5 μm, luminance is maximized and characteristics closer to those of transmissive display can be achieved at an applied voltage of about 5 V.

The reflector 54 in the reflective area R is formed by stacking an Al layer 50 formed of the same material as that of source and drain electrodes of the TFT 20 and the drain bus lines 14 and a Mo layer 52 as an upper layer. The reflector 54 has a reflective surface 55 which is the AL layer 50 exposed by removing the upper Mo layer 52. After a protective film (SiN film) 32 is formed, the reflective surface 55 is formed by removing the Mo layer 52 at the same time when a step is performed to form a contact hole 34 for connecting the source electrode of the TFT 20 and the pixel electrode 16 by removing the protective film 32. This step utilizes an etchant which dissolves SiN and Mo, but does not dissolve Al. The pixel electrode 16 is simultaneously formed in the reflective area R and the transmissive area T after the reflective surface 55 is formed. The pixel electrode 16 is formed such that it covers the reflective surface 55 to prevent the Al layer 50 from contacting the liquid crystal 6.

Embodiment 1-2

Figure 6:
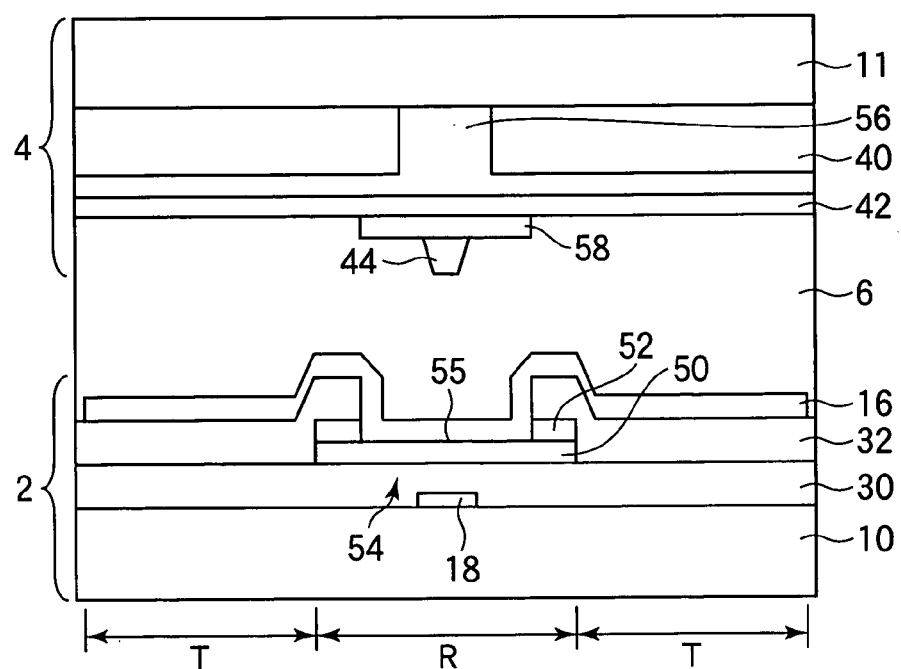
FIG. 6 shows a sectional configuration of a liquid crystal display according to Embodiment 1-2 in the first mode for carrying out the invention.

A liquid crystal display according to Embodiment 1-2 in the present mode for carrying out the invention will now be described. FIG. 6 shows a sectional configuration of a pixel of the liquid crystal display of the present embodiment. While a CF layer 40 is formed on a transparent resin layer 56 in the above described Embodiment 1-1, a transparent resin layer 56 and a CF layer 40 are formed in reverse order in the present embodiment as shown in FIG. 6. Specifically, after removing a part of a CF layer 40 (e.g., a central part of a reflective area R) entirely in the thickness direction of the layer, a transparent resin layer 56 is formed on the same. Thus, a transparent area having no CF layer 40 is formed in a part of a reflective area R to improve the reflectivity of the same. Further, a common electrode 42, a transparent resin layer 58 for decreasing an effective voltage applied to a liquid crystal 6 and an alignment controlling protrusion 44 are sequentially formed on the transparent resin layer 56. In the present embodiment, leveling is facilitated because the transparent resin layer 56 is formed on the CF layer 40.

Figure 7:
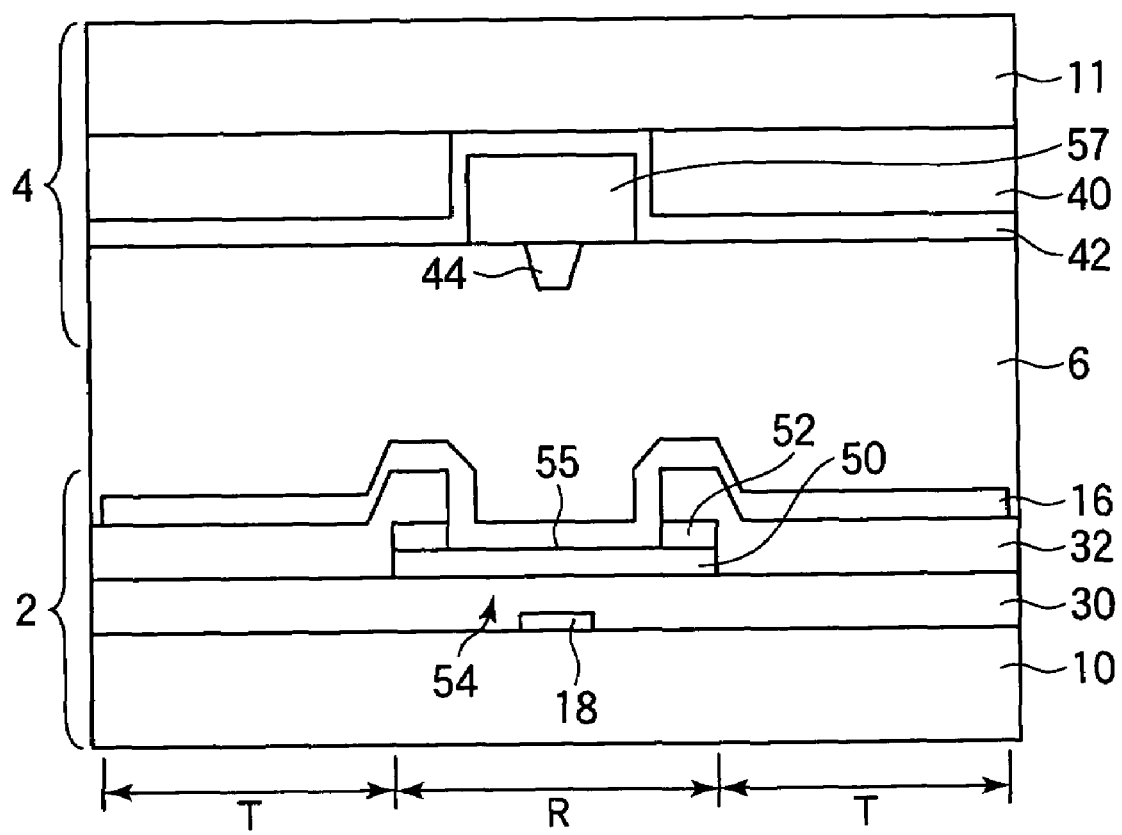
FIG. 7 shows a sectional configuration of a modification of the liquid crystal display according to Embodiment 1-2 in the first mode for carrying out the invention.

FIG. 7 shows a modification of the configuration of the liquid crystal display of the present embodiment. In the present modification, a common electrode 42 is formed after removing a part of the CF layer 40. A transparent resin layer 57 is then formed in the region on the common electrode 42 where the CF layer 40 has been removed to form an alignment controlling protrusion 44. The transparent resin layer 57 has both of the function of the transparent resin layer 56 of improving reflectivity in the reflective area R and the function of the transparent resin layer 58 of decreasing the effective voltage applied to the liquid crystal 6. As a result, a liquid crystal display having the same functions as those of the configuration shown in FIG. 6 can be manufactured with simplified processes.

Embodiment 1-3

Figure 8:
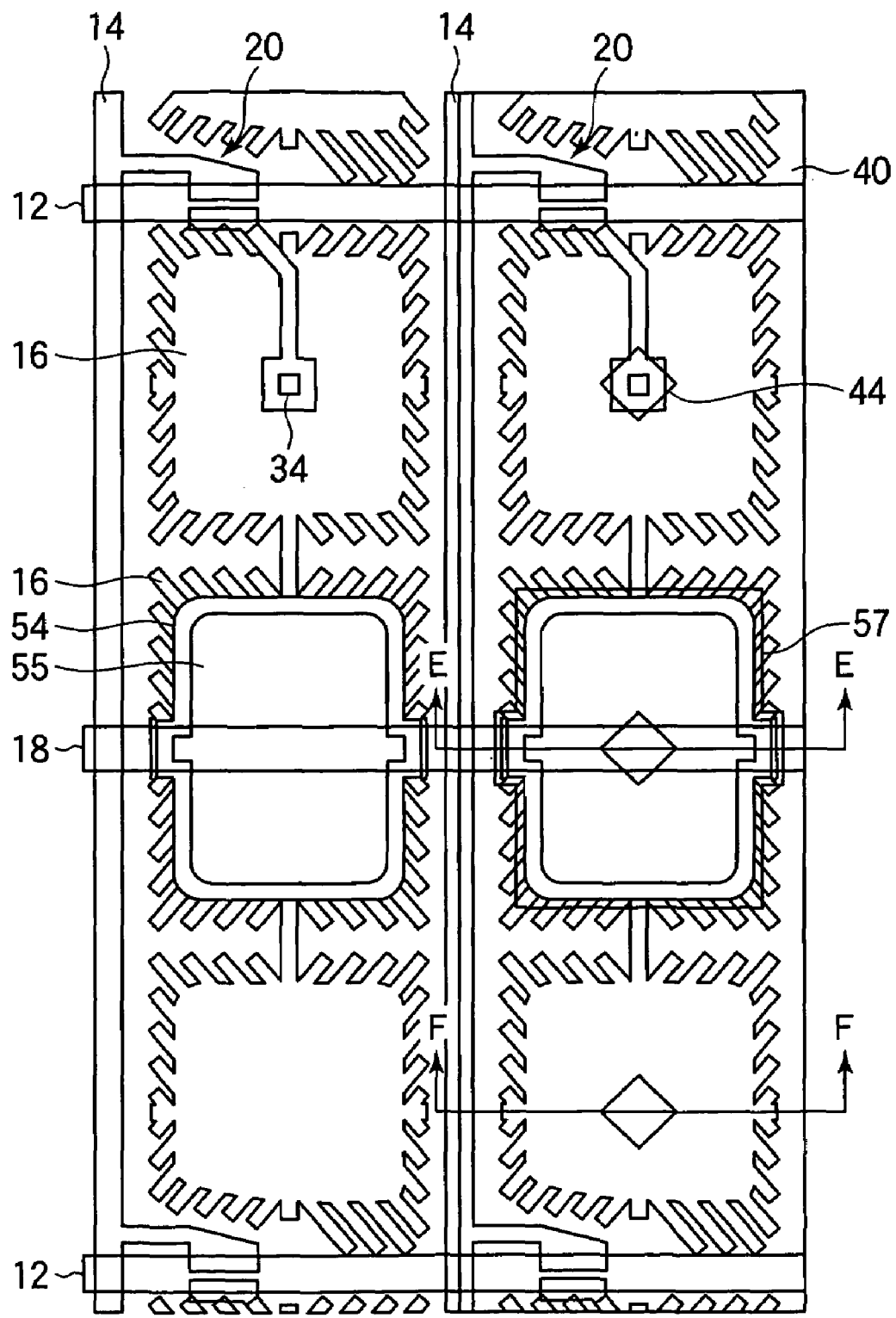
FIG. 8 shows a configuration of a liquid crystal display according to Embodiment 1-3 in the first mode for carrying out the invention.
Figure 9A:
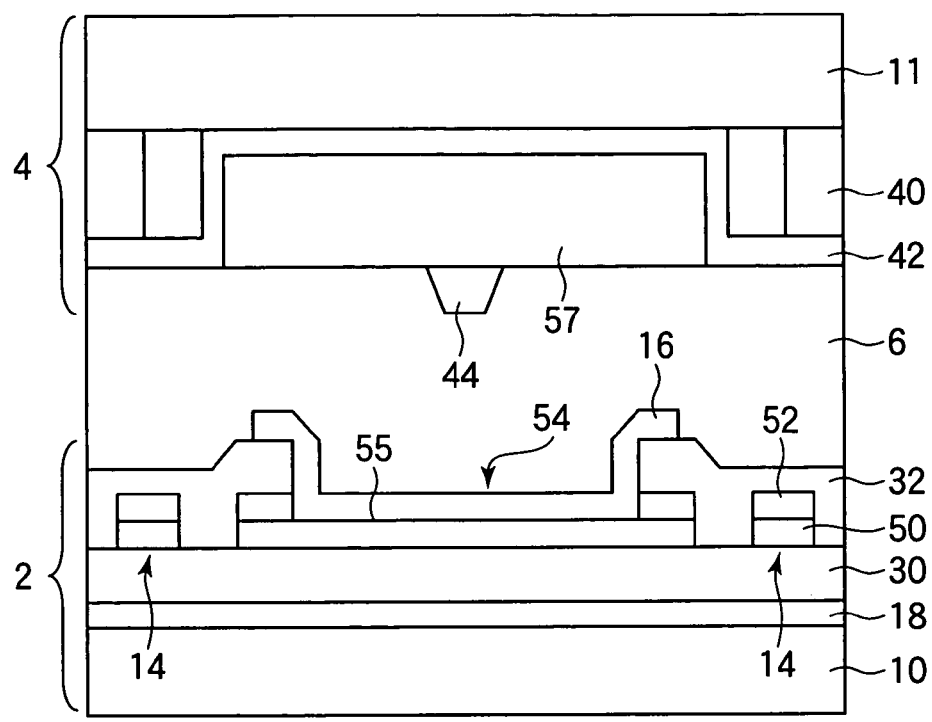
FIGS. 9A and 9B show sectional configurations of the liquid crystal display according to Embodiment 1-3 in the first mode for carrying out the invention.
Figure 9B:
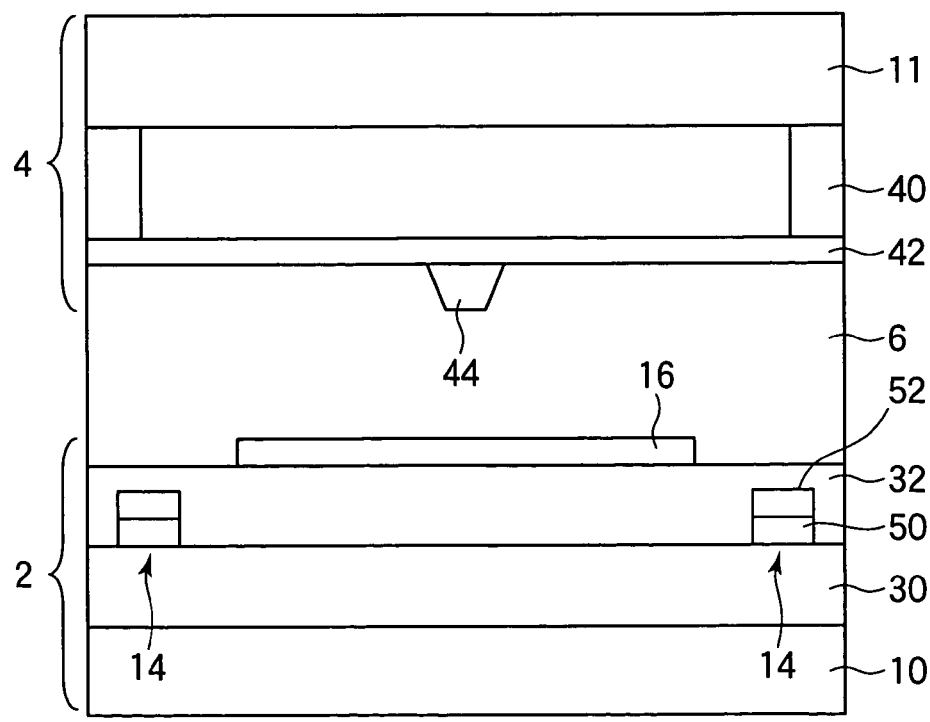

A liquid crystal display according to Embodiment 1-3 in the present mode for carrying out the invention will now be described. FIG. 8 shows a configuration of a pixel of the liquid crystal display of the present embodiment. FIG. 9A shows a sectional configuration of the liquid crystal display taken along the line E-E in FIG. 8, and FIG. 9B shows a sectional configuration of the liquid crystal display taken along the line F-F in FIG. 8. In the present embodiment, the configuration shown in FIG. 7 is elaborated, and a measure is taken to improve a region where a CF layer 40 is removed. First, a CF layer 40, from which an entire area where a reflector 54 is to be formed (a reflective area R) have been removed, is formed on a TFT substrate 2. A common electrode 42 is thereafter formed on the CF layer 40. Then, a transparent resin layer 57 is formed so as to fill the area where the CF layer 40 has been removed, and an alignment controlling protrusion 44 is formed on the transparent resin layer 57. Alternatively, an entire area where a reflective surface 55 is to be formed (which is smaller than the reflective area R as a whole) may be removed from the CF layer 40.

In the configuration of the present embodiment, since the CF layer 40 is not formed in the reflective area R, light reflected by a reflector 54 will have substantially no color. Therefore, transmissive areas T are utilized for color display in the reflective mode. External light which has entered the transmissive areas T is partially reflected from the side of a backlight. The light is colored because it passes through the CF layer 40. Color display can be achieved with high luminance in the reflective mode by using the colored reflected light which passes through the transmissive areas T and the reflected light having no color which passes through the reflective area R.

Figure 10A:
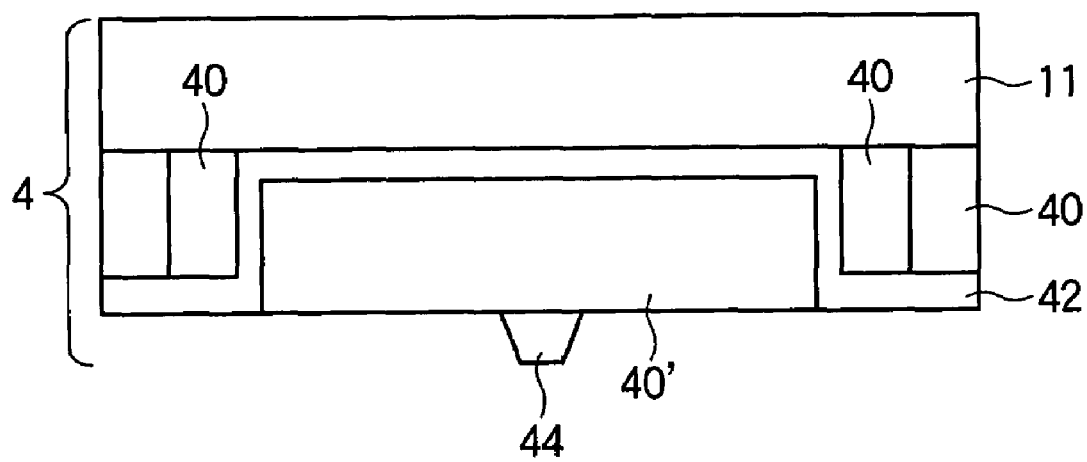
FIGS. 10A and 10B show a modification of the liquid crystal display according to Embodiment 1-3 in the first mode for carrying out the invention.

FIG. 10A shows a modification of the configuration of the present embodiment. As shown in FIG. 10A, a CF substrate 4 of this modification is provided with a CF layer 40' as a transparent dielectric layer instead of the transparent resin layer 57 shown in FIG. 9A. The hue of the CF layer 40' is the same as the hue of a CF layer 40 in the same pixel. Specifically, when the CF layer 40 was in red, the CF layer 40' was also in red; when the CF layer 40 was in green, the CF layer 40' was also in green; and when the CF layer 40 was in blue, the CF layer 40' was also in blue. Since the CF layer 40' is provided in a reflective area R, light passes through the same twice, i.e., when it enters the layer and when it exits the same. Therefore, the CF layer 40' employed had low color purity and a light tint. The transmissive areas T and the reflective area R were made to have the same tint consequently in a display state.

Figure 10B:
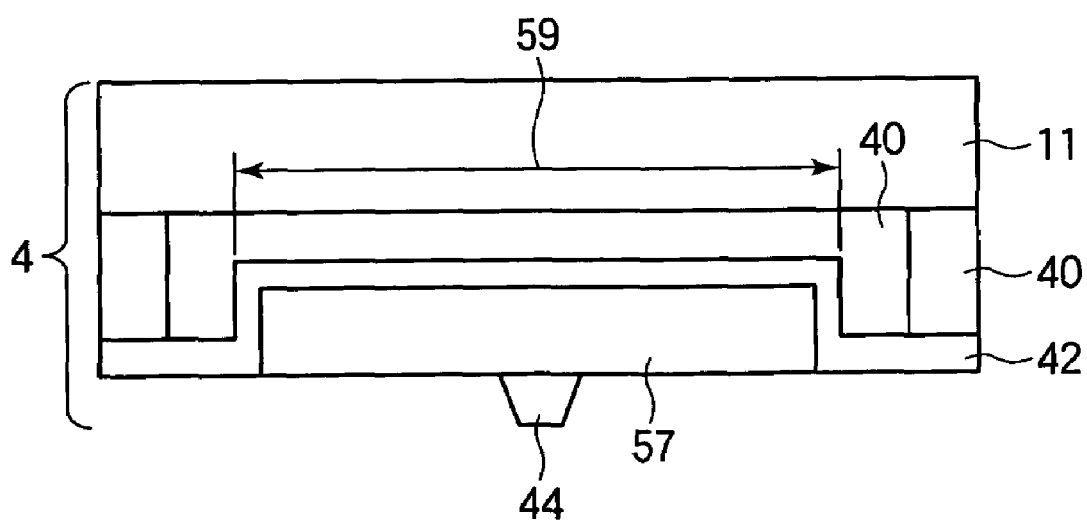

FIG. 10B shows another modification of the configuration of the present embodiment. As shown in FIG. 10B, a transparent resin layer 57 similar to the transparent resin layer shown in FIG. 9A is used in this modification, and an improvement is made on the CF layer 40. The CF layer 40 is removed halfway in the thickness direction of the layer such that the thickness of the CF layer 40 becomes small in a portion thereof associated with the transparent resin layer 57 to allow tint adjustment. Further, the thickness of the transparent resin layer 57 is adjusted to make the thickness of the liquid crystal layer substantially uniform. Since the reflective area R was formed with a region 59 where the thickness of the CF layer 40 was small, it was possible to color the reflective area R too. Referring to a method of providing the configuration shown in FIG. 10B, the CF layer 40 was formed using a negative resist, and the portion of the same associated with the region 59 was irradiated with light that was less intense than in other portions using the half exposure technique.

Embodiment 1-4

Figure 11:
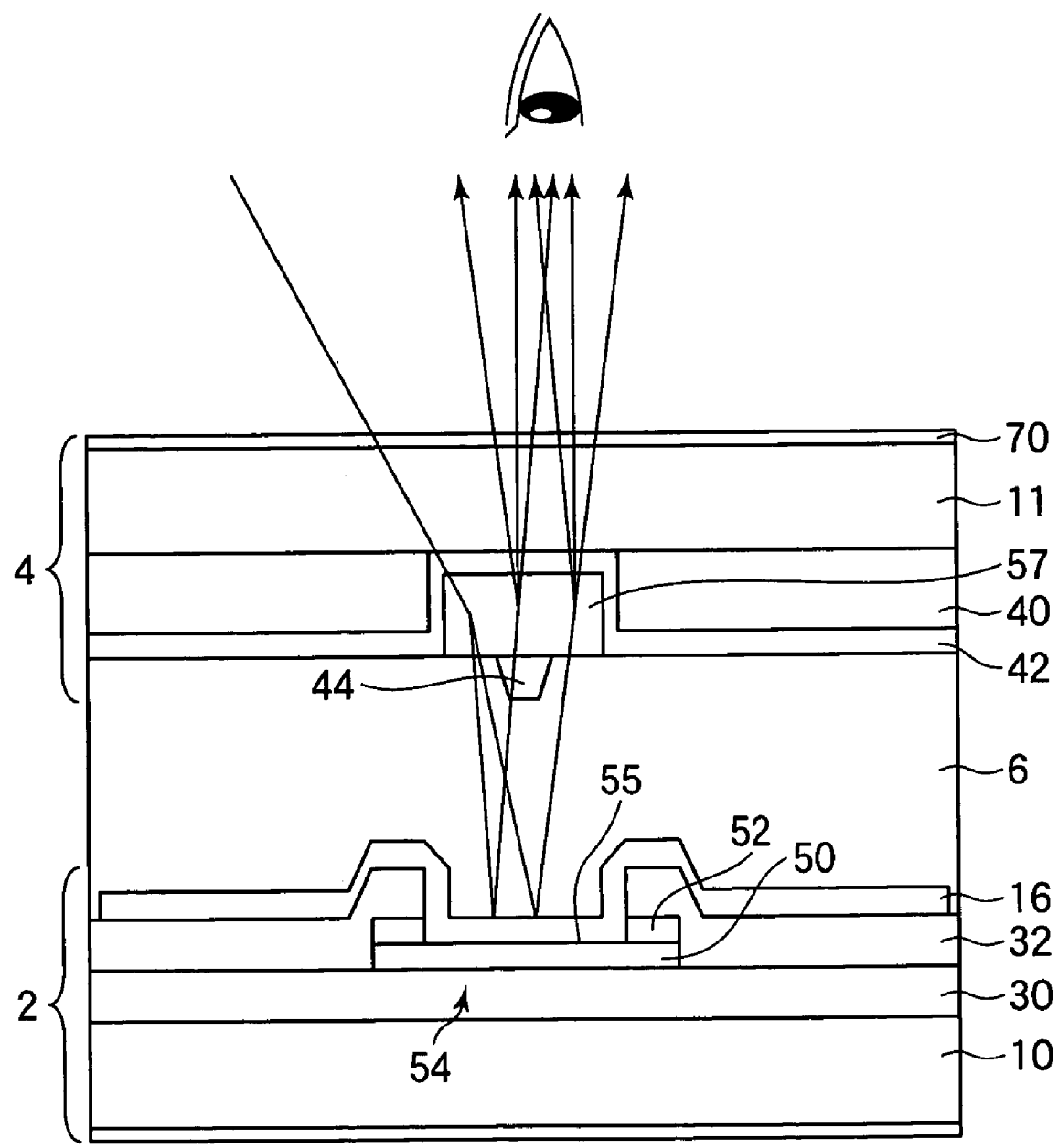
FIG. 11 shows a sectional configuration of a liquid crystal display according to Embodiment 1-4 in the first mode for carrying out the invention.

A liquid crystal display according to Embodiment 1-4 in the present mode for carrying out the invention will now be described. FIG. 11 shows a sectional configuration of the liquid crystal display of the present embodiment. As shown in FIG. 11, a transparent resin layer 57 is provided with light scattering properties in the present embodiment. The transparent resin layer 57 having light scattering properties scatters light which has entered the same in an oblique direction, and the light reaches a reflector 54 to be reflected by the same, the light being scattered again when it exits. Thus, the light which has entered in an oblique direction exits the display screen in a direction square to the same. As a result, reflective display could be performed with high luminance. Alternatively, a polarizer 70 which is applied to a viewer's side of an opposite substrate 4 may be provided with light scattering properties. Further, diffusing paste having light scattering properties may alternatively be applied to the polarizer 70.

Figure 12A:
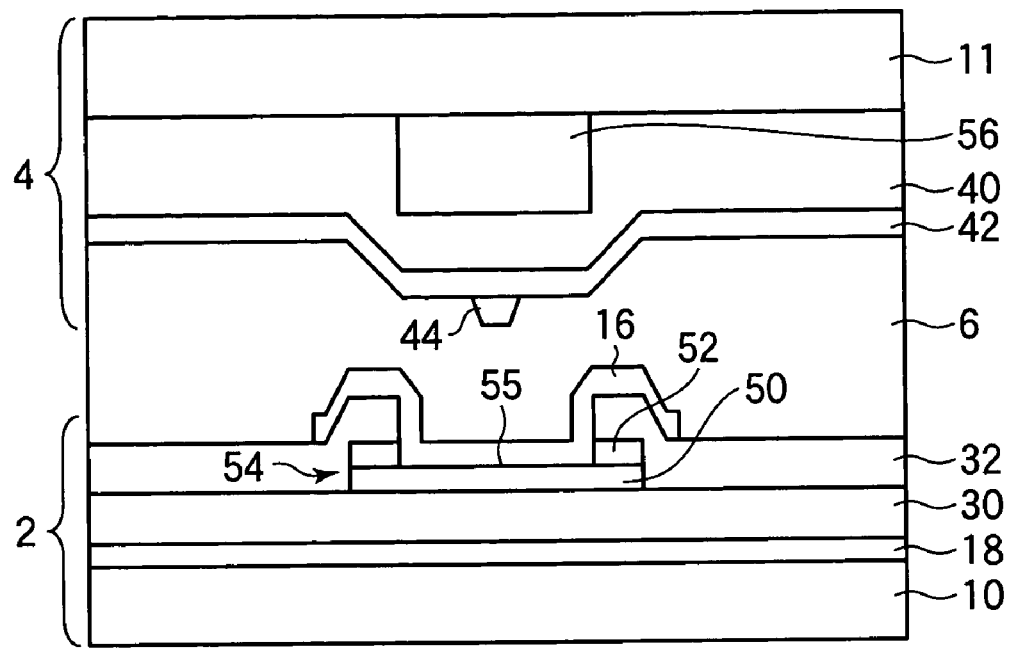
FIGS. 12A and 12B show a modification of the liquid crystal display according to Embodiment 1-4 in the first mode for carrying out the invention.
Figure 12B:
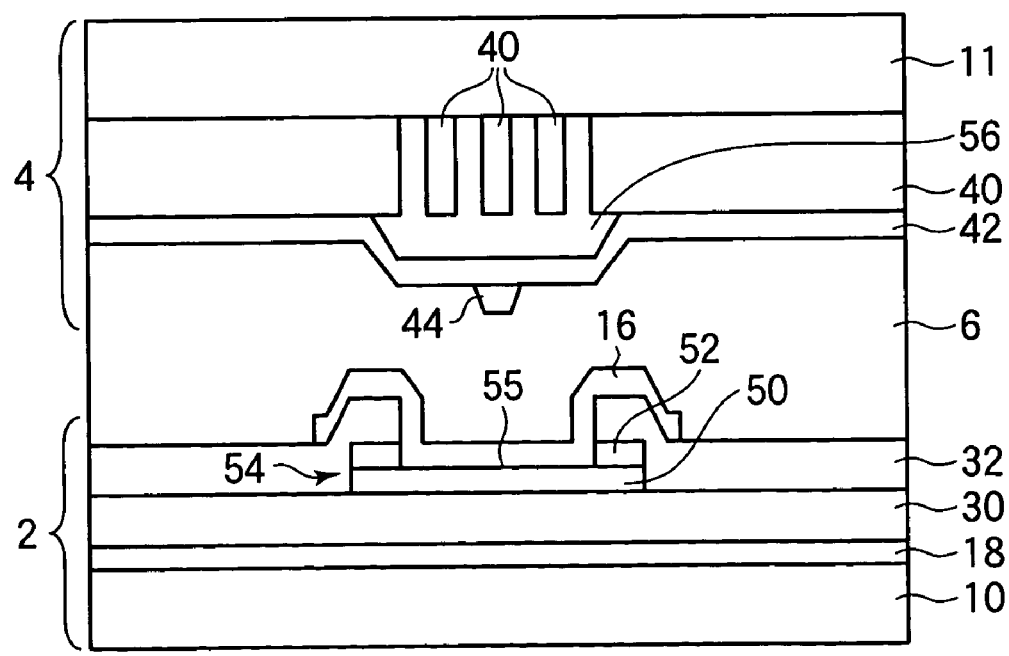

FIGS. 12A and 12B show modifications of the present embodiment. The modifications have a configuration in which a CF layer 40 remains in a reflective area R and in which a cell thickness of a liquid crystal layer 6 becomes small in the reflective area R.

In the example shown in FIG. 12A, a transparent resin layer 56 was first formed in a part of or throughout a reflective area R, and a CF layer 40 was formed on the same. The thickness of the CF layer 40 on the transparent resin layer 56 is equal to or smaller than the thickness of the CF layer 40 in other areas. A common electrode 42 constituted by an ITO was formed on the top surface of the area. As a result, a configuration is provided in which the cell thickness in the reflective area R is equal to or smaller than the cell thickness in transmissive area T and in which the transmittance of the CF layer 40 in the reflective area R is higher than the transmittance of the CF layer 40 in the transmissive area T.

In the example shown in FIG. 12B, a CF layer 40 was first formed, and the layer was then patterned to remove its part located in a reflective area R partially or entirely. Thereafter, a transparent resin layer 56 was formed in a part of or throughout the reflective area R. That is, the transparent resin layer 56 is formed on the CF layer 40 and in a part of the CF layer 40 (and on the same part). The thickness of the transparent resin layer 56 was adjusted such that the cell thickness in the area where the transparent resin layer 56 was formed would be equal to or smaller than the cell thickness in a transmissive area T. As a result, a configuration is provided in which the cell thickness in the reflective area R is equal to or smaller than the cell thickness in transmissive area T and in which the transmittance of the CF layer 40 in the reflective area R is higher than the transmittance of the CF layer 40 in the transmissive area T.

Embodiment 1-5

Figure 13:
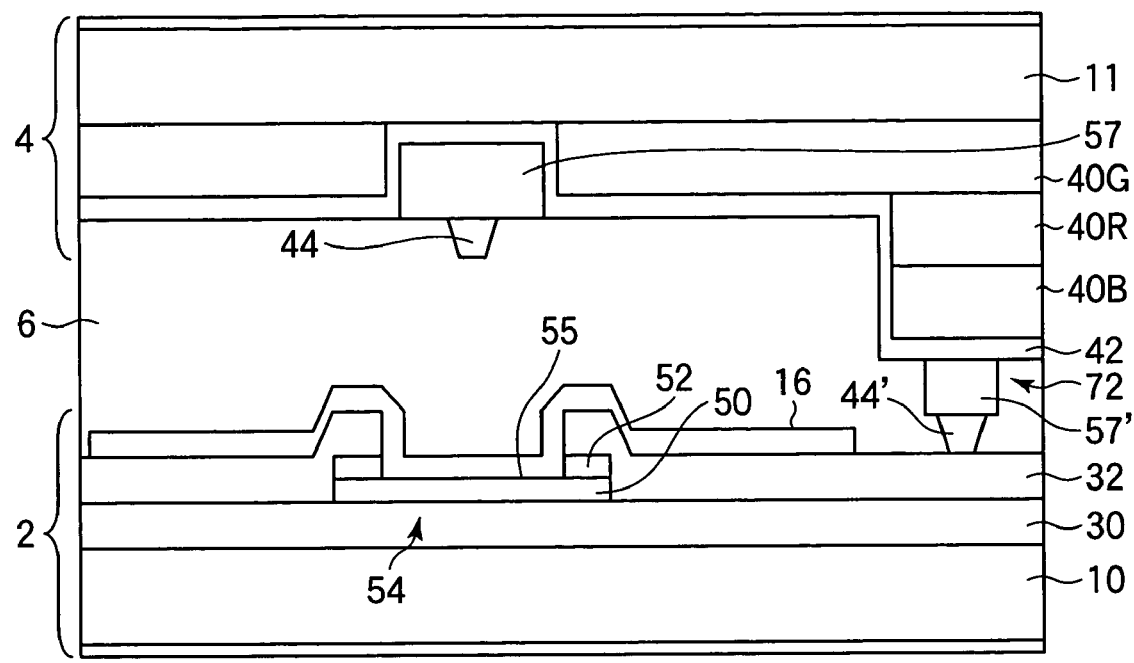
FIG. 13 shows a sectional configuration of a liquid crystal display according to Embodiment 1-5 in the first mode for carrying out the invention.

A liquid crystal display according to Embodiment 1-5 in the present mode for carrying out the invention will now be described. FIG. 13 shows a sectional configuration of the liquid crystal display of the present embodiment. As shown in FIG. 13, in the present embodiment, a columnar spacer 72 is formed by stacking CF layers 40G, 40R and 40B in three colors, a common electrode 42, a resin layer 57' formed of the same material as that of a transparent resin layer 57 and a resin layer 44' formed of the same material as that of an alignment controlling protrusion 44 in the order listed. Since the resin layers 57' and 44' are formed on the common electrode 42, it is possible to prevent shorting between the common electrode 42 and a pixel electrode 16 provided on a TFT substrate 2.

Embodiment 1-6

Figure 14:
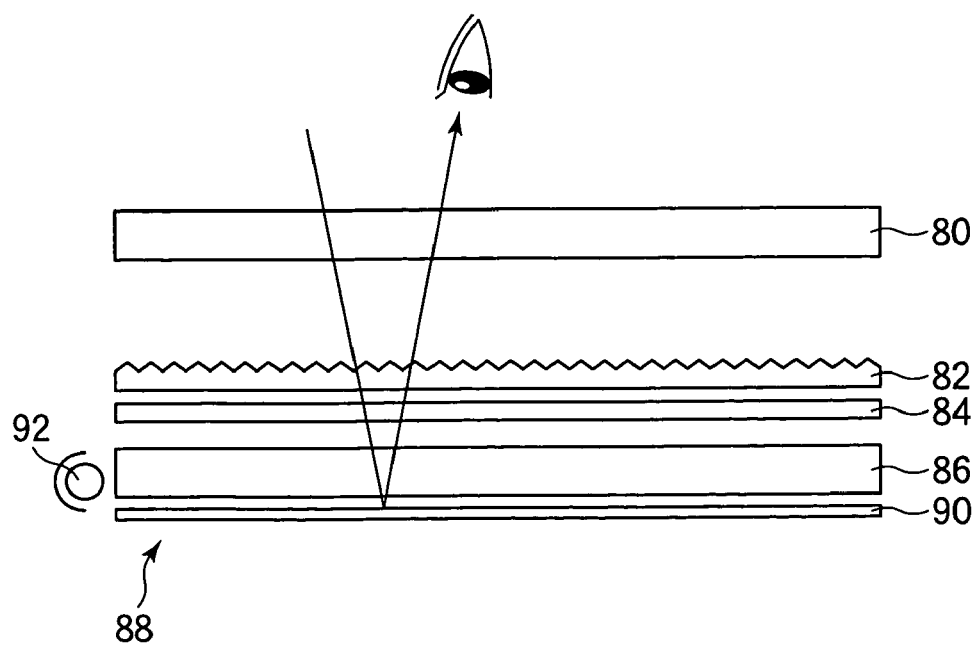
FIG. 14 shows a configuration of a liquid crystal display according to Embodiment 1-6 in the first mode for carrying out the invention.

A liquid crystal display according to Embodiment 1-6 in the present mode for carrying out the invention will now be described. FIG. 14 schematically shows a configuration of the liquid crystal display of the present embodiment. As shown in FIG. 14, a prism sheet 82, a diffusing sheet 84 and a backlight unit 88 are provided behind a liquid crystal display panel 80, the elements being listed in the order of their closeness to the panel. The backlight unit 88 has a fluorescent tube 92, a light guide plate 86 provided behind the diffusing sheet 84 for guiding light from the fluorescent tube 92 and a reflector (reflective section) 90 provided behind the light guide plate 86 and having a high optical reflectivity. The reflector 90 reflects external light which has passed through transmissive areas T of the liquid crystal display panel 80 toward a viewer. Thus, even in a configuration in which no CF layer 40 is formed in reflective areas R, color display can be performed in the reflective mode by utilizing colored reflected light which has passed through the transmissive areas T formed with CF layers 40. In particular, high reflection characteristics can be achieved by using a so-called reflector which has a silvered surface (silver reflector) as the reflector 90.

As described above, the present mode for carrying out the invention makes it possible to provide a transflective liquid crystal display which can achieve high luminance even in the reflective mode and which can achieve high display characteristics in both of the reflective and transmissive modes.

[Second Mode for Carrying Out the Invention]

A liquid crystal display and a method of manufacturing the same in a second mode for carrying out the invention will now be described with reference to FIGS. 15 to 28.

In the liquid crystal display in the first mode for carrying out the invention shown in FIGS. 1A to 2B, the reflective surface 55 is flat. Therefore, reflected light has strong directivity which results in degradation of viewing angle characteristics of display in the reflective mode. Further, since reflectivity is low when external light which has entered in a direction oblique to the display screen is viewed in a direction square to the display screen, a problem arises in that preferable display characteristics may not be obtained in the reflective mode.

Figure 15A:
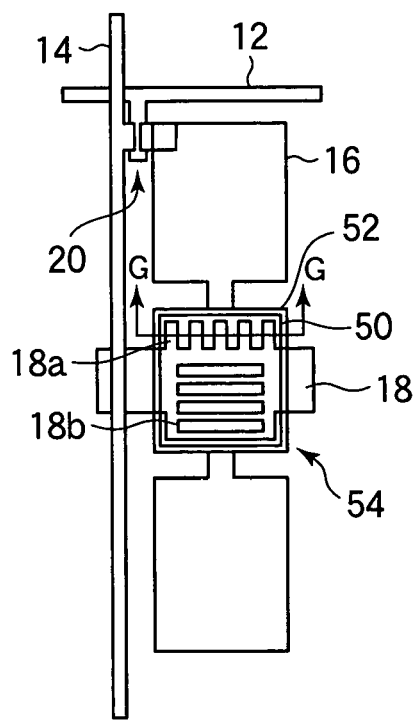
FIGS. 15A and 15B show a configuration of a liquid crystal display in a second mode for carrying out the invention.
Figure 15B:
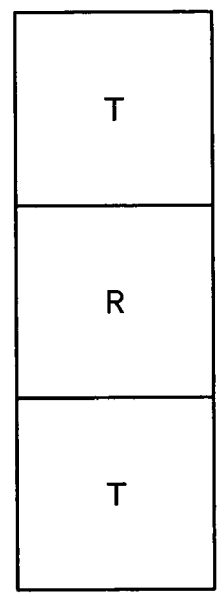
Figure 16:
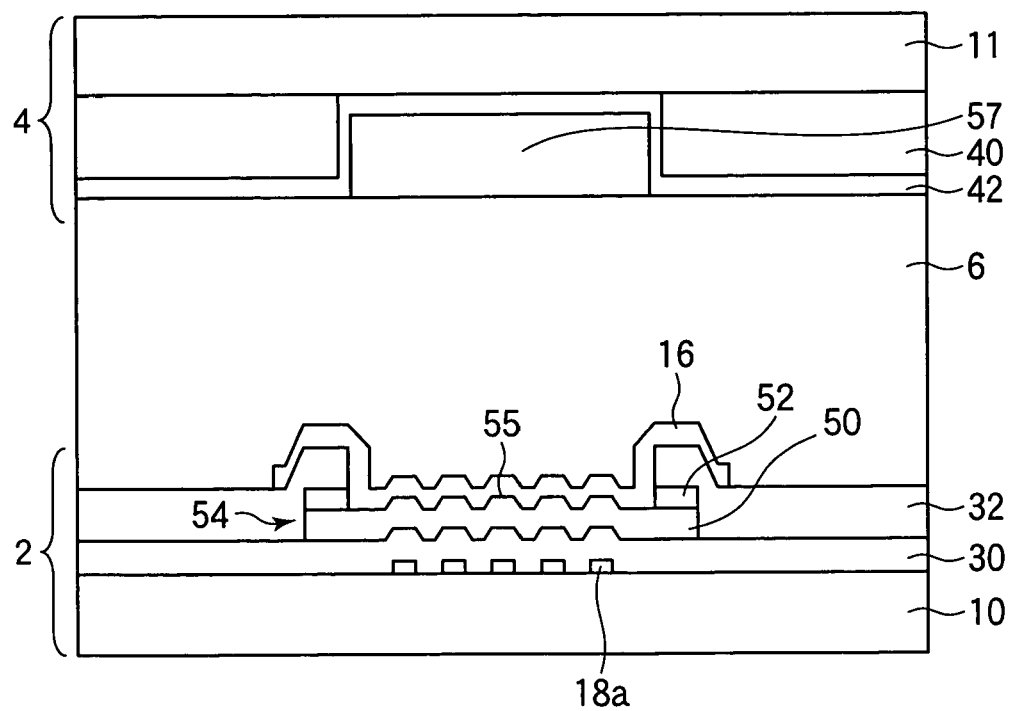
FIG. 16 is a sectional view showing the configuration of the liquid crystal display in the second mode for carrying out the invention.

FIG. 15A shows a configuration of a pixel of a TFT substrate of a liquid crystal display in the present mode for carrying out the invention in which the above-described problem is solved. FIG. 15B is a conceptual diagram of the pixel region. FIG. 16 shows a sectional configuration of the liquid crystal display taken along the line G-G shown in FIG. 15A. As shown in FIGS. 15A, 15B and 16, a storage capacitor bus line 18 formed of the same material as that of a gate electrode of a TFT 20 has a plurality of protrusions 18a extending substantially in parallel with, for example, a drain bus line 14 in a lower part of a reflective area R as illustrated and patterned in a form of a comb. The storage capacitor bus line 18 also has a plurality of openings extending substantially in parallel with, for example, a gate bus line 12 in a lower part of a reflective area R as illustrated. The storage capacitor bus line 18 in the reflective area R serves as a pattern for forming irregularities.

An insulation film 30 is formed throughout the substrate over the storage capacitor bus line 18, and a reflector 54 is formed on the insulation film 30 in the reflective area R. Irregularities that follow the shape of the irregularity forming pattern are formed on a reflective surface 55 of the reflector 54, and at least a part of the reflective surface 55 is inclined relative to the surface of the substrate. While the irregularity forming pattern is formed of the same material as that of the gate electrode of the TFT 20 in the present example, an a-Si layer or a SiN layer of which the TFT 20 is formed may alternatively be used as the pattern.

Figure 17:
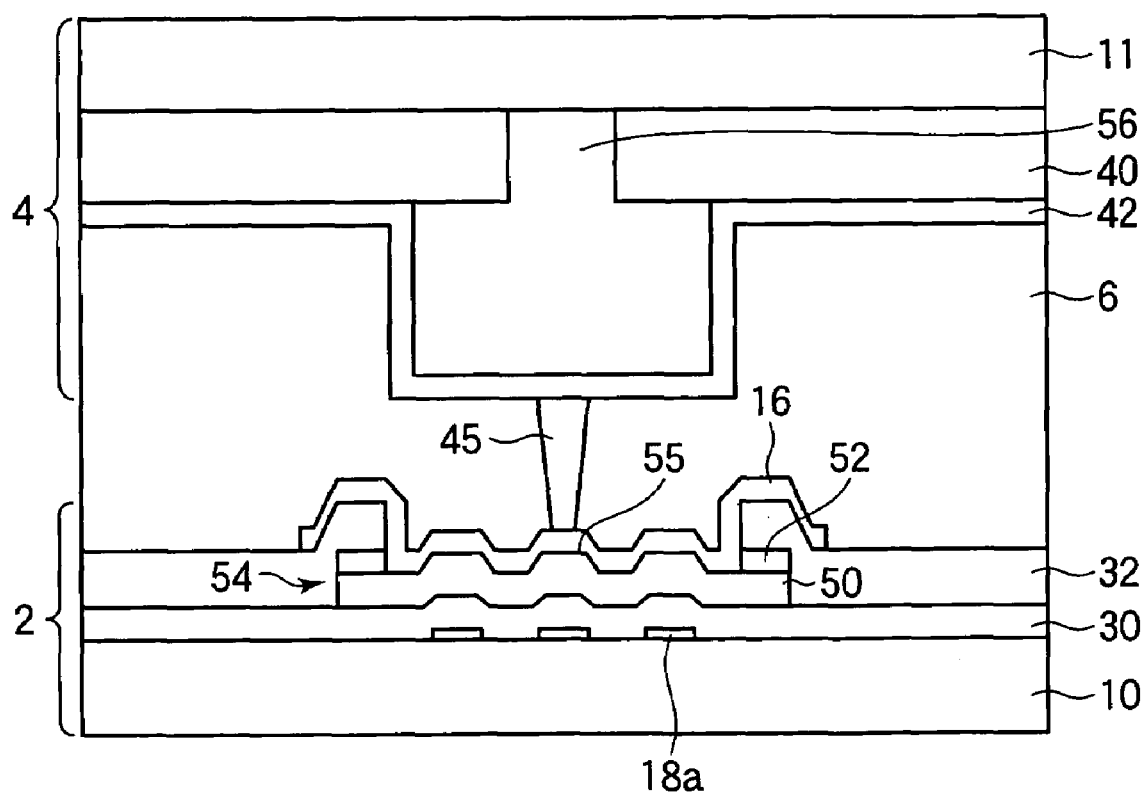
FIG. 17 is a sectional view showing a modification of the configuration of the liquid crystal display in the second mode for carrying out the invention.

FIG. 17 shows a modification of the configuration of the liquid crystal display in the present mode for carrying out the invention. As shown in FIG. 17, the present modification employs a combination of a TFT substrate 2 having a configuration similar to that shown in FIG. 16 and a CF substrate 4 that is a modification of the configuration shown in FIG. 12B. A CF layer 40 on the CF substrate 4 is patterned such that it is removed in a part of the reflective area R. The size of the blank section of the CF layer 40 is set equal to or smaller than the size of the reflective area R. A transparent resin layer 56 is provided on the CF layer 40 and the blank section in the reflective area R. The thickness of the transparent resin layer 56 is adjusted such that the cell thickness in the reflective area R becomes one-half of the cell thickness in a transmissive area T. A common electrode 42 constituted by an ITO is formed on top surfaces of the transparent resin layer 56 and the CF layer 40. Further, an alignment controlling protrusion (bank) 45 is formed on the common electrode 42. The alignment controlling protrusion 45 is formed with a height of about 2 μm such that it also serves as a spacer. On the TFT substrate 2, a storage capacitor bus line 18 is patterned to form an irregularity forming pattern such as protrusions 18a or openings 18b (not shown in FIG. 17). As a result, irregularities that follow the shape of the irregularity forming pattern are formed on a reflective surface 55 of a reflector 54. This configuration makes it possible to provide a transflective liquid crystal display having the highest level of display quality without making any change in ordinary steps for manufacturing a transflective liquid crystal display.

In the present mode for carrying out the invention, at least a part of the reflective surface 55 of the reflector 54 can be formed at an inclination to the surface of the substrate. Therefore, external light which has entered in a direction oblique to the display screen can be reflected in a direction square to the display screen. This improves reflectivity and viewing angle characteristics.

Liquid crystal displays and methods of manufacturing the same in the present mode for carrying out the invention will now be specifically described with reference to embodiments thereof.

Embodiment 2-1

Figure 18:
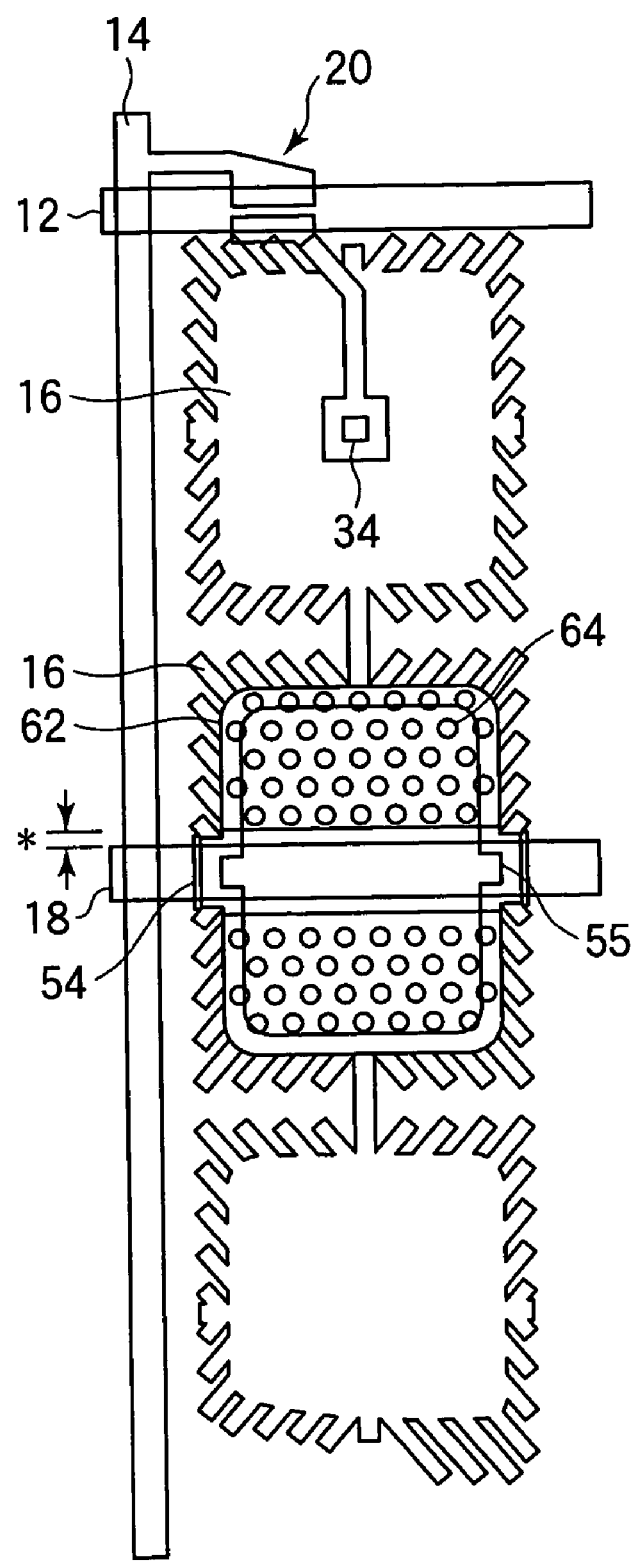
FIG. 18 shows a configuration of a liquid crystal display according to Embodiment 2-1 in the second mode for carrying out the invention.

First, a liquid crystal display according to Embodiment 2-1 in the present mode for carrying out the invention will be described. FIG. 18 shows a configuration of a pixel of the liquid crystal display of the present embodiment. As shown in FIG. 18, in a reflective area R in the middle of the pixel region, two irregularity forming patterns 62 are formed on both sides of a storage capacitor bus line 18 at the same time when a gate electrode of a TFT 20 and the storage capacitor bus line 18 are formed, the patterns being formed of the same material as that of the gate electrode and the storage capacitor bus line 18. The irregularity forming patterns 62 and the storage capacitor bus line 18 are provided with a predetermined gap (indicated by a symbol *) left between them to electrically isolate them from each other. That is, the irregularity forming patterns 62 are in an electrically floating state. The irregularity forming patterns 62 are formed with a substantially rectangular outline, and they have a plurality of circular openings 64.

Figure 19:
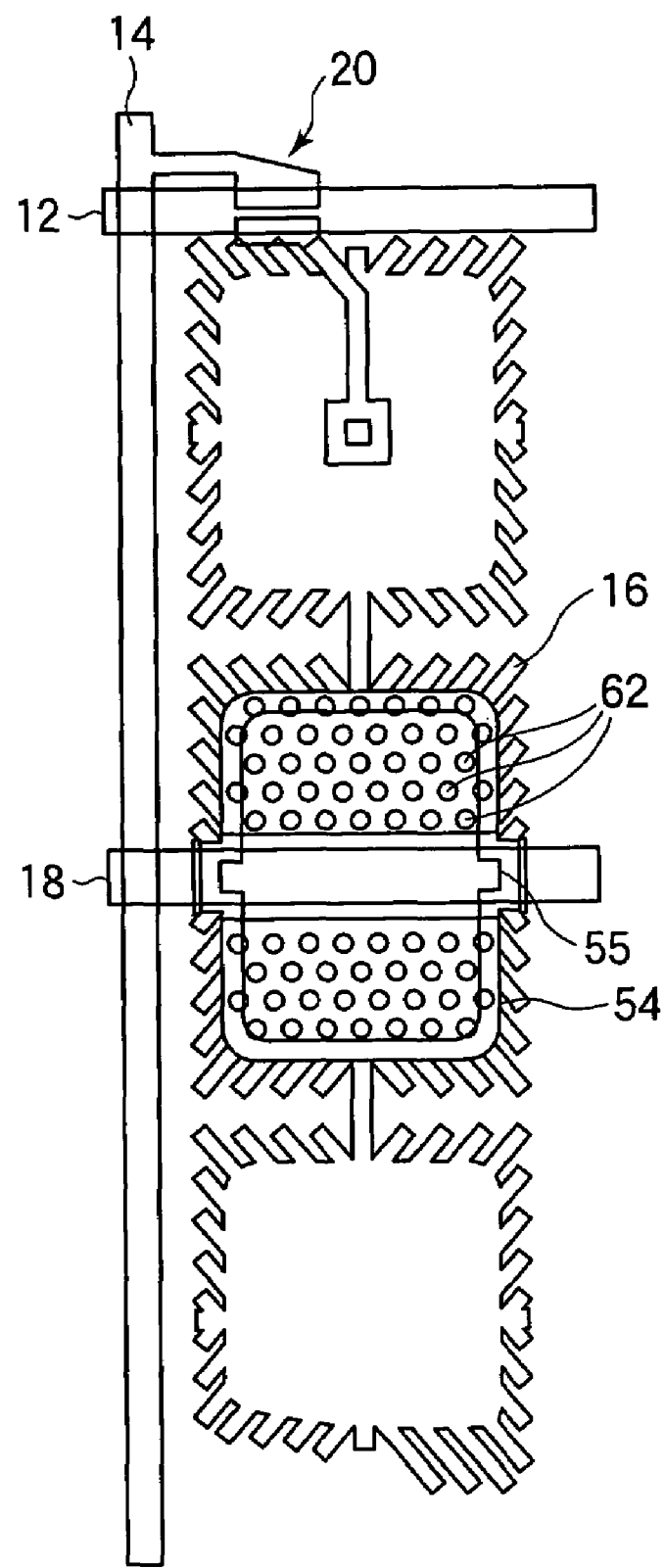
FIG. 19 shows a configuration of the liquid crystal display according to Embodiment 2-1 in the second mode for carrying out the invention.

FIG. 19 shows a modification of the configuration of the liquid crystal display of the present embodiment. As shown in FIG. 19, a plurality of circular patterns 62 for forming irregularities are formed of the same material as that of the gate electrode of the TFT 20 in the reflective area R in the middle of the pixel region. The plurality of irregularity forming patterns 62 are electrically isolated from the storage capacitor bus line 18 and are in an electrically floating state.

Figure 20:
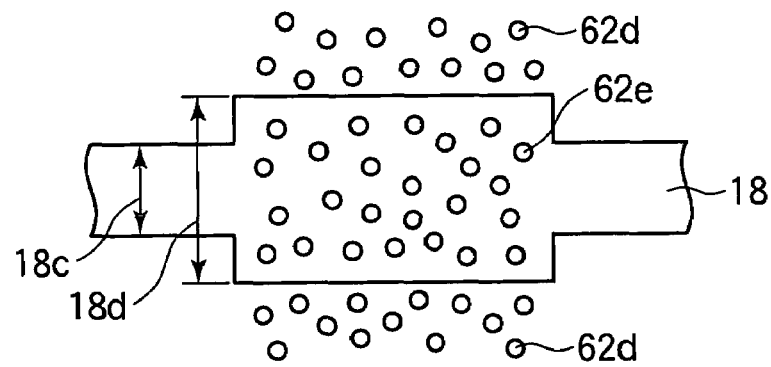
FIG. 20 shows a modification of the configuration of the liquid crystal display according to Embodiment 2-1 in the second mode for carrying out the invention.

FIG. 20 shows a configuration of a major part of another modification of the liquid crystal display of the present embodiment. In the present modification, a plurality of independent irregularity forming patterns 62d having a configuration similar to that in FIG. 19 are formed. A plurality of openings 62e having a configuration similar to that in FIG. 18 are formed in a part of the storage capacitor bus line 18. The area of the storage capacitor bus line 18 which is patterned to form the openings 62e also serves as an irregularity forming pattern. In order to keep the resistance of the storage capacitor bus line 18 constant, a width 18d of the area of the storage capacitor bus line 18 which is patterned to form the openings 62e is greater than a width 18c of the storage capacitor bus line 18 in other areas thereof. Further, in order to prevent interference, each of the irregularity forming patterns 62d and the openings 62e is irregularly arranged. Since irregularities can be thus formed on the surface of the reflector 54 even in its area above the storage capacitor bus line 18, display can be performed with higher luminance in the reflective mode.

Embodiment 2-2

Figure 21:
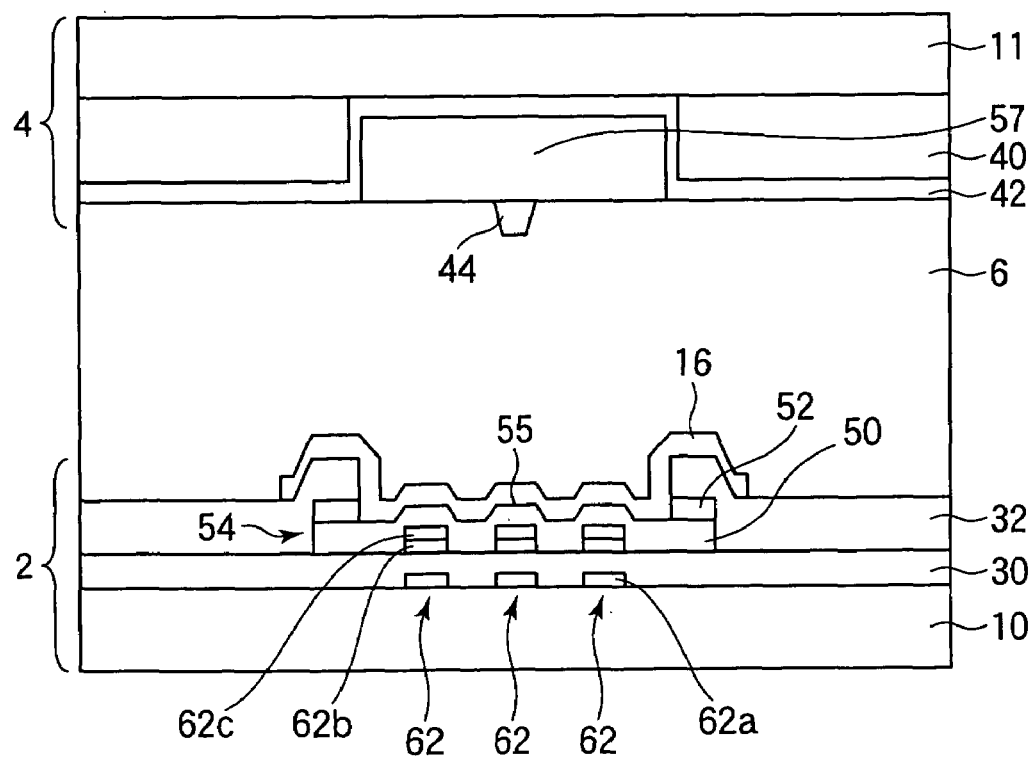
FIG. 21 is a sectional view showing a configuration of a liquid crystal display according to Embodiment 2-2 in the second mode for carrying out the invention.

A liquid crystal display and a method of manufacturing the same according to Embodiment 2-2 in the present mode for carrying out the invention will now be described. FIG. 21 shows a sectional configuration of a reflective area R of the liquid crystal display of the present embodiment. As shown in FIG. 21, the liquid crystal display of the present embodiment has an irregularity forming pattern 62 in a configuration similar to that shown in FIGS. 15A, 15B and 16. The irregularity forming pattern 62 has a metal layer (conductor layer) 62a which is formed of the same material as that of a gate electrode of a TFT 20 and a storage capacitor bus line 18, an a-Si layer (semiconductor layer) 62b which is provided on the metal layer 62a with an insulation film 30 interposed between them and which is formed of the same material as that of an active semiconductor layer of the TFT 20 and a SiN film (dielectric layer) 62c which is formed on the a-Si layer 62b using the same material as that of a channel protection film of the TFT 20. Alternatively, the irregularity forming pattern 62 may be constituted by a metal layer 62a and a SiN film 62c. All of the metal layer 62a, the a-Si layer 62b and the SiN film 62c have substantially the same plan configuration.

Referring to steps for forming the irregularity forming pattern 62 of the present embodiment, a metal layer is first formed on an entire surface of a glass substrate 10 and patterned to form a metal layer 62a simultaneously with a gate electrode and a storage capacitor bus line 18. Next, an insulation film 30 is formed throughout the substrate over the metal layer 62a. Then, an a-Si layer and a SiN film are formed in the order listed on the entire top surface of the insulation film 30. A resist is then applied to the entire top surface of the SiN film, and back exposure is performed using the metal layer 62a as a mask. Development is thereafter performed to form a resist pattern which has the same shape as that of the metal layer 62a. Next, only the SiN film or both of the SiN film and the a-Si layer are etched using the resist pattern as a mask to form a SiN film 62c (probably along with an a-Si layer 62b) which has the same shape as that of the metal layer 62a. As thus described, in the present embodiment, the SiN film 62c (probably along with the a-Si layer 62b) is formed by performing back exposure. In the present embodiment, since the irregularity forming pattern 62 can be provided with a greater substantial thickness, greater irregularities can be provided on a reflector 55.

Embodiment 2-3

Figure 22:
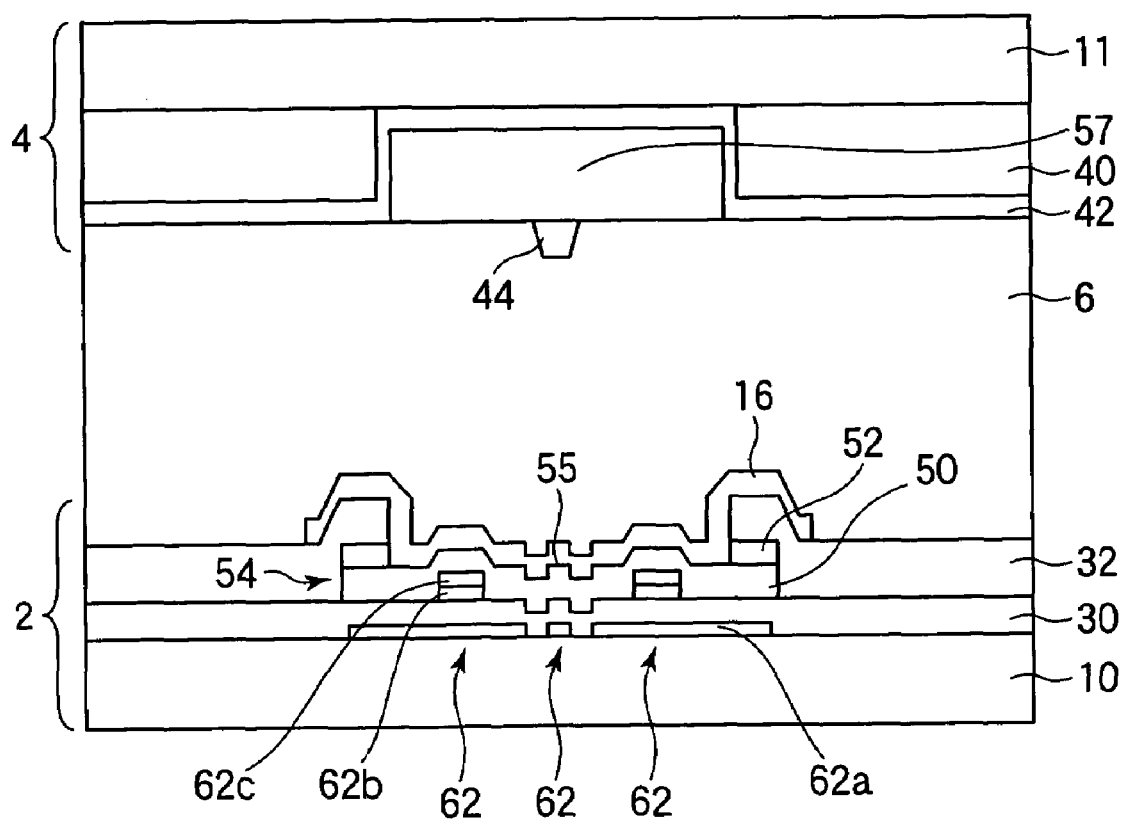
FIG. 22 is a sectional view showing a configuration of a liquid crystal display according to Embodiment 2-3 in the second mode for carrying out the invention.

A liquid crystal display and a method of manufacturing the same according to Embodiment 2-3 in the present mode for carrying out the invention will now be described. FIG. 22 shows a sectional configuration of a reflective area R of the liquid crystal display of the present embodiment. As shown in FIG. 22, in the liquid crystal display of the present embodiment, a metal layer 62a, an a-Si layer 62b and a SiN film 62c which constitute an irregularity forming pattern 62 are different from each other in plan configuration. Alternatively, the irregularity forming pattern 62 may be constituted by a metal layer 62a and a SiN film 62c.

Referring to steps for forming the irregularity forming pattern 62 of the present embodiment, a metal layer is first formed on an entire surface of a glass substrate 10 and patterned to form a metal layer 62a simultaneously with a gate electrode and a storage capacitor bus line 18. Next, an insulation film 30 is formed throughout the substrate over the metal layer 62a. Then, an a-Si layer and a SiN film are formed in the order listed on the entire top surface of the insulation film 30. A resist is then applied to the entire top surface of the SiN film, and exposure is performed from above the substrate using a predetermined photo-mask. Development is thereafter performed to form a resist pattern having a predetermined shape.

Next, only the SiN film or both of the SiN film and the a-Si layer are etched using the resist pattern as a mask to form a SiN film 62c (along with an a-Si layer 62b) which has the predetermined shape. As thus described, in the present embodiment, the SiN film 62c (along with the a-Si layer 62b) is formed by performing exposure from above the substrate instead of back exposure.

Figure 23:
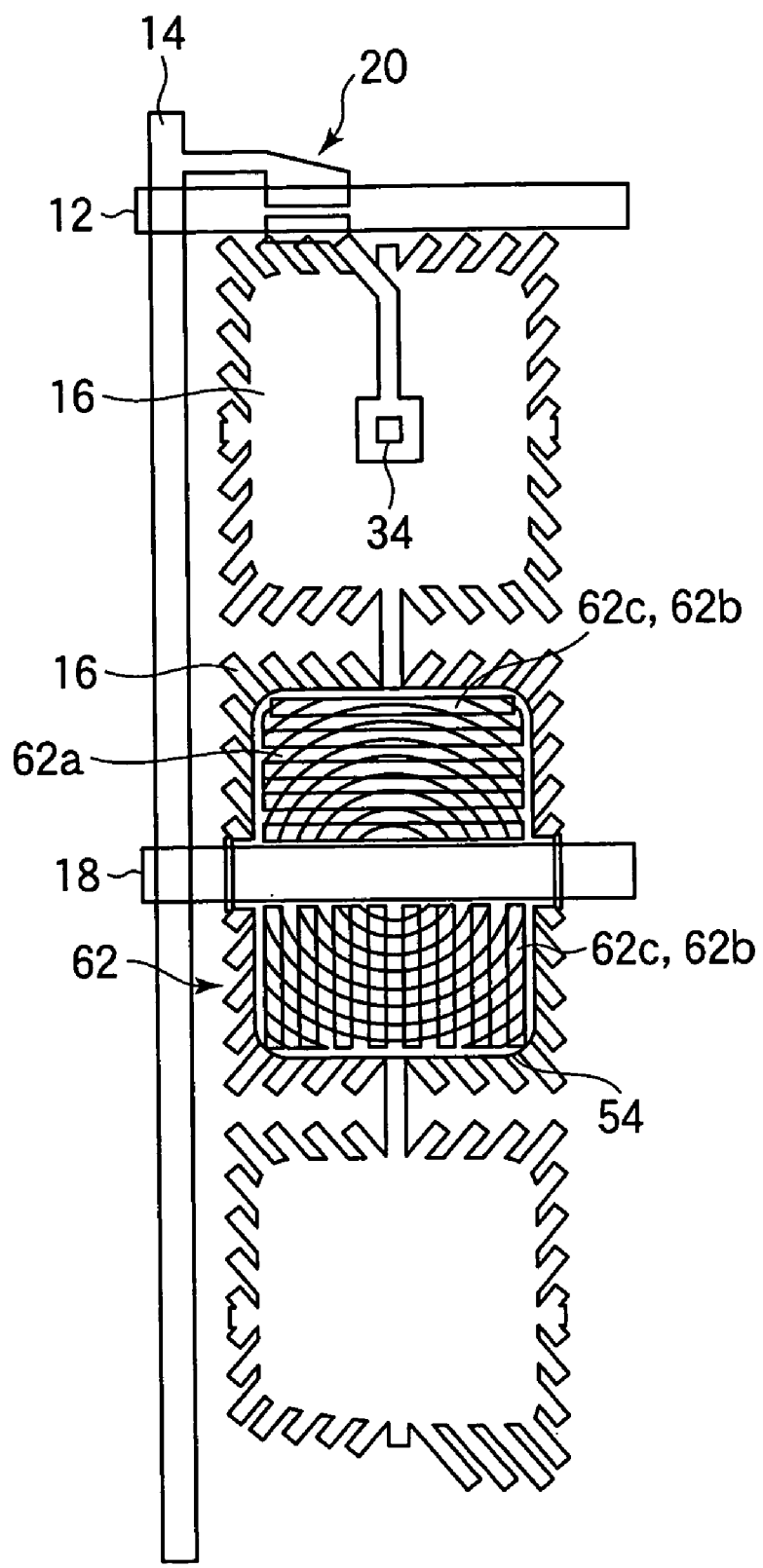
FIG. 23 shows a configuration of the liquid crystal display according to Embodiment 2-3 in the second mode for carrying out the invention.

FIG. 23 shows an example of a configuration of an irregularity forming pattern 62 of a liquid crystal display according to the present embodiment. As shown in FIG. 23, a plurality of concentric metal layers 62a is formed in a reflective area R in the middle of a pixel. A plurality of SiN films 62c and a-Si layers 62b extending substantially in parallel with a gate bus line 12 is formed in a part of the reflective area R that is located above a storage capacitor bus line 18 in the figure, and a plurality of SiN films 62c and a-Si layers 62b extending substantially in parallel with a drain bus line 14 is formed in a part of the reflective area R that is located under the storage capacitor bus line 18 in the figure. Thus, the irregularity forming pattern 62 is constituted by the metal layers 62a, the a-Si layers 62b and the SiN films 62c which are different from each other in plan configuration.

Embodiment 2-4

Figure 24:
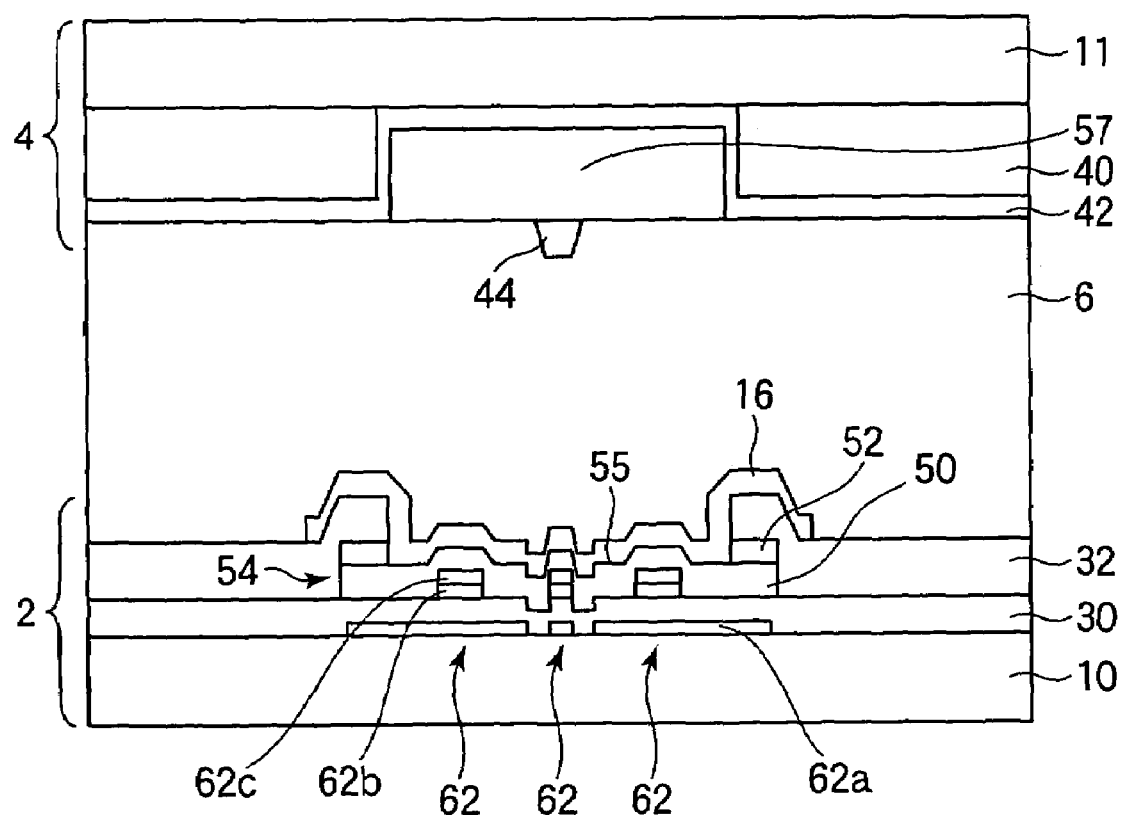
FIG. 24 is a sectional view showing a configuration of a liquid crystal display according to Embodiment 2-4 in the second mode for carrying out the invention.

A liquid crystal display and a method of manufacturing the same according to Embodiment 2-4 in the present mode for carrying out the invention will now be described. FIG. 24 shows a sectional configuration of a reflective area R of the liquid crystal display of the present embodiment. As shown in FIG. 24, in the liquid crystal display of the present embodiment, an irregularity forming pattern 62 has a metal layer 62a and an a-Si layer 62b and a SiN film 62c which are formed only on the metal layer 62a and which are patterned to be smaller than the metal layer 62a. Alternatively, the irregularity forming pattern 62 may be constituted by a metal layer 62a and a SiN film 62c.

Referring to steps for forming the irregularity forming pattern 62 of the present embodiment, a metal layer is first formed on an entire surface of a glass substrate 10 and patterned to form a metal layer 62a simultaneously with a gate electrode and a storage capacitor bus line 18. Next, an insulation film 30 is formed throughout the substrate over the metal layer 62a. Then, an a-Si layer and a SiN film are formed in the order listed on the entire top surface of the insulation film 30. A resist is then applied to the entire top surface of the SiN film, and back exposure is performed using the metal layer 62a as a mask. Subsequently, exposure and development is performed from above the substrate using a predetermined photo-mask to form a resist pattern which is provided only on the metal layer 62a and which is patterned to be smaller than the metal layer 62a. Next, only the SiN film or both of the SiN film and the a-Si layer are etched using the resist pattern as a mask to form a SiN film 62c (along with an a-Si layer 62b) which is provided only on the metal layer 62a and which is patterned to be smaller than the metal layer 62a. As thus described, in the present embodiment, the SiN film 62c (along with the a-Si layer 62b) is formed by performing back exposure and exposure from above the substrate.

Figure 25:
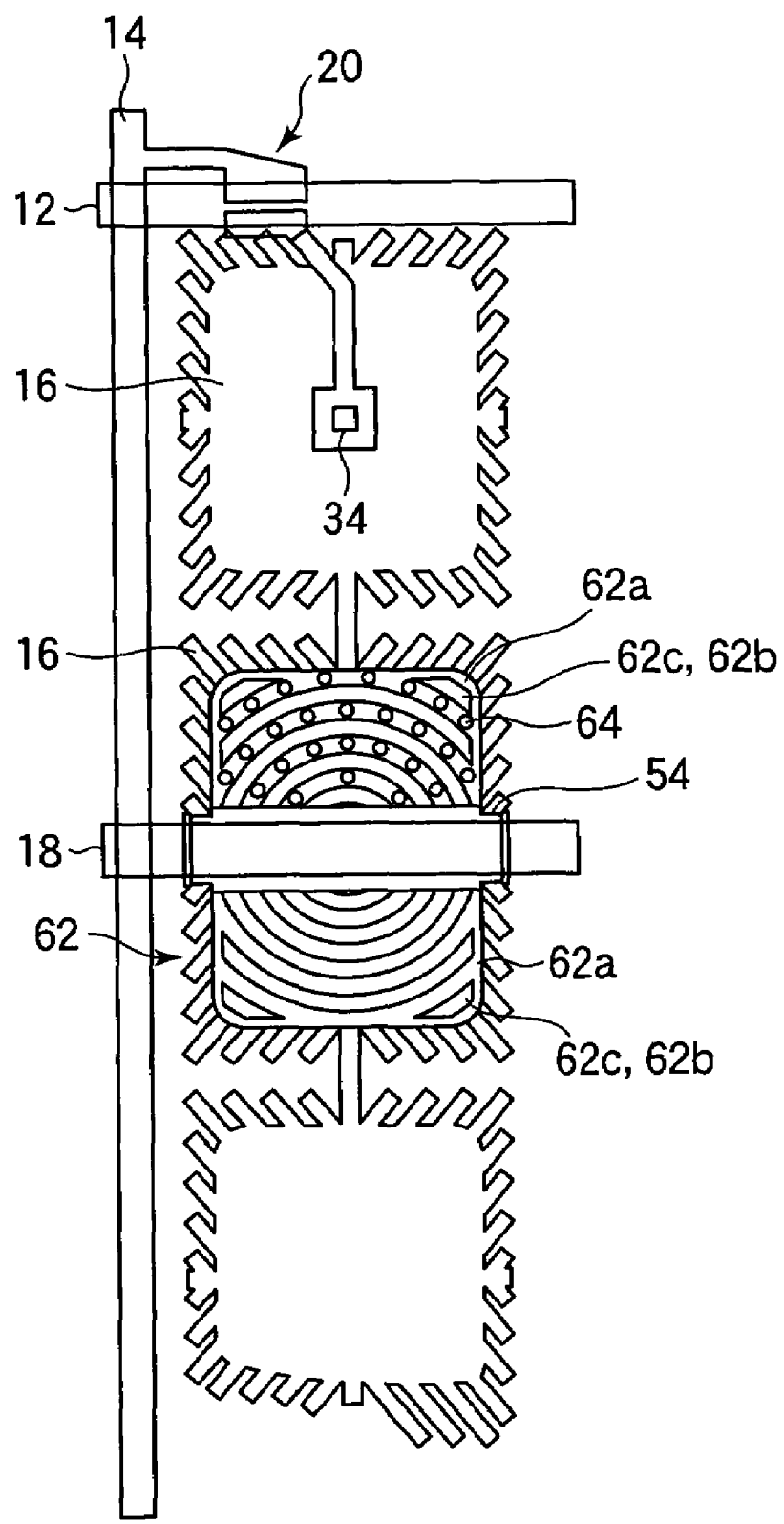
FIG. 25 shows a configuration of the liquid crystal display according to Embodiment 2-4 in the second mode for carrying out the invention.
Figure 26:
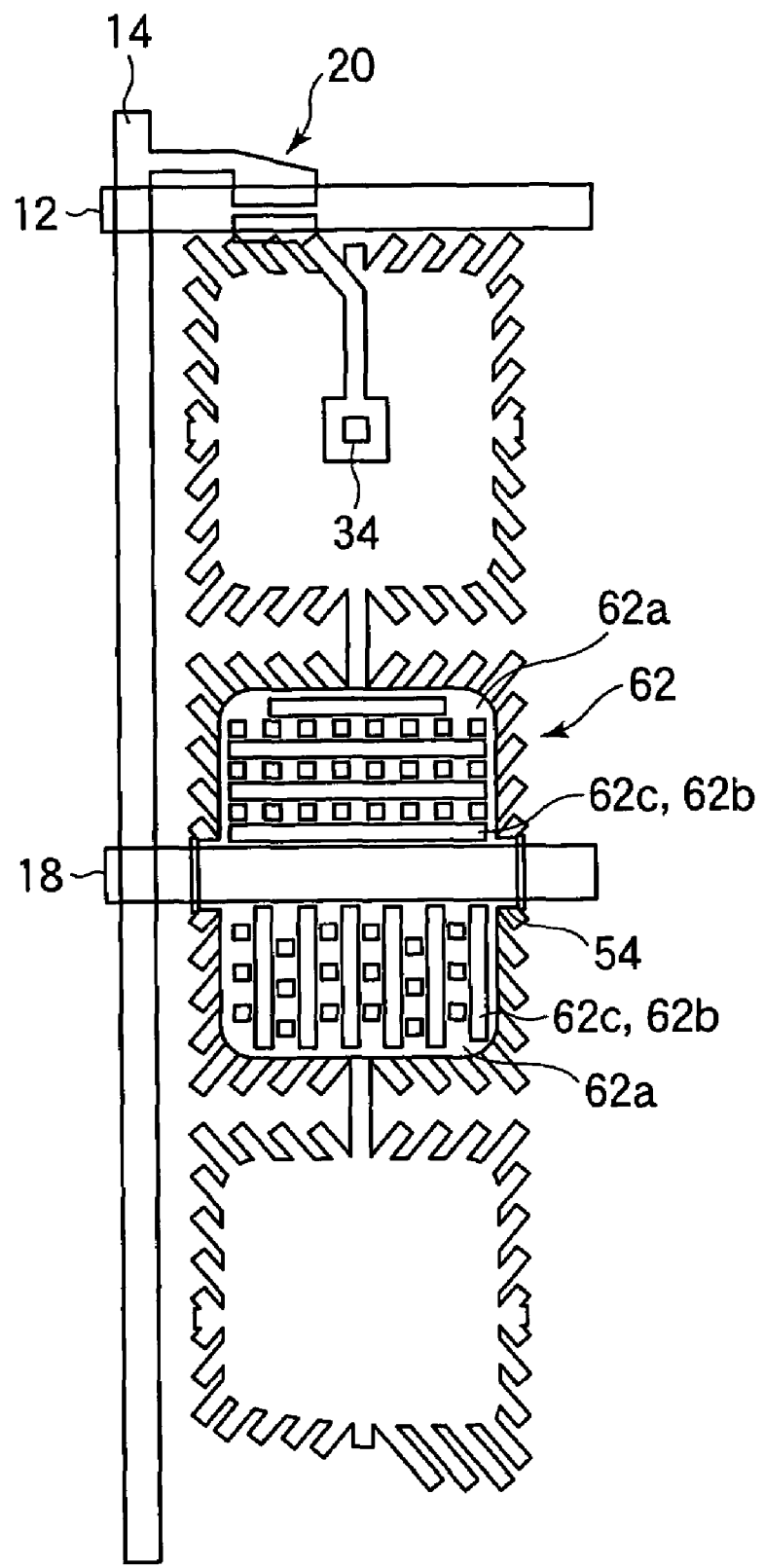
FIG. 26 shows a configuration of the liquid crystal display according to Embodiment 2-4 in the second mode for carrying out the invention.

FIGS. 25 and 26 show examples of configurations of an irregularity forming pattern 62 of a liquid crystal display according to the present embodiment. As shown in FIG. 25, two metal layers 62a are formed in a reflective area R in the middle of a pixel, the metal layers being provided on both sides of a storage capacitor bus line 18. Each of the two metal layers 62a has a substantially rectangular outline. A plurality of circular openings 64 is formed in the metal layer 62a that is located above the storage capacitor bus line 18 in the figure. Further, there is formed a plurality of SiN films 62c and a-Si layers 62b which are provided only above the metal layers 62a in an overlapping relationship with the metal layers 62a and which are patterned to be smaller than the metal layers 62a. The plurality of SiN films 62c and a-Si layers 62b is substantially concentrically formed. Thus, an irregularity forming pattern 62 is constituted by the metal layers 62a, the a-Si layers 62b and the SiN films 62c.

Embodiment 2-5

Figure 27:
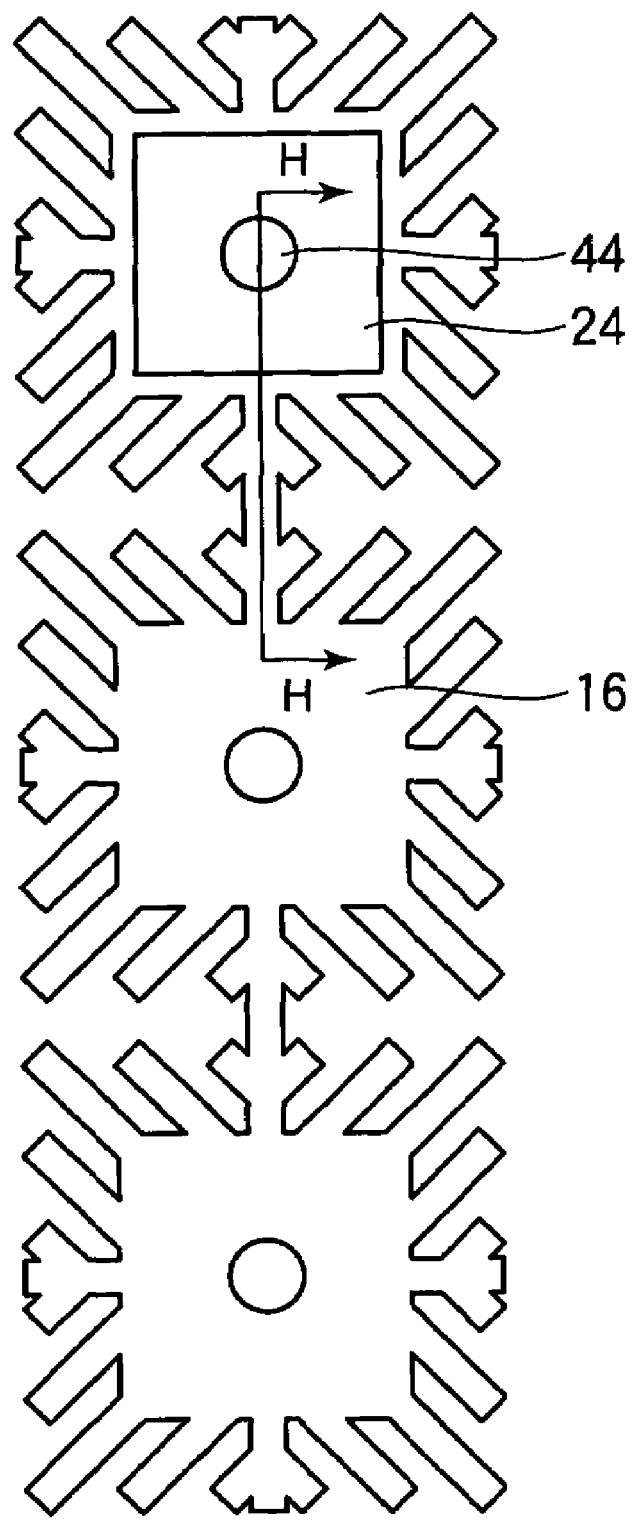
FIG. 27 shows a configuration of a liquid crystal display according to Embodiment 2-5 in the second mode for carrying out the invention.
Figure 28:
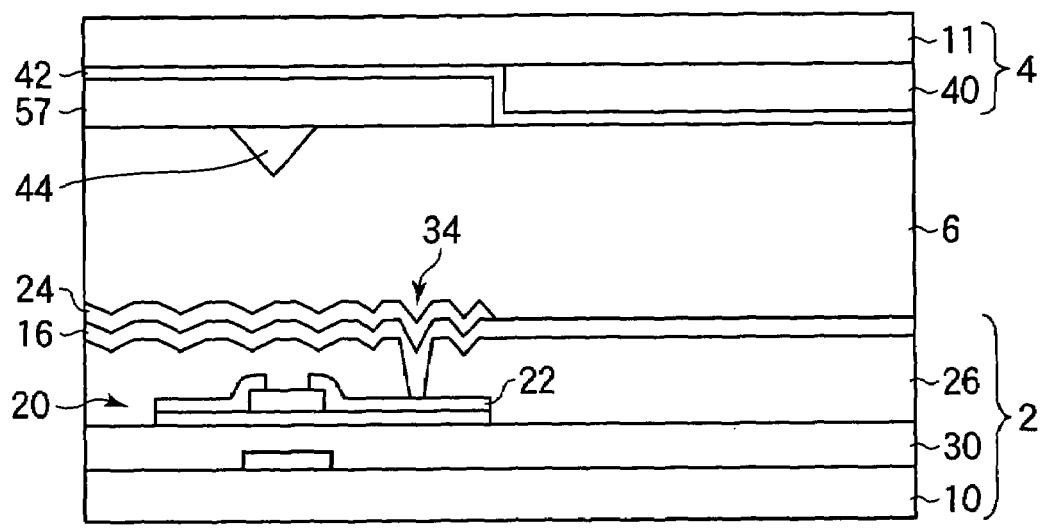
FIG. 28 is a sectional view showing the configuration of the liquid crystal display according to Embodiment 2-5 in the second mode for carrying out the invention.

A liquid crystal display according to Embodiment 2-5 in the present mode for carrying out the invention will now be described. FIG. 27 shows a configuration of a pixel electrode of one pixel of the liquid crystal display of the present embodiment. FIG. 28 shows a sectional configuration of the liquid crystal display taken along the line H-H in FIG. 27. As shown in FIGS. 27 and 28, for example, a transparent resin layer 26 made of PC403 is formed on a TFT 20. Irregularities are formed in a part (in the vicinity of an area to serve as a reflective area R) of the surface of the transparent resin layer 26. The irregularities are formed using either method in which the transparent resin layer is irradiated with ultraviolet rays to modify the surface of the same and in which annealing is thereafter performed to form wrinkles on the surface or method in which patterned exposure (including half exposure) is performed using a predetermined photo-mask to form an irregular pattern on the transparent resin layer 26. A contact hole 34 for exposing a source electrode 22 of the TFT 20 is formed in the transparent resin layer 26. A pixel electrode 16 constituted by an ITO is formed in a predetermined shape on the transparent resin layer 26. Irregularities that follow the irregularities on the surface of the transparent resin layer 26 are formed in the vicinity of an area, which is to serve as a reflective area R, on the surface of the pixel electrode 16. A reflective electrode 24 made of Al is formed in the reflective area R on the pixel electrode 16. As shown in FIG. 27, the reflective electrode 24 is provided in the middle of a pattern of the pixel electrode 16 that is substantially square. Irregularities that follow the irregularities on the surface of the pixel electrode 16 are formed on the surface of the reflective electrode 24, and at least a part of the surface (reflective surface) is inclined relative to the surface of the substrate.

On a glass substrate 11 of an opposite substrate 4 provided opposite to the above-described elements, a CF layer 40 is formed in areas other than the reflective area R where the reflective electrode 24 is formed. A common electrode 42 is formed throughout the substrate over the CF layer 40. A transparent resin layer 57 is formed on the common electrode 42 in the reflective area R.

In the present embodiment, at least a part of the surface of the reflective electrode 24 can be formed such that it is at an inclination to the surface of the substrate. Therefore, external light which has entered in a direction oblique to the display screen can be reflected in a direction square to the display screen. This improves reflectivity and viewing angle characteristics.

As described above, the present mode for carrying out the invention makes it possible to provide a liquid crystal display which can achieve high luminance even in the reflective mode and which can achieve high display characteristics in both of the reflective and transmissive modes.

[Third Mode for Carrying Out the Invention]

A liquid crystal display in a third mode for carrying out the invention will now be described with reference to FIGS. 29 to 39C.

Figure 29:
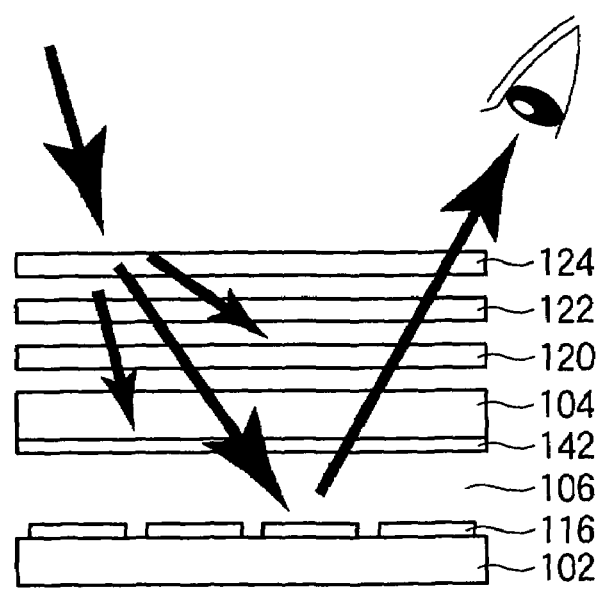
FIG. 29 shows a configuration of a reflective liquid crystal display according to the related art.

FIG. 29 shows the configuration of a reflective liquid crystal display according to the related art disclosed in Non-Patent Document 2. As shown in FIG. 29, a liquid crystal 106 is sealed between a pair of substrates 102 and 104 provided opposite to each other. The state of alignment of the liquid crystal 106 is a bend alignment that is also referred to as "ROCB". Reflective electrodes 116 having a flat reflective surface in the form of a mirror surface are formed on a surface of the substrate 102 facing the liquid crystal 106. A common electrode 142 constituted by a transparent conductive film is formed on a surface of the other substrate 104 facing the liquid crystal 106. A phase difference film (¼ wave plate) 120, a polarizer 122, and an optical path control film 124 are provided in the order list on the side (viewer's side) of the substrate 104 which constitutes the exterior of the panel.

The optical path of incident external light is bent by the optical path control film 124. The light then reaches the reflective electrodes 116 and is reflected by the same to exit the panel toward a viewer. Since there is the optical path control film 124 which transmits light while diffusing the same, beams of light reflected at the surface of the optical path control film 124 have optical paths that are different from the optical paths of beams of light which pass through the optical control film 124 and which are reflected at the surface of the reflective electrodes 116. Therefore, display on the display screen will not overlap external light when the viewer watches the screen, which allows a displayed image to be clearly viewed.

However, the configuration of the reflective liquid crystal display shown in FIG. 29 has not been successfully combined with a transmissive type. The reason is that the liquid crystal 106 is aligned in hybrid alignment on an assumption that light will pass through the liquid crystal 106 twice in the reflective type. Hybrid alignment has a problem in that it disallows white to be sufficiently displayed because birefringence is too small to use in a transmissive type. There is another problem in that viewing angle characteristics provided by the alignment are low for a transmissive type.

Figure 30A:
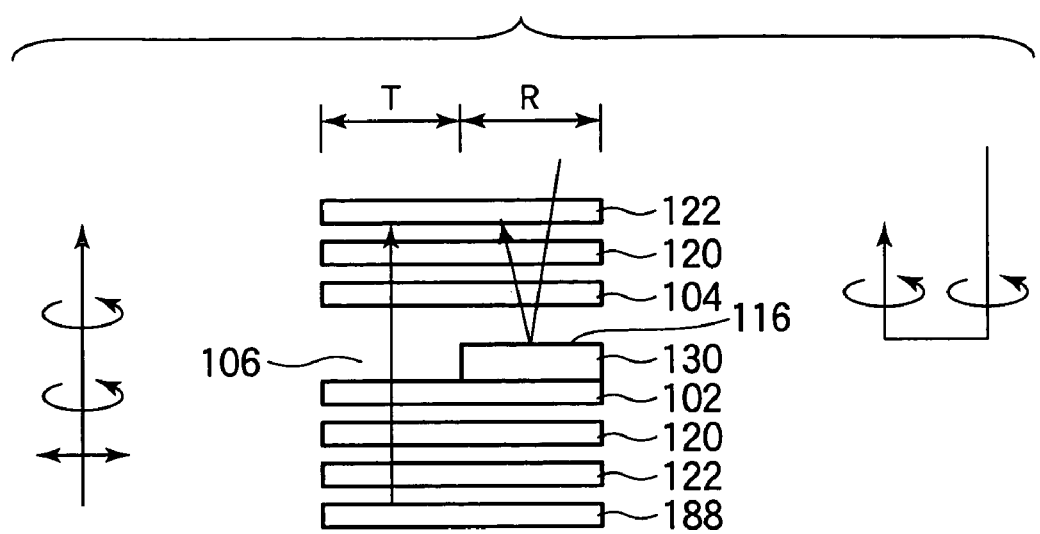
FIGS. 30A and 30B show a configuration of a transflective liquid crystal display according to the related art.
Figure 30B:
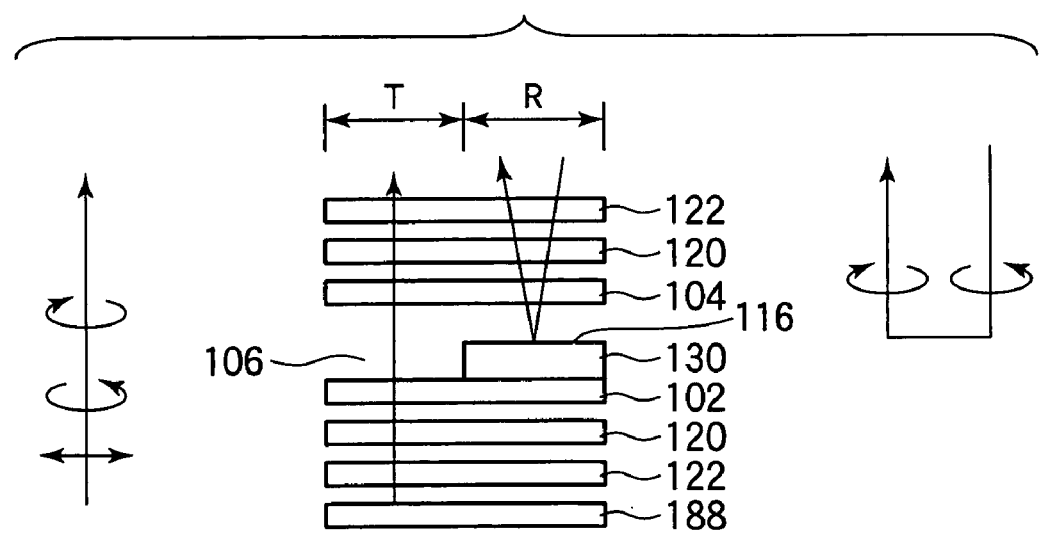
Figure 47A:
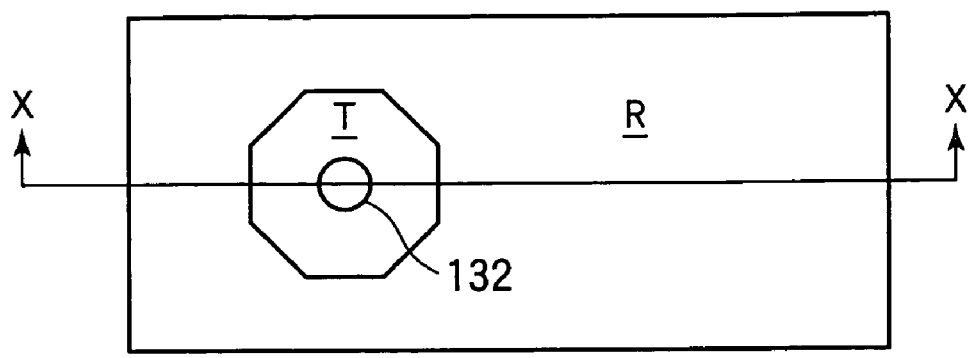
FIGS. 47A and 47B show a configuration of a transflective liquid crystal display according to the related art.
Figure 47B:
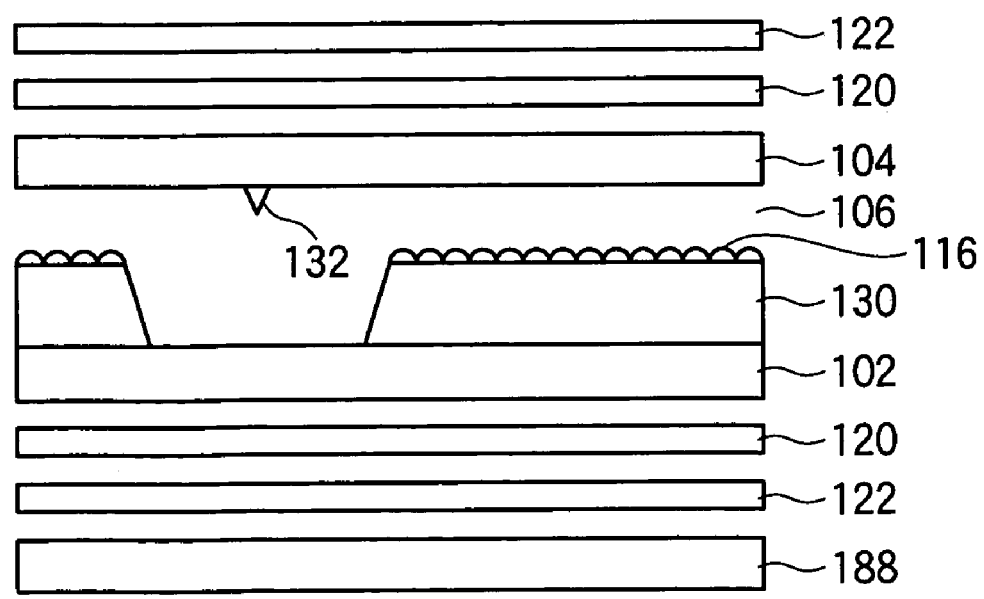
Figure 48:
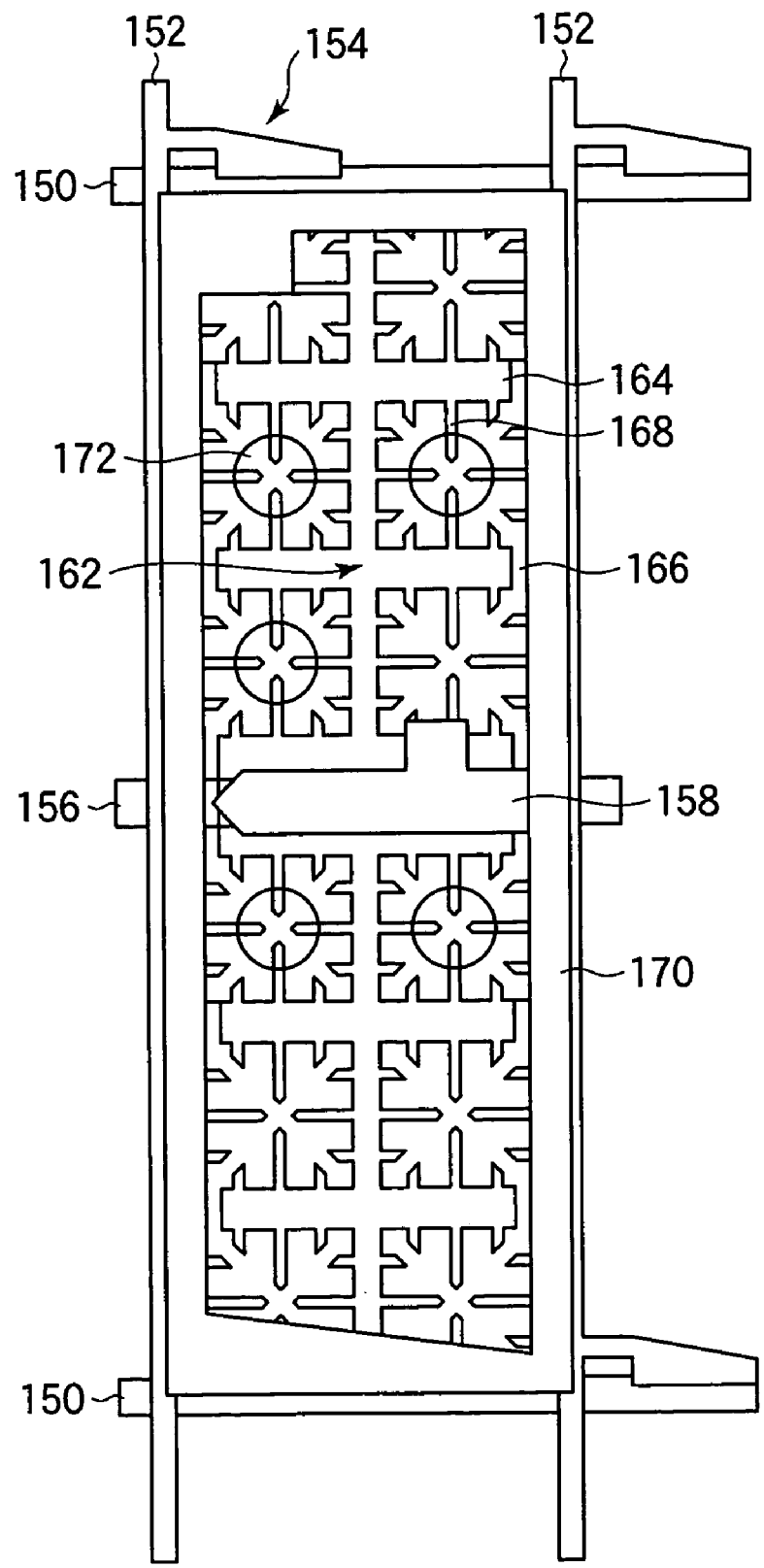
FIG. 48 shows a configuration of a transflective liquid crystal display.

The transflective liquid crystal display shown in FIGS. 47A and 47B is similar to the reflective liquid crystal display shown in FIG. 29 in that the reflective electrodes 116 are formed inside the liquid crystal display panel, but it is different in that irregularities are formed on the reflective surfaces of the reflective electrodes 116. FIGS. 30A and 30B are sectional views showing operations of the transflective liquid crystal display shown in FIGS. 47A and 47B. FIG. 30A shows a state in which no voltage is applied to the liquid crystal 106, and FIG. 30B shows a state in which a predetermined voltage is applied to the liquid crystal 106. As shown in FIG. 30A, the liquid crystal 106 exerts no optical effect on light when no voltage is applied because liquid crystal molecules are aligned perpendicularly to a substrate surface. When reflective display is performed, light which has passed through the polarizer 122 enters the liquid crystal 106 after passing through the ¼ wave plate 120, and the light passes through the ¼ wave plate 120 again after being reflected by reflective electrode 116. That is, the polarization of the light rotates at 90° because the light passes through the ¼ wave plate 120 twice. Therefore, the light is absorbed by the polarizer 122. Black is thus displayed in the reflective mode.

When transmissive display is performed, light which has passed through the polarizer 122 on the side of the backlight unit 188 enters the liquid crystal 106 after passing through the ¼ wave plate 120, and the light passes through the ¼ wave plate 120 on the viewer's side. That is, the polarization of the light rotates at 90° because the light passes through the ¼ wave plate 120 twice. Therefore, the light is absorbed by the polarizer 122 on the viewer's side. Black is thus displayed in the transmissive mode.

In the state in which a predetermined voltage is applied, since liquid crystal molecules are tilted relative to the substrate surface, the liquid crystal 106 exerts a predetermined optical effect on light. As shown in FIG. 30B, the polarization of light which has passed through the polarizer 122 is changed by the liquid crystal 106. As a result, white is displayed in both of the reflective and transmissive modes.

In this configuration, there is a need for providing the irregular reflecting electrodes 116. The formation of the irregular reflective electrodes 116 necessitates manufacturing processes such as formation and patterning of a resin layer and formation of the reflective electrodes 116 in addition to ordinary processes for manufacturing transmissive liquid crystal displays. This has resulted in a significant increase in the manufacturing cost of liquid crystal displays.

Figure 31:
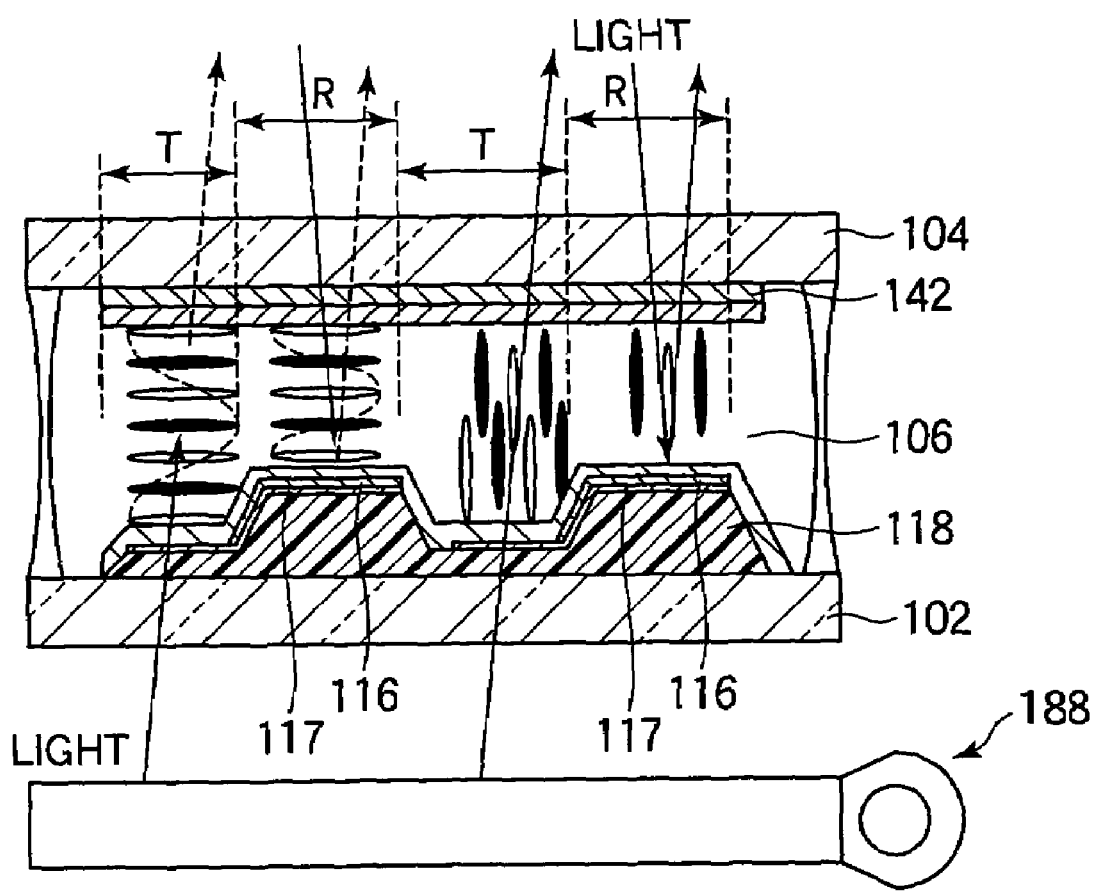
FIG. 31 shows a configuration of a transflective liquid crystal display according to the related art.

FIG. 31 shows a configuration of a transflective liquid crystal display according to the related art disclosed in Patent Document 4. As shown in FIG. 31, in the transflective liquid crystal display, a pixel region is divided into reflective areas R and transmissive areas T. Reflective electrodes 116 are formed in the reflective areas R, and transparent pixel electrodes 117 are formed in the transmissive areas T. A cell thickness in the reflective areas R is smaller than a cell thickness in the transmissive areas T because of an insulation film 118 formed on a TFT substrate 102. In the transmissive areas T, light from a backlight unit 188 exits toward a viewer after passing through a liquid crystal layer 106 once. In the reflective areas R, light which has entered the liquid crystal panel from a top surface thereof is reflected by the reflective electrodes 116, and the light exits toward the viewer after passing through the liquid crystal layer 106 twice. Therefore, if the cell thickness in the reflective areas R is equal to the cell thickness in the transmissive areas T, retardation in the reflective areas R will be twice that in the transmissive areas T. As a result, when the reflective electrodes 116 and the pixel electrodes 117 are at the same voltage, the reflective areas R and the transmissive areas T have gradations completely different from each other. For example, when white is displayed in the transmissive mode, display in the reflective mode has a tint of yellow. In order to prevent this, in the configuration shown in FIG. 31, the cell thickness in the reflective areas R is made smaller than the cell thickness in the transmissive areas T to make the reflective areas R and the transmissive areas T as close as possible to each other in retardation. It is most effective to make the cell thickness in the reflective areas R smaller than the cell thickness in the transmissive areas T in eliminating the difference between gradations in the reflective areas R and the transmissive areas T.

However, it is required to form a structure (insulation film 118) for reducing the cell thickness in the reflective areas R in order to make the cell thickness in the reflective areas R smaller than that in the transmissive areas T. The structure can reduce the stability of the alignment of the liquid crystal 106 in sections that constitute boundaries between the reflective areas R and the transmissive areas T. In particular, when the liquid crystal 106 is in vertical alignment which eliminates a need for a rubbing step, the alignment of the liquid crystal 106 is regulated by the structure. Proper alignment orientation is thus disabled, which can cause roughness in display and alignment defects.

Patent Document 9 discloses a transflective liquid crystal display different from that described above. The transflective liquid crystal display is similar to the configuration shown in FIG. 31 in that one pixel is divided into reflective areas R and transmissive areas T, but it is different in the configuration of a CF layer in the reflective areas R. A reflective area R has a section having a CF layer and a section having no CF layer, which provides luminance higher than that in a case wherein a CF layer is formed throughout the reflective area R, although there is a reduction in chromaticity.

In this configuration, however, since the CF layer is removed in a part of the reflective area, a step is formed on the surface of the substrate on which the CF layer is formed. The step can cause a variation of the cell thickness or an irregularity in the alignment of the liquid crystal which deteriorates display characteristics.

The present mode for carrying out the invention solves the above-described problems and employs a measure to improve the stability of the alignment of a liquid crystal in vertical alignment by reducing a difference between gradations in a reflective area R and a transmissive area T and to improve the stability of the alignment of the liquid crystal when it is vertically aligned by making a step formed between the reflective area R and the transmissive-area T small.

Figure 32:
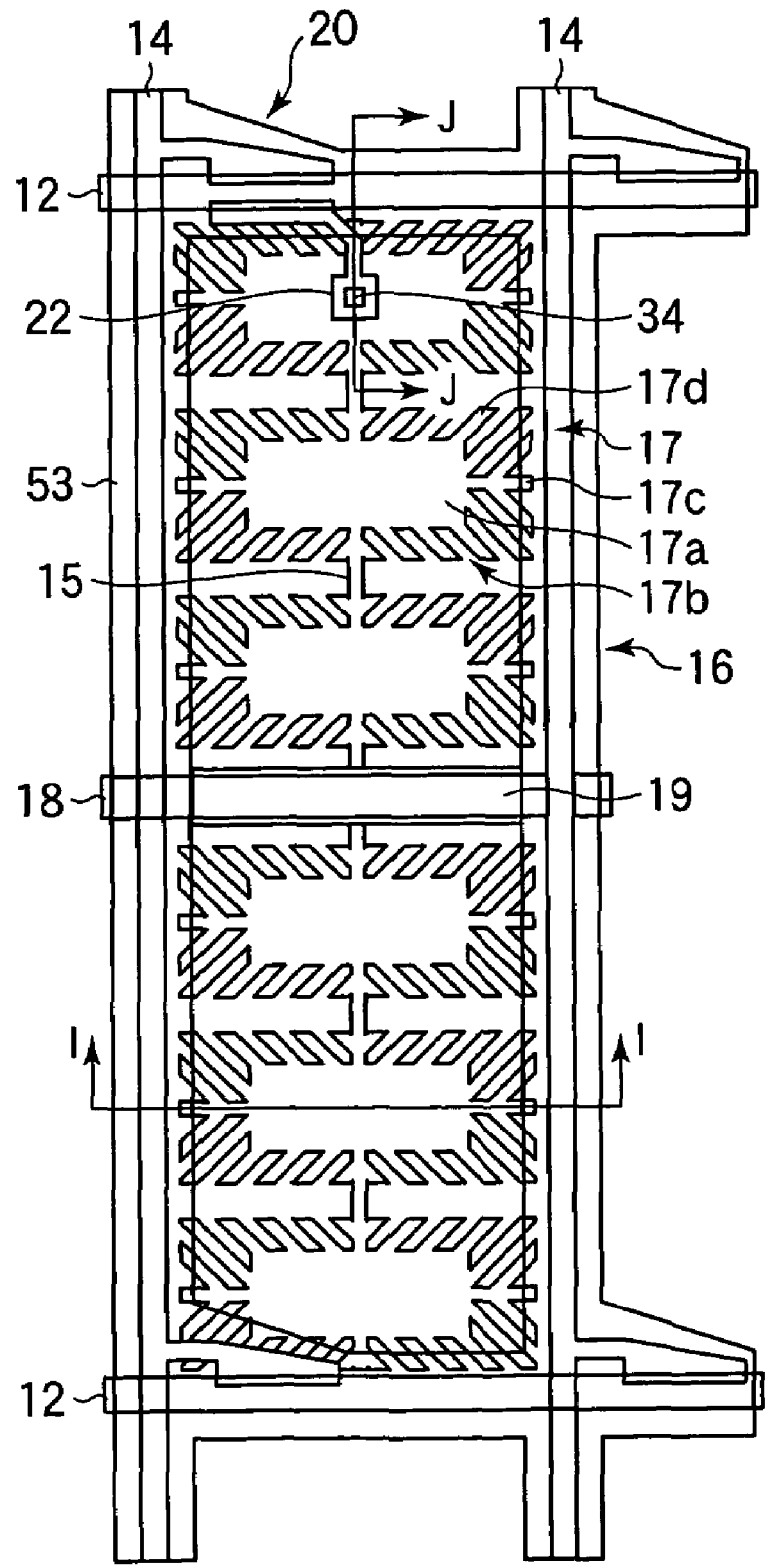
FIG. 32 shows a configuration of a liquid crystal display in a third mode for carrying out the invention.
Figure 33A:
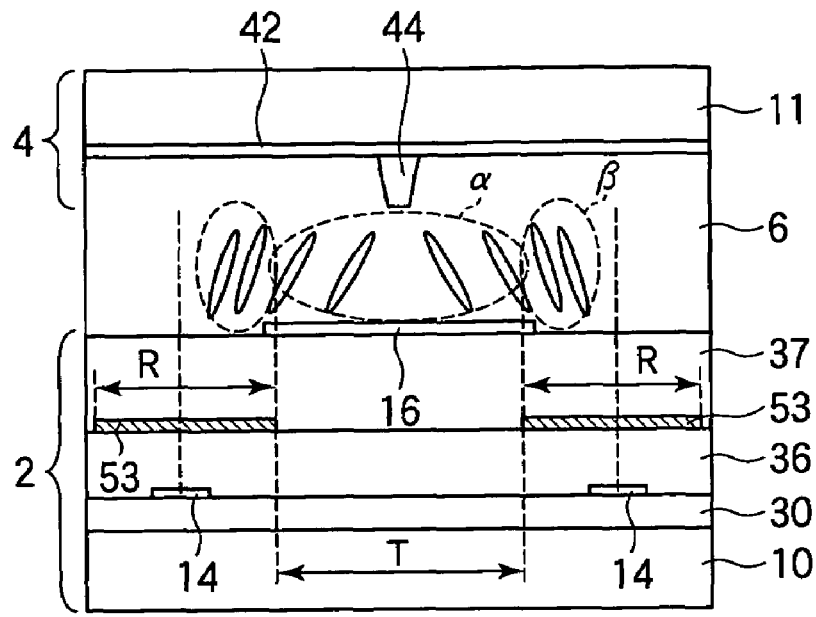
FIGS. 33A and 33B are sectional views showing the configuration of the liquid crystal display in the third mode for carrying out the invention.
Figure 33B:
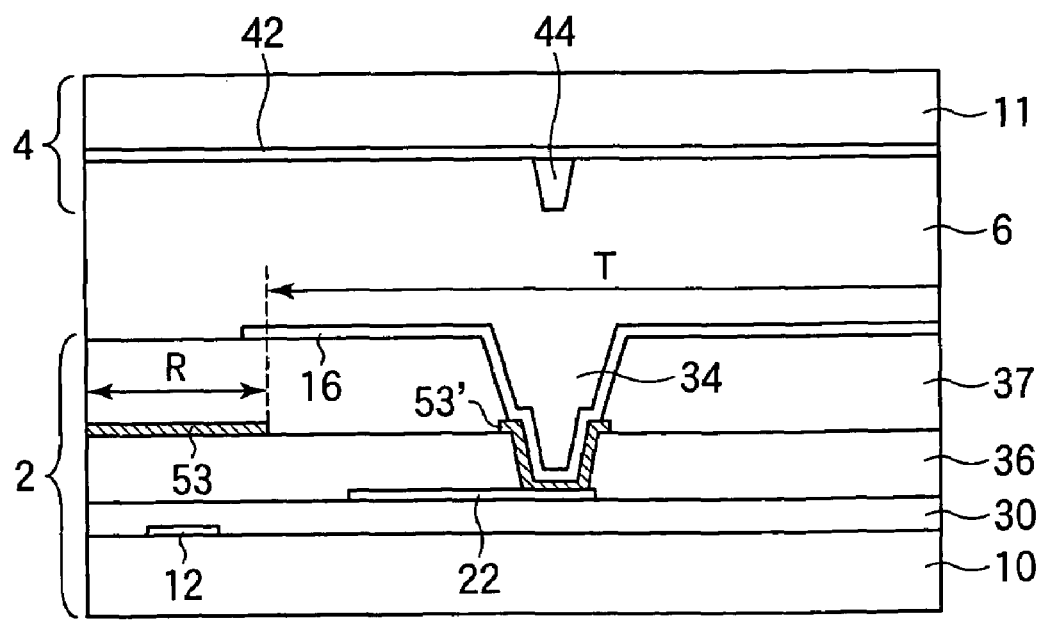

FIG. 32 shows a configuration of a pixel on a TFT substrate of the liquid crystal display in the present mode for carrying out the invention. FIG. 33A shows a sectional configuration of the liquid crystal display taken along the line I-I in FIG. 32, and FIG. 33B shows a sectional configuration of the liquid crystal display taken along the line J-J in FIG. 32. As shown in FIGS. 32, 33A and 33B, the liquid crystal display in the present mode for carrying out the invention has an opposite substrate 4 on which a common electrode 42 is formed, a TFT substrate 2 on which pixel electrodes 16 are formed, and a vertical alignment type liquid crystal 6 sealed between the substrates 2 and 4 which are provided opposite to each other. A configuration of a pixel on the TFT substrate 2 is as follows.

Gate bus lines 12, drain bus lines 14 and TFTs 20 are formed on the TFT substrate 2. A first insulating resin layer 36 such as a transparent resin layer or a color filter layer is formed on them. A reflector 53 is formed in a reflective area R on the insulating resin layer 36. The reflective area R having the reflector 53 formed therein is provided at the periphery of a pixel region including areas above a gate bus line 12, a drain bus line 14 and a TFT 20. The reflector 53 is in an electrically floating state, or it is at the same potential as the common electrode 42 or at a ground potential. A second insulating resin layer 37 is formed on the entire top surface of the reflector 53. A pixel electrode 16 having a predetermined shape constituted by a transparent metal layer such as an ITO is formed in a transmissive area T (and in a part of the reflective area R) on the insulating resin layer 37. The transmissive area T is provided in a central section of the pixel inside the reflective area R. The pixel electrode 16 formed in the transmissive area T is provided in a region corresponding to an opening of the reflector 53 and is located in a layer above the reflector 53 with the insulating resin layer 37 interposed between them from the viewpoint of the layer structure.

The liquid crystal display panel is sandwiched by a pair of circular polarizers each of which is constituted by a polarizer and a ¼ wave plate. The optical axes of the polarizers are orthogonal to each other. An optical path control film is applied to the polarizer located on a viewer's side. A backlight is provided on a back side of the liquid crystal display panel.

Liquid crystal molecules are aligned perpendicularly to surfaces of the substrates when no voltage is applied. First, when external light enters, the light is reflected by the reflector 53 in the reflective area R. Since the circular polarizers are provided, the reflected light is absorbed by the polarizers. Black is thus displayed. Light which has entered from the backlight passes through the transmissive area T in which the reflector 53 is not formed. Light which has passed through the circular polarizer on the back side of the liquid crystal display panel is transmitted without undergoing any change in its state of polarization because the liquid crystal is vertically aligned. The transmitted light is absorbed by the circular polarizer on the viewer's side. Black is thus displayed.

When a voltage is applied, since liquid crystal molecules are tilted, the liquid crystal layer exhibits birefringence which is an optical effect, thereby causing a change in the state of polarization of light. The state of polarization of incident external light thus changes, and reflected light passes through the circular polarizer on the viewer's side. Gray or white is thus displayed. Similarly, light which has entered from the backlight also undergoes a change in its state of polarization and passes through the circular polarizer on the viewer's side. Gray or white is thus displayed.

States of alignment of the liquid crystal and gradations of display in the reflective area R and the transmissive area T will now be described. Since the pixel electrode 16 is formed in the transmissive area T, liquid crystal molecules in the region a in FIG. 33A are driven based on a voltage applied between the pixel electrode 16 and the common electrode 42. Therefore, the transparent area T exhibits voltage/gradation characteristics similar to those of configurations according to the related art. Consideration is needed for the reflective area R. Liquid crystal molecules in the region β in FIG. 33A are driven only by the pixel electrode 16 in the transmissive area T. The pixel electrode 16 is formed only in a part of the peripheral section of the reflective area R. In the reflective area R, liquid crystal molecules are therefore driven by an oblique electric field generated at the peripheral section of the pixel electrode 16. In the reflective area R, a gradation is thus represented only by the tilt of liquid crystal molecules caused by the oblique electric field. As a result, an effective voltage applied to the liquid crystal layer in the entire reflective area R is lower than that in the transmissive area T. It is therefore possible to reduce a difference in display of a gradation between the reflective area R where light passes through the liquid crystal layer twice and the transmissive area T where light passes through only once.

When a CF layer is provided under the reflector 53 on the TFT substrate 2, the CF layer exerts its effect only on the transmissive area T. Such a configuration eliminates a need for a step for providing the opening on the CF layer 40 provided on the opposite substrate 4 in the reflective area R.

Further, when a CF layer optimized for display in the reflective mode is provided above the reflector 53 or on the opposite substrate 4, since no step will be formed in the pixel region as a result of the removal of a part of the CF layer 40, color filter conditions in each of the reflective area R and the transmissive area T can be optimized.

Light diffusing properties in the reflective area R can be improved by providing a hole in the CF layer provided under the reflector 53. Further, a film for scattering light entering in a predetermined direction (a light scattering layer) may be provided on the viewer's side of the opposite substrate 4.

In the present mode for carrying out the invention, there is no need for making a cell thickness in the reflective area R smaller than a cell thickness in the transmissive area T. The cell thickness in the reflective area R is substantially equal to or greater than the cell thickness in the transmissive area T.

Liquid crystal displays in the present mode for carrying out the invention will now be specifically described with reference to preferred embodiments.

Embodiment 3-1

First, a liquid crystal display according to Embodiment 3-1 will be described with reference to FIGS. 32, 33A and 33B. The pitch of pixels of the liquid crystal display of the present embodiment is 300 µm in the longitudinal direction (a direction in which drain bus lines 14 extend; this holds true in the following description) and 100 µm in the transverse direction (a direction in which gate bus lines 12 extend; this holds true in the following description). The drain bus lines 14 and the gate bus lines 12 both having a width of 7 µm are formed on the TFT substrate 2. The drain bus lines 14 and the gate bus lines 12 intersect each other with an insulation film 30 interposed between them. The insulation film 30 is constituted by a thin film layer mainly composed of $SiO_2$. TFTs 20 are formed in the vicinity of positions where the drain bus lines 14 and the gate bus lines 12 intersect each other. A source electrode 22 of a TFT 20 extends up to an opening section of the relevant pixel, the electrode being constituted by the same layer as the drain bus lines 14. In the middle of the pixel, a storage capacitor is formed by a storage capacitor bus line 18 extending in parallel with the gate bus lines 12 and a storage capacitor electrode 19 which is formed at each pixel.

A first insulating resin layer 36 having a thickness of about 2 µm and a relative dielectric constant of about 3.5 is formed on the TFT substrate 2 on which the TFTs 20, drain bus lines 14 and the gate bus lines 12 have been formed as described above. The insulating resin layer 36 is formed of a resin having a high degree of transparency such as an acrylic resin. Contact holes 34 for exposing pad sections of the source electrodes 22 are formed in the insulating resin layer 36. The size of the contact holes 34 is 10×10 µm².

Reflectors 53 are formed on the insulating resin layer 36. The reflectors 53 are formed by sputtering an Al thin film on the entire top surface of the insulating resin layer 36 and sputtering the Al thin film using photolithography such that the film is left in a region extending into each pixel a distance of 7 µm from an edge of each of the bus lines 12 and 14. Connecting electrodes 53' connected to the source electrodes 22 through the contact holes 34 may be formed at the same time when the reflectors 53 are formed.

A second insulating resin layer 37 having a thickness of about 2.5 µm and a relative dielectric constant of about 3.5 is formed throughout the substrate over the reflectors 53. The insulating resin layer 37 is formed of a resin having a high degree of transparency such as an acrylic resin similarly to the insulating resin layer 36. Contact holes 34 of 10×10 µm² similar to those in the insulating resin layer 36 are formed in the insulating resin layer 37 for exposing the pad sections of the source electrodes 22.

Pixel electrodes 16 are formed on the insulating resin layer 37. The pixel electrodes 16 are provided by sputtering an ITO on the entire top surface of the insulating resin layer 37 to form a transparent conductive film thereon and by patterning the transparent conductive film using photolithography. The pixel electrodes 16 are formed at openings of the reflectors 53 and are patterned such that they are aligned with the positions of edges of the reflectors 53. The pixel electrodes 16 and the reflectors 53 are electrically independent of each other. The pixel electrodes 16 are electrically connected to the source electrodes 22 through the contact holes 34.

The pixel electrode 16 in one pixel is configured by combining a plurality of electrode units 17 which are electrically connected to each other. The pixel electrode 16 shown in FIG. 32 is constituted by six electrode units 17 which are arranged in the longitudinal direction of a pixel region, for example. The size of each electrode unit 17 is 35×78 µm², and slits between adjoining electrode units 17 have a width of 8 µm. A reflector 53 may be formed on the slits in addition to the peripheral section of the pixel region.

An electrode unit 17 has a solid electrode 17a provided in the middle thereof and comb-shaped electrodes 17b extending from the periphery of the solid electrode 17a toward the periphery of the electrode unit 17. The solid electrode 17a is in the form of a rectangle of 25×60 µm². The comb-shaped electrodes 17b include an electrode 17c (hereinafter referred to as "backbone electrode") having a width of 5 µm and a length of 15 µm which extends from the center of each side of the circumference of the solid electrode 17a toward the periphery of the electrode unit 17, the electrode 17c being substantially perpendicular to the respective side of the solid electrode. The region except the solid electrode 17a is thus divided into four alignment regions at the backbone electrodes 17c which constitute boundaries. Linear electrodes 17d starting at the periphery of the solid electrode 17a and terminating at the periphery of the electrode unit 17 are formed in each of the alignment regions, the electrodes extending in a different direction in each of the alignment regions. Specifically, the linear electrodes 17d in each alignment region are in parallel with each other, and the linear electrodes 17d diagonally extend in directions from a central section of the electrode unit 17 toward the respective vertices of the circumference of the electrode unit 17. The linear electrodes 17d have a width of 3 µm, and slits between adjoining linear electrodes 17d have a width of 3 µm. The ends of the comb-shaped electrodes 17b at the periphery of the electrode unit 17 are formed as if they were cut in compliance with the sides of the circumference of the electrode unit 17. The comb-shaped electrodes 17b partially overlap the reflector 53 when viewed perpendicularly to the substrate surface, and some of the ends of the comb-shaped electrodes 17b are located outside the edge of the opening of the reflector 53.

The electrode units 17 in one pixel must be electrically connected to each other. Connecting electrodes 15 for this purpose are formed by extending each backbone electrode 17c facing another electrode unit 17 across a slit among the backbone electrodes 17c extending from the solid electrode 17a. That is, the connecting electrodes 15 are connected to central sections of the sides of the circumference of the electrode units 17 which are located adjacent to other electrode units 17 with slits interposed therebetween. In the present embodiment, since there is only one electrode unit 17 in the transverse direction of the pixel region, the connecting electrodes 15 are provided only in the longitudinal direction.

No black matrix is provided on the opposite substrate 4. The reflectors 53 provided on the TFT substrate 2 are used as a substitute for a black matrix in transmissive areas T. CF layers 40 in red, green and blue (which are not shown in FIGS. 33A and 33B) are formed on the opposite substrate 4. A CF layer 40 is provided only in a transmissive area T. i.e., the opening of a reflective area R and is not provided in a reflective area R. A transparent resin layer 57 (not shown) having a thickness substantially equal to or smaller than the thickness of the CF layer 40 is formed in a reflective area R. A common electrode 42 constituted by an ITO is formed on the entire surfaces of the CF layer 40 and the transparent resin layer 57. Alignment controlling protrusions 44 having a diameter of 10 μm and a thickness of 2 μm made of an acrylic resin are formed in regions on the common electrode 42 corresponding to central sections of the electrode units 17 on the TFT substrate 2. The provision of the alignment controlling protrusions 44 makes singular points S=+1 formed at the central sections of the electrode units 17 on the TFT substrate 2 stronger.

Alignment films are formed on the top surfaces of the substrates 2 and 4. The alignment films have vertically aligning properties and align liquid crystal molecules in a direction vertical to the substrate surfaces (alignment film surfaces) in a normal state. The liquid crystal display in the present mode for carrying out the invention is fabricated by injecting and sealing a liquid crystal 6 having negative dielectric constant anisotropy in a cell that is provided by combining the above-described TFT substrate 2 and opposite substrate 4.

When the liquid crystal display in the present embodiment is driven normally, alignment division will be achieved as described below. In the regions where the comb-shaped electrodes 17b are provided, liquid crystal molecules are aligned in directions in which slits formed by the comb-shaped electrodes 17b extend. The remaining regions or the regions where the solid electrodes 17a are formed, the liquid crystal is aligned toward the centers of the electrode units 17 because of oblique electric fields at the peripheries of the solid electrodes 17a or liquid crystal orientation exerted from the outside by the comb-shaped electrodes 17b. Thus, alignment division in four general directions can be achieved.

Embodiment 3-2

Figure 34:
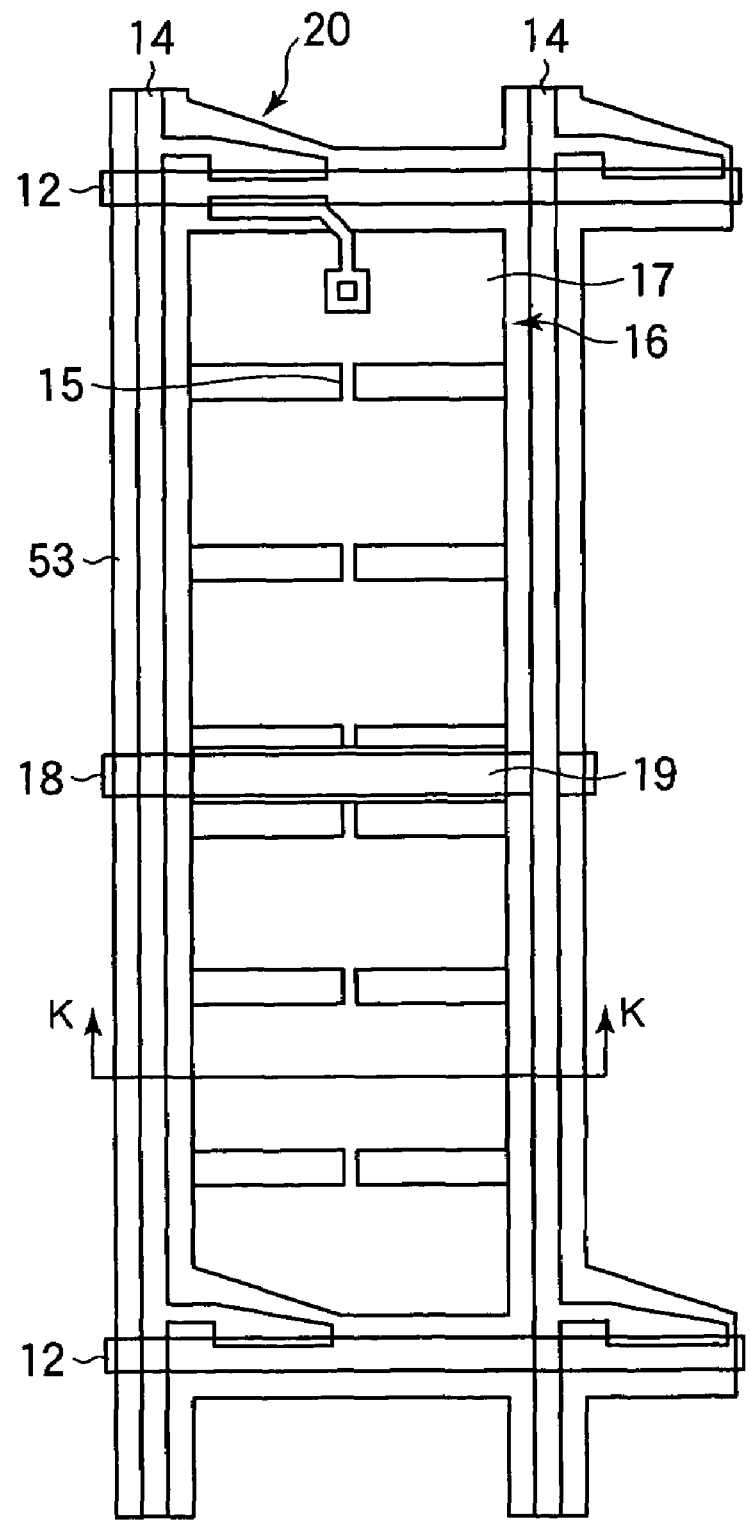
FIG. 34 shows a configuration of a liquid crystal display according to Embodiment 3-2 in the third mode for carrying out the invention.
Figure 35:
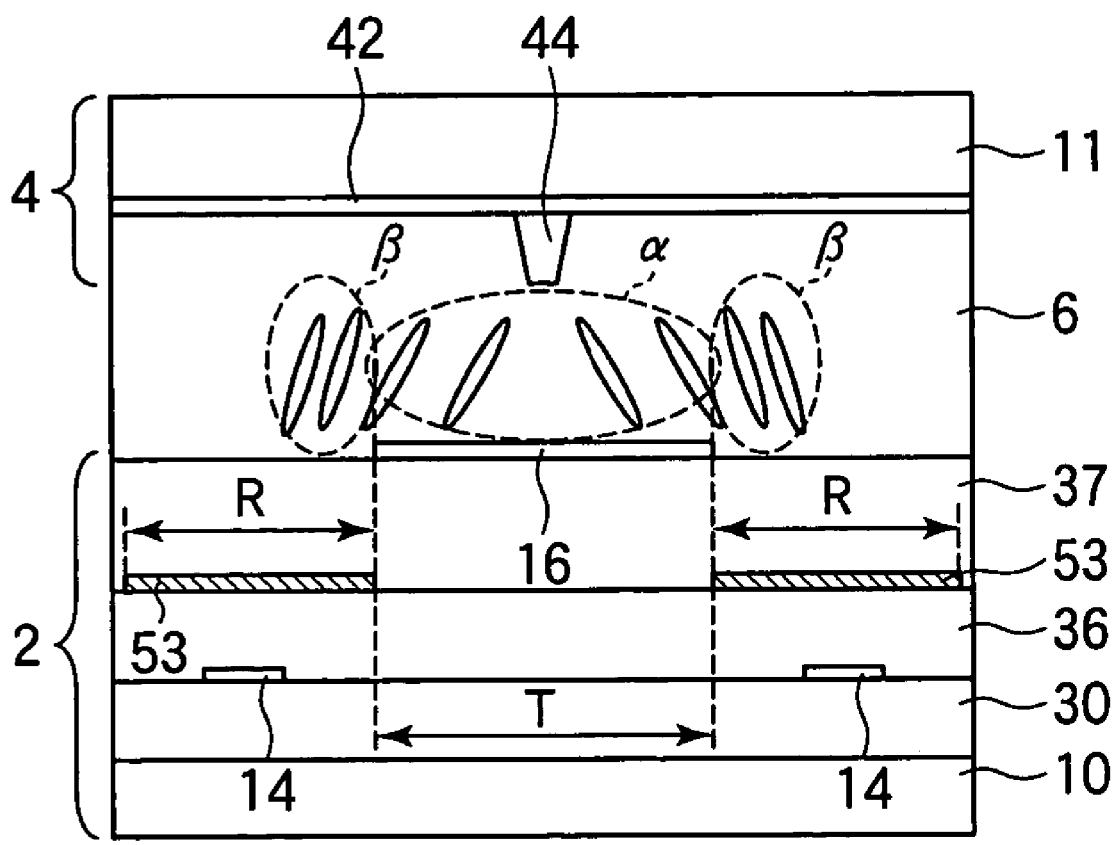
FIG. 35 is a sectional view showing the configuration of the liquid crystal display according to Embodiment 3-2 in the third mode for carrying out the invention.

A liquid crystal display according to Embodiment 3-2 in the present mode for carrying out the invention will now be described. FIG. 34 shows a configuration of a pixel on a TFT substrate of the liquid crystal display of the present embodiment. FIG. 35 shows a sectional configuration of the liquid crystal display taken along the line K-K in FIG. 34. As shown in FIGS. 34 and 35, the liquid crystal display of the present embodiment is characterized in that there is no (or substantially no) region where a pixel electrode 16 and a reflector 53 overlap each other, and the edge of an opening in a reflector 53 and the edge of a pixel electrode 16 are substantially aligned with each other when viewed vertically to the surface of the substrate, unlike Embodiment 3-1. The edge of the pixel electrode 16 may be located inside the edge of the opening in the reflector 53. The liquid crystal display of the present embodiment is characterized in that an electrode unit 17 is constituted only by a solid electrode 17a and is formed with no comb-shaped electrode 17b.

In the liquid crystal display of the present embodiment, since liquid crystal molecules in a reflective area R are driven by an oblique electric field at the edge of the pixel electrode 16, an effective voltage applied to a liquid crystal 6 during driving can be made smaller than that applied to a transmissive area T. As a result, a voltage that is optimal for display in the reflective mode can be applied to the liquid crystal 6 in the reflective area R, which makes it possible to achieve preferable display in the reflective mode.

Embodiment 3-3

Figure 36:
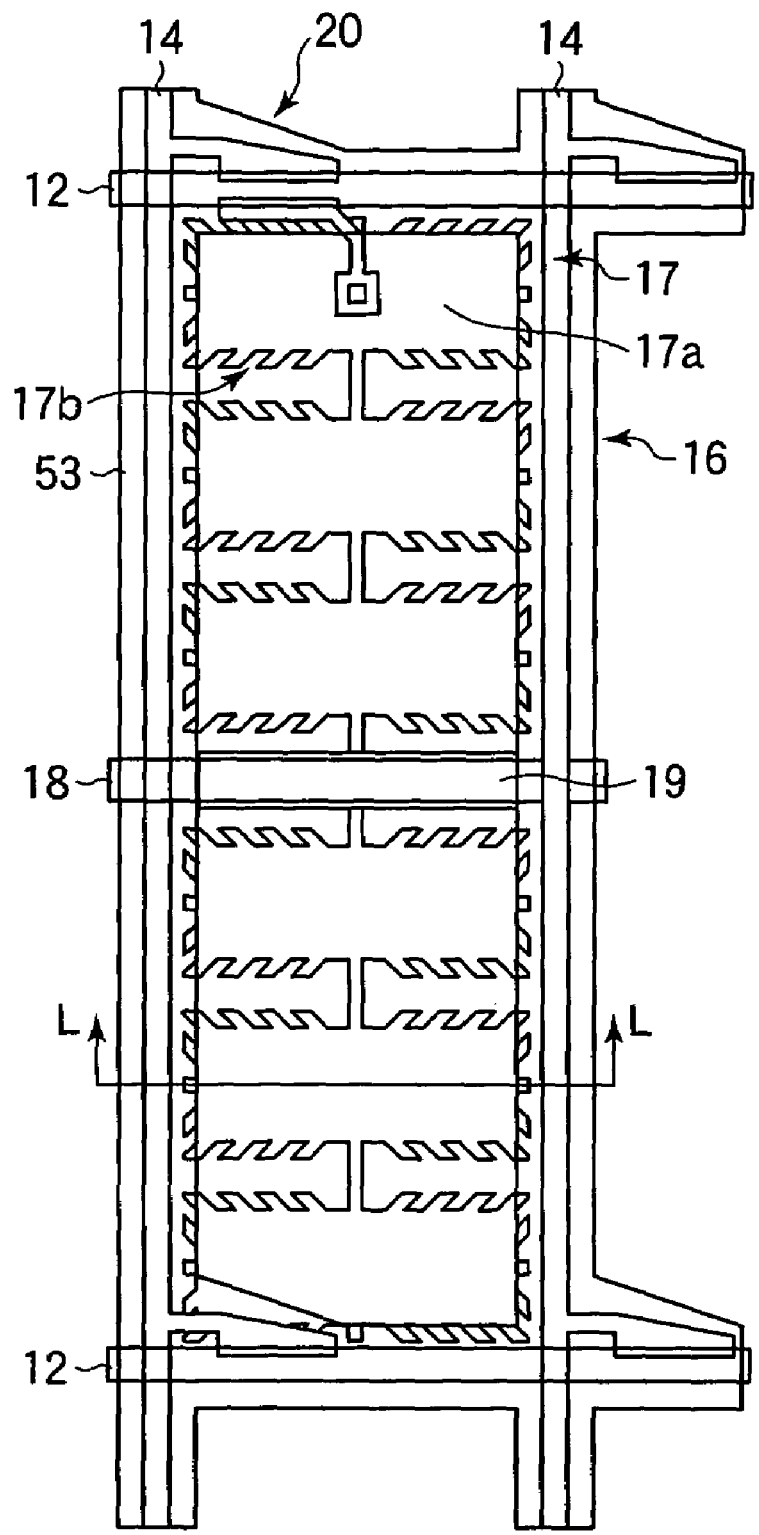
FIG. 36 shows a configuration of a liquid crystal display according to Embodiment 3-3 in the third mode for carrying out the invention.
Figure 37:
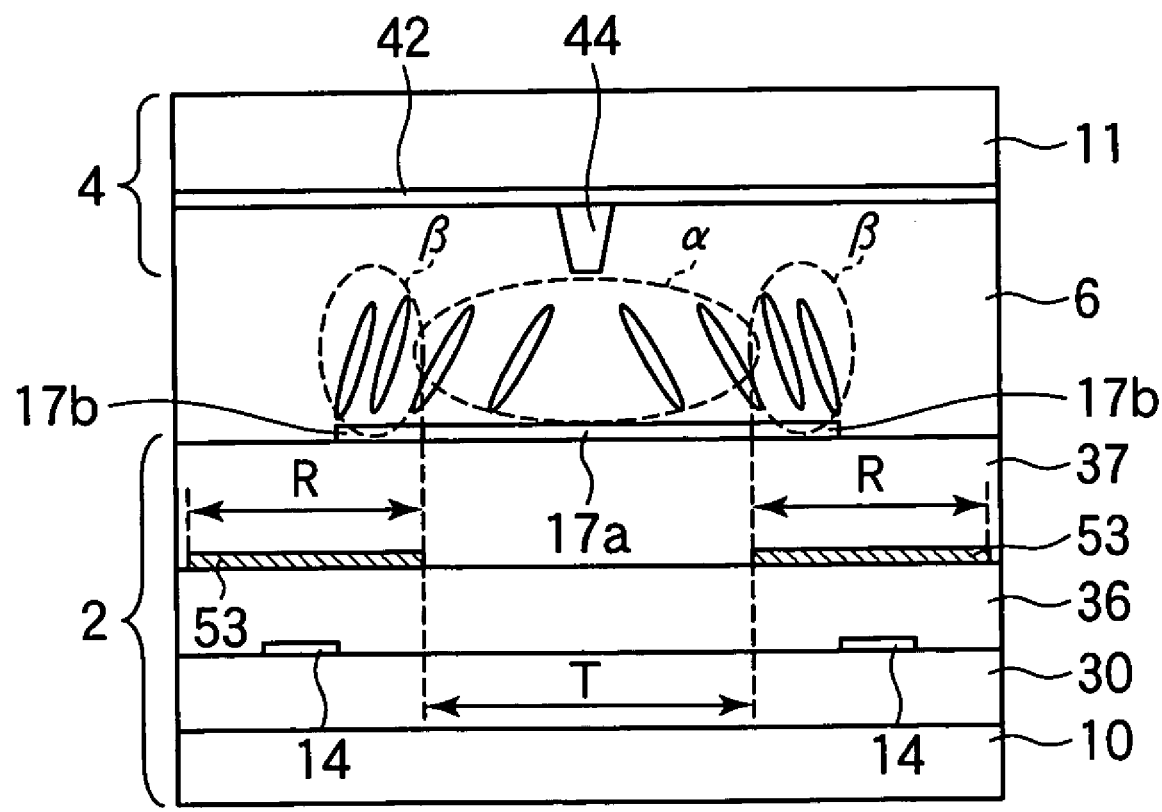
FIG. 37 is a sectional view showing the configuration of the liquid crystal display according to Embodiment 3-3 in the third mode for carrying out the invention.

A liquid crystal display according to Embodiment 3-3 in the present mode for carrying out the invention will now be described. FIG. 36 shows a configuration of a pixel on a TFT substrate of the liquid crystal display of the present embodiment. FIG. 37 shows a sectional configuration of the liquid crystal display taken along the line L-L in FIG. 36. As shown in FIGS. 36 and 37, in the present embodiment, only a solid electrode 17a of an electrode unit 17 is formed in a transmissive area T, and only comb-shaped electrodes 17b of an electrode unit 17 are formed in a reflective area R.

In the liquid crystal display of the present embodiment, since liquid crystal molecules in a reflective area R are driven by comb-shaped electrodes 17b, an effective voltage applied to a liquid crystal 6 during driving can be made smaller than that applied to a transmissive area T. As a result, a voltage that is optimal for display in the reflective mode can be applied to the liquid crystal 6 in the reflective area R, which makes it possible to achieve preferable display in the reflective mode.

A solid electrode 17a and comb-shaped electrodes 17b may be formed in a transmissive area T, and comb-shaped electrodes 17b including linear electrodes 17d in a quantity smaller than that in the transmissive area T may be formed in a reflective area R. Alternatively, each of gaps between adjoining comb-shaped electrodes 17b in the reflective area R (the gaps between adjoining linear electrodes 17d) may be made greater than each of gaps between adjoining comb-shaped electrodes 17b in the transmissive area T.

While electrode units 17 having a solid electrode 17a and comb-shaped electrodes 17b have been referred to as examples in Embodiments 3-1 to 3-3, electrode units 17 having no solid electrode 17a may be used. Such an electrode unit 17 has comb-shaped electrodes 17b including a plurality of linear electrodes 17d extending from a central section of the electrode unit 17 toward the periphery of the electrode unit 17. In this case again, the number of linear electrodes 17d in a reflective area R may be smaller than the number of linear electrodes 17d in a transmissive area T. Alternatively, each of gaps between adjoining comb-shaped electrodes 17b in the reflective area R may be made greater than each of gaps between adjoining comb-shaped electrodes 17b in the transmissive area T.

Configurations of CF layers of a liquid crystal display in the present mode for carrying out the invention will now be described. FIGS. 38A to 39C show examples of configurations of CF layers of a liquid crystal display in the present mode for carrying out the invention.

Figure 38A:
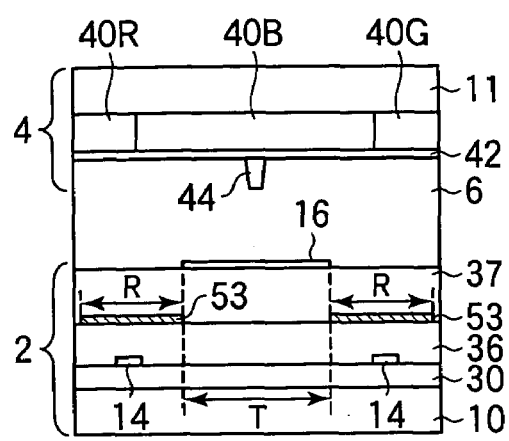
FIGS. 38A to 38D show examples of configurations of CF layers of a liquid crystal display in the third mode for carrying out the invention.

FIG. 38A shows a first example of a configuration of CF layers. As shown in FIG. 38A, CF layers 40R, 40G and 40B are formed only on an opposite substrate 4. In the present example, an insulating resin layer 36 is formed on a drain bus line 14 on a TFT substrate 2, and an Al thin film is formed and patterned on the insulating resin layer 36 to form a reflector 53. An insulating resin layer 37 is then formed on the reflector 53, and a pixel electrode 16 is formed on the insulating resin layer 37. In this configuration, coloring in a transmissive area T and a reflective area R is performed using the CF layers 40R, 40G and 40B which constitute a single layer. When coloring in the transmissive area T is properly performed, over-coloring may occur in the reflective area R where light passes through the CF layers 40R, 40G and 40B twice.

Figure 38B:
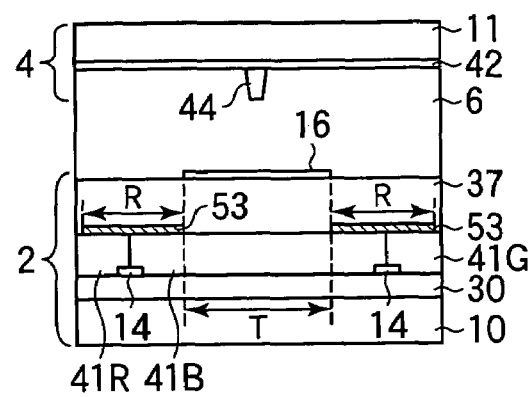

FIG. 38B shows a second example of a configuration of CF layers. As shown in FIG. 38B, in the present example, CF layers 41R, 41G and 41B are provided on a drain bus line 14 on a TFT substrate 2. When the CF layers 41R, 41G and 41B in different colors are formed in adjoining pixels, the layers may be overlapped with some overlapping width. The reason is that a reflector 53 is provided on a viewer's side of the CF layers 41R, 41G and 41B, and the overlaps between the CF layers 41R, 41G and 41B are therefore invisible during display in both of the transmissive and reflective modes. After the CF layers 41R, 41G and 41B are formed, the reflector 53 which is constituted by an Al thin film is formed on the gate bus line 12 and the drain bus line 14. An insulating resin layer 37 made of a transparent resin is provided on the reflector 53, and a pixel electrode 16 constituted by an ITO is provided on the insulating resin layer 37. In the present example, since the reflector 53 is formed on the viewer's side of the CF layers 41R, 41G and 41B, a configuration is achieved in which the CF layers 41R, 41G and 41B are present only in a transmissive area T and in which substantially none of the CF layers 41R, 41G and 41B is present in a reflective area R. Although this allows proper coloring for display in the transmissive mode, color purity may be reduced for display in the reflective mode.

Figure 38C:
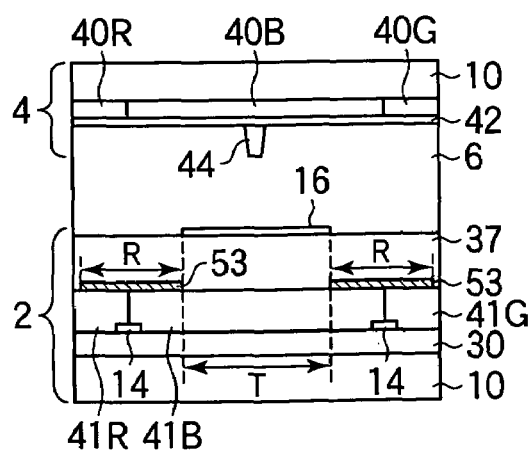

FIG. 38C shows a third example of a configuration of CF layers. As shown in FIG. 38C, in the present example, CF layers 40R, 40G and 40B are provided on an opposite substrate 4, and CF layers 41R, 41G and 41B are provided on a TFT substrate 2. The configuration of the TFT substrate 2 is similar to that in the second example, and the configuration of the opposite substrate 4 is similar to that in the first example. In a transmissive area T, coloring is performed by both of the CF layers 41R, 41G and 41B on the TFT substrate 2 and the CF layers 40R, 40G and 40B on the opposite substrate 4. In a reflective area R, coloring is performed only by the CF layers 40R, 40G and 40G on the opposite substrate 4. That is, color characteristics suitable for both of the transmissive area T and the reflective area R can be achieved by adjusting the thickness of each of the CF layers 40R, 40G and 40B and the CF layers 41R, 41G and 41B.

Figure 38D:
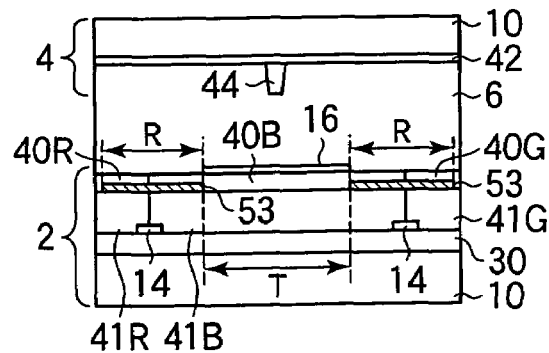

FIG. 38D shows a fourth example of a configuration of CF layers. As shown in 38D, in the present example, two layers comprising a set of CF layers 40R, 40G and 40B and a set of CF layers 41R, 41G and 41B, respectively, are formed on a TFT substrate 2. CF layers 40R, 40G and 40B having optical characteristics similar to those of the CF layers 40R, 40G and 40B in the third example are provided above a reflector 54 on the TFT substrate 2, which eliminates a need for forming CF layers on an opposite substrate 4. What is needed to be provided on the opposite substrate 4 is only a common electrode 42 (along with an alignment controlling protrusion 44).

Figure 39A:
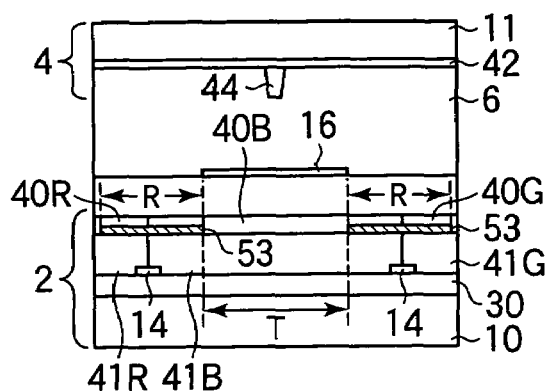
FIGS. 39A to 39C show examples of configurations of CF layers of a liquid crystal display in the third mode for carrying out the invention.

FIG. 39A shows a fifth example of a configuration of CF layers. As shown in FIG. 39A, in the present example, an insulating resin layer 37 is formed on CF layers 40R, 40G and 40B on a TFT substrate 2. As a result, since the CF layers will not-be exposed on the surface of the TFT substrate 2, contamination of a liquid crystal layer 6 can be prevented. In this case, however, it is required to form three resin layers including two sets of CF layers on the TFT substrate 2.

Figure 39B:
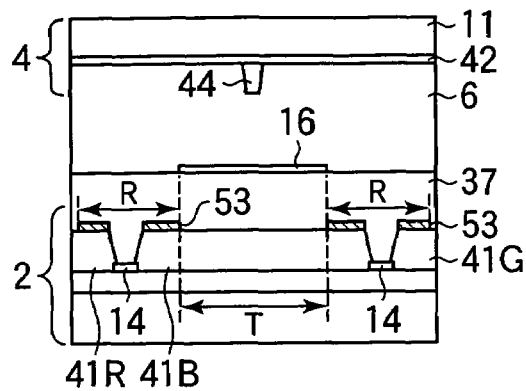

FIG. 39B shows a sixth example of a configuration of CF layers. While a reflector 53 is formed such that it is continuous between adjoining pixels in the first through fifth examples, a reflector 53 is split to serve each pixel in this example as shown in FIG. 39B.

Figure 39C:
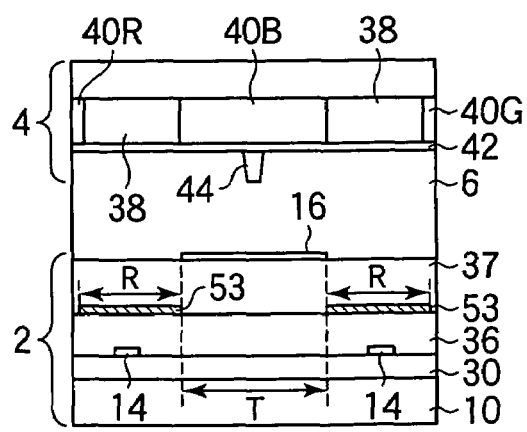

FIG. 39C shows a seventh example of a configuration of CF layers. As shown in FIG. 39C, the present example is a modification of the first example, in which CF layers 40R, 40G and 40B on an opposite substrate 4 are formed only in a transmissive area T. In a reflective area R where no CF layer is formed, a transparent resin layer 38 having a thickness substantially equal to or smaller than that of the CF layers 40R, 40G and 40B is formed. Although this results in a reduction of color purity just as in the second example during display in the reflective mode, luminance of reflection is conversely increased.

As described above, in the present mode for carrying out the invention, each of a transmissive area T and a reflective area R can be made to properly work by providing them with different optical effects. This makes it possible to reduce a gradation difference between the transmissive area T and the reflective area R. It is therefore possible to provide a liquid crystal display which can achieve high display characteristics in both of the reflective and transmissive modes.

[Fourth Mode for Carrying Out the Invention]

A liquid crystal display in a fourth mode for carrying out the invention will now be described with reference to FIGS. 40 to 46C.

A transflective liquid crystal display performs reflective display utilizing external light in a bright environment and performs transmissive display utilizing light from a backlight in a dark environment to achieve display with high visibility in any environment.

Figure 40:
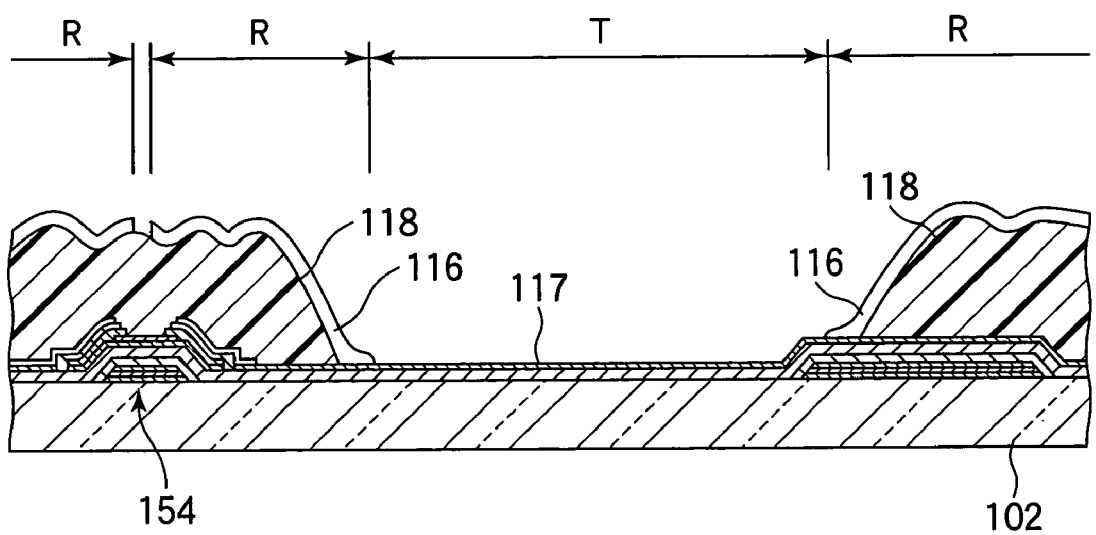
FIG. 40 is a sectional view showing a configuration of a transflective liquid crystal display according to the related art.

FIG. 40 shows a sectional configuration of a transflective liquid crystal display according to the related art which is disclosed in Patent Document 10. As shown in FIG. 40, in this liquid crystal display, a cell thickness in a reflective area R of a pixel region where a reflective electrode 116 is formed is smaller than a cell thickness in a transmissive area T where a pixel electrode 117 is formed. An aligning unit for imparting at least two different aligning directions to alignment at an interface of a liquid crystal layer is provided in a display area of at least either of a pair of substrates. In this configuration, since phase differences in the reflective area R and the transmissive area T can be matched to each other, display can be performed without color difference.

Figure 41:
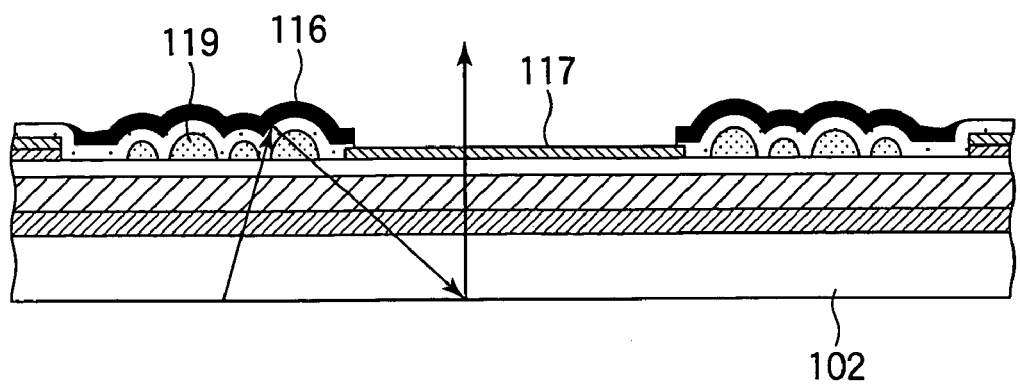
FIG. 41 is a sectional view showing a configuration of a transflective liquid crystal display according to the related art.

FIG. 41 shows a sectional configuration of a transflective liquid crystal display according to the related art which is disclosed in Patent Document 11. In this liquid crystal display, a pixel electrode 117 and a reflective electrode 116 are formed in a transmissive area T and a reflective area R, respectively, on one substrate. A top surface of the reflective electrode 116 is formed like a series of waves. In this configuration, since the reflective area R can be provided with light scattering power, high reflecting characteristics can be achieved.

However, the transflective liquid crystal display disclosed in Patent Document 11 necessitates additional processes of forming an organic insulation film 118 to make a cell thickness in the reflective area R smaller than a cell thickness in the transmissive area T and imparting at least two different aligning directions to alignment at an interface of a liquid crystal layer. Thus, steps for manufacturing a liquid crystal display become complicated.

The transflective liquid crystal display disclosed in Patent Document 11 also necessitates an additional process of forming protrusions 119 under the reflective electrode 116 in order to form a series of wavy irregularities on the surface of the reflective electrode 116. Further, since the irregularities of the reflective electrode 116 functions as conductive protrusions when a voltage is applied, when used in a vertical alignment type liquid crystal display in which the tilting direction of the liquid crystal is regulated using an alignment controlling structure or dielectric structure formed on an electrode, the tilting direction of the liquid crystal determined by the protrusion will be opposite to the tilting direction of the liquid crystal determined by an electric field, which will result in unstable alignment.

In the present mode for carrying out the invention, the above-described problems are solved, and a measure is taken to achieve a stable state of alignment with a simple process even in a vertical alignment type liquid crystal display.

Figure 42:
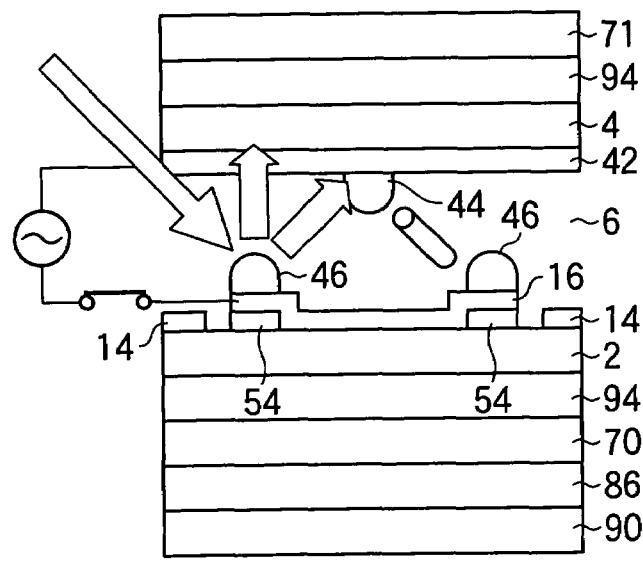
FIG. 42 shows a fundamental configuration of a liquid crystal display in a fourth mode for carrying out the invention.

FIG. 42 shows a first fundamental configuration of a liquid crystal display in the present mode for carrying out the invention. As shown in FIG. 42, a liquid crystal layer 6 is sandwiched between a pair of substrates 2 and 4. Liquid crystal molecules are vertically aligned when no voltage is applied and are aligned at an inclination when a voltage is applied because of distortion of an electric field attributable to alignment controlling structures 44 and 46 formed on electrodes 16 and 42. A reflector 54 having a smooth surface is formed in a part of a pixel region. An alignment controlling structure 46 having light scattering power is formed on the reflector 54.

More preferably, the reflector 54 is formed using a source (or drain) electrode layer or a gate electrode layer, and at least a pixel electrode 16 is formed between the reflector 54 and the alignment controlling structure 46. In addition, the alignment controlling structure 46 is formed like a frame in the pixel region, and a point-like alignment controlling structure 44 is formed in a region on the opposite substrate 4 corresponding to the interior of the frame.

Figure 43:
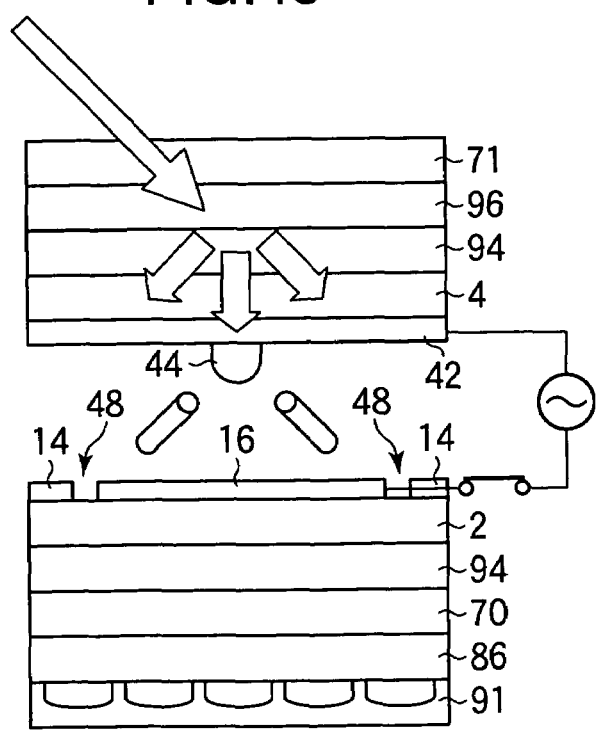
FIG. 43 shows a fundamental configuration of a liquid crystal display in the fourth mode for carrying out the invention.

FIG. 43 shows a second fundamental configuration of a liquid crystal display in the present mode for carrying out the invention. As shown in FIG. 43, liquid crystal molecules are vertically aligned when no voltage is applied and are aligned at an inclination when a voltage is applied because of distortion of an electric field attributable to an alignment controlling structure 44 and slits 48 formed on electrodes. A reflective sheet (reflective section) 91 having a parallax correcting function is provided behind a light guide plate 86. Irregularities on a surface of the reflective sheet 91 are formed at a pitch different from that of pixel patterns.

More preferably, the irregularities on the surface of the reflective sheet 91 have a sectional shape in the form of consecutive cones or wedges. A viewing angle control plate 96 for scattering light entering at a predetermined angle is provided between a substrate 4 and a polarizer 71. In the present mode for carrying out the invention, a liquid crystal panel is sandwiched by a pair of ¼ wave plates 94 and polarizers 70 and 71.

An alignment controlling structure 46 has a general sectional shape in the form of an arc. Therefore, a reflective area R includes a region where the cell thickness is equal to the cell thickness in a transmissive area T and a region where the cell thickness stepwise becomes smaller than the cell thickness in the transmissive area T. However, since a voltage applied to the liquid crystal in the reflective area R is attenuated by the alignment controlling structure 46, it is anticipated that the combination of such regions provides an effect substantially similar to that achievable with a small cell thickness in the reflective area R. Further, by providing the alignment controlling structure 46 with light scattering power, incident light can be scattered in the reflective area R to achieve reflective display with high luminance. Since the surface of the reflector 54 can therefore be flat, the reflector 54 can be formed using a source electrode layer or gate electrode layer. Therefore, processes for manufacturing a liquid crystal display can be simplified. When the pixel electrode (transparent electrode) 16 is formed between the reflector 54 and the alignment controlling structure 46, the reflective area R can be switched by the pixel electrode 16 without applying a voltage to the reflector 54. In addition, when the alignment regulating structure 46 is formed like a frame, a horizontal electric field generated between the bus lines 12 and 14 and between the TFT 20 and the pixel electrode 16 can be suppressed to stabilize alignment of the liquid crystal in the pixel region.

The alignment controlling structures 44 and 46 are aligning units for providing different aligning directions. In the configuration disclosed in Patent Document 10, an alignment regulating force is imparted to an interface of a liquid crystal layer using an interface aligning process such as rubbing. In the present mode for carrying out the invention, an alignment regulating force is applied to the entire liquid crystal layer including a bulk layer utilizing distortions of electric fields that occur in the vicinity of the alignment controlling structures 44 and 46 when a voltage is applied. Patent Document 10 discloses that the patent is characterized in that alignment of a liquid crystal in a reflective area R and alignment of the liquid crystal in a transmissive area T can be in different states at the same point in time. Therefore, the alignment controlling structures 44 and 46 in the present mode for carrying out the invention which allow different states of alignment in the reflective area R or transmissive area T are different from the aligning process disclosed in Patent document 10.

When the reflective sheet 91 having a parallax correcting function is provided under the light guide plate 86, reflective display can be performed without providing the reflector 54 in the liquid crystal display panel, and transmissive display can be achieved with high luminance because the utilization of pixel regions is maximized. Since light passes through the polarizers 70 and 71 four times during reflective display, luminance per unit area will be lower than that in a configuration in which the reflector 54 is provided in a liquid crystal display panel. However, luminance per pixel can be improved because the utilization of pixel regions can be maximized.

The reflective sheet 91 is provided with a parallax correcting function because parallax (a double image) occurs because of the reflective layer being apart from the liquid crystal layer. Any interference occurring between the reflective sheet 91 and the pixel pattern can be suppressed by making the irregularities on the surface of the reflective sheet 91 different from the pixel pattern. In addition, when the surface irregularities have a sectional shape in the form of consecutive cones, light entering in an oblique direction can be subjected to retroreflection. When the surface irregularities have a wedge-like sectional shape, light entering in an oblique direction can be obliquely reflected out of the field of view. Thus, the occurrence of parallax can be efficiently suppressed. By sandwiching the liquid crystal display panel with the pair of ¼ wave plates 94 and the polarizers 70 and 71, light which has entered the liquid crystal display panel can be subjected to circular polarization, which makes it possible to eliminate orientation-dependence of liquid crystal alignment and to achieve reflective display and transmissive display with high luminance.

Liquid crystal displays in the present mode carrying out the invention will now be specifically described with reference to preferred embodiments.

Embodiment 4-1

Figure 44:
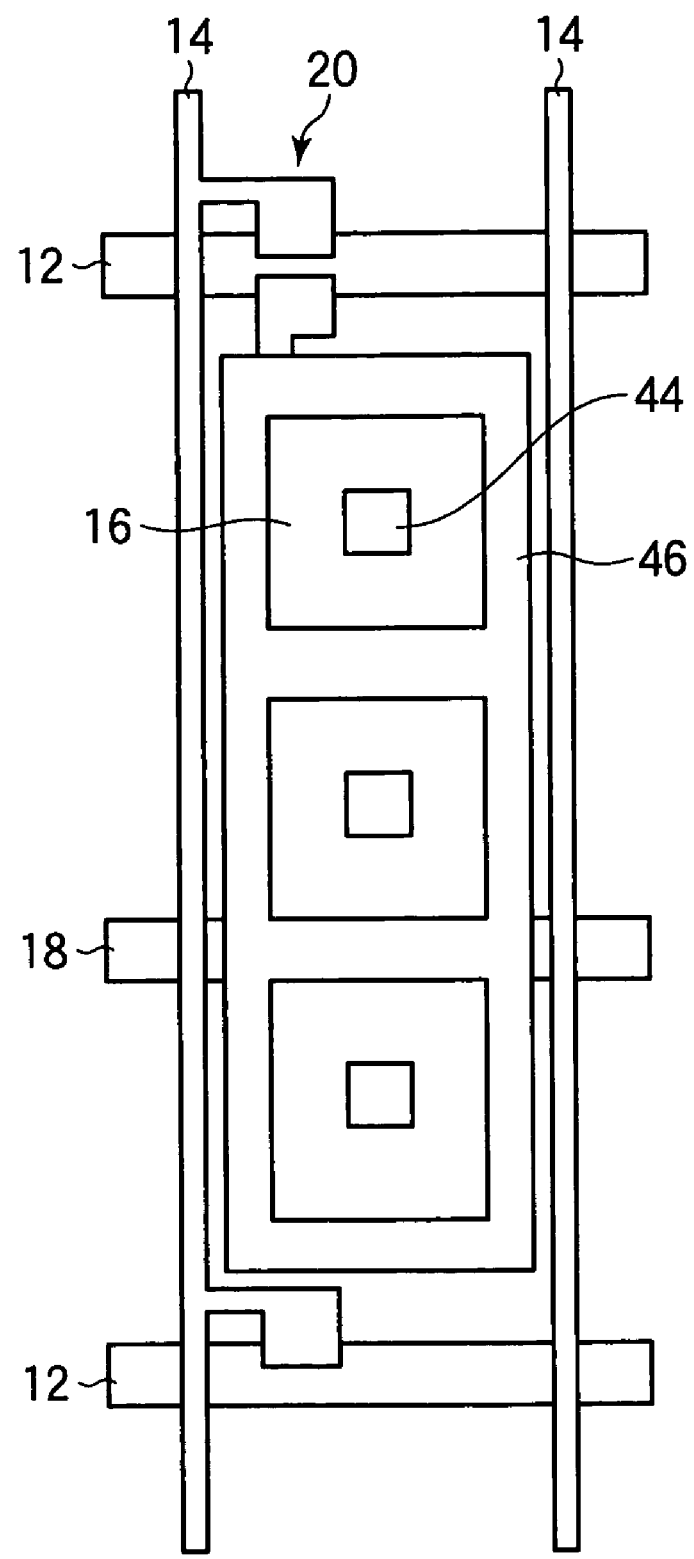
FIG. 44 shows a configuration of a liquid crystal display according to Embodiment 4-1 in the fourth mode for carrying out the invention.

First, a liquid crystal display according to Embodiment 4-1 in the present mode for carrying out the invention will be described. FIG. 44 shows a configuration of a pixel of the liquid crystal display of the present embodiment. As shown in FIG. 44, a reflector 54 (not shown in FIG. 44) in the form of a frame was formed in the pixel region using a gate electrode layer. A pixel electrode 16 made of transparent conducting layer is formed in the pixel region such that it overlaps the reflector 54 with a gate insulation film interposed between them. The reflector 54 is in an electrically floating state and is electrically insulated from a gate bus line 12 and a storage capacitor bus line 18. While the pixel electrode 16 is overlaid on the reflector 54 with the gate insulation film interposed between them, in order to improve reflectivity, the pixel electrode may be formed like slits, for example, so that it overlaps only a part of the reflector 54. An alignment controlling structure 46 in the form of a frame made of a white resin including alumina particles on a submicron order was formed in a region on the pixel electrode 16 associated with the reflector 54. An alignment controlling structure 46 in the form of a frame made of a transparent resin was fabricated for the purpose of comparison.

A common electrode 42 and a point-like alignment controlling structure 44 made of a transparent resin were formed on an opposite substrate 4. A pair of ¼ wave plates 94 and polarizers 70 and 71 were provided outside substrates 2 and 4 of the liquid crystal display panel, respectively. A light guide plate 86 and a reflective sheet 90 were provided under the polarizer 70 on the TFT substrate 2 to provide a transflective liquid crystal display. A comparison of gradation characteristics of the liquid crystal display during transmissive display and reflective display revealed no significant difference. This indicates the following fact. Even when a reflective area R includes a region where the cell thickness is substantially equal to the cell thickness in a transmissive area T and a region where the cell thickness stepwise becomes smaller than the cell thickness in the transmissive area T, if a voltage applied to the liquid crystal in the reflective area R is attenuated by the alignment controlling structure 46, it is anticipated that the combination of such regions provides an effect substantially similar to that achievable with a small cell thickness in the reflective area R.

When the alignment controlling structure 46 on the reflector 54 was formed of a transparent resin, reflective display had low luminance in directions other than the direction of regular reflection. On the contrary, when the alignment controlling structure 46 was formed of a white resin, reflective display could be performed with high luminance even in directions other than the direction of regular reflection. This indicates that reflected light is scattered by light scattering power of the alignment controlling structure 46.

Embodiment 4-2

Figure 45:
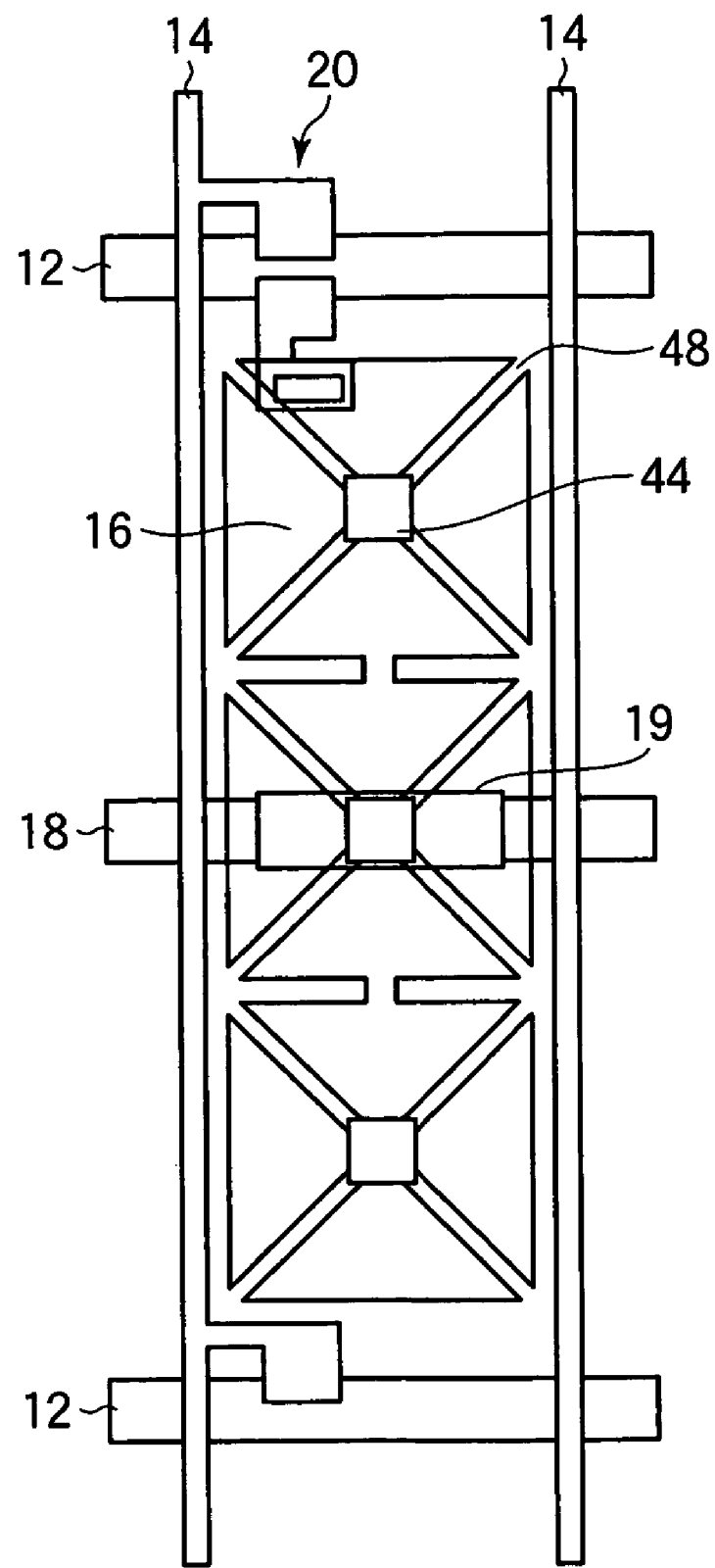
FIG. 45 shows a configuration of a liquid crystal display according to Embodiment 4-1 in the fourth mode for carrying out the invention.

A liquid crystal display according to Embodiment 4-2 in the present mode for carrying out the invention will now be described. FIG. 45 shows a configuration of a pixel of the liquid crystal display of the present embodiment. As shown in FIG. 45, in the present embodiment, a pixel electrode 16 having slits 48 for controlling alignment was formed in the pixel region without forming a reflector 54, in the pixel region. A common electrode 42 and a point-like alignment controlling structure 44 made of a transparent resin were formed on an opposite substrate 4. A pair of ¼ wave plates 94 and polarizers 70 and 71 were provided in the order listed outside substrates 2 and 4 of the liquid crystal display panel. A light guide plate 86 and three types of reflective sheets 91 to be described later were provided under the polarizer 70 on the TFT substrate 2. A viewing angle control plate 96 for scattering light entering in a certain direction was provided between the polarizer 71 and the ¼ wave plate 94 on the opposite substrate 4 to provide a transflective liquid crystal display. For comparison, a transflective liquid crystal display having no viewing angle control plate 96 and a transflective liquid crystal display having neither ¼ wave plate 94 nor viewing angle control plate 96 were fabricated.

Figure 46A:
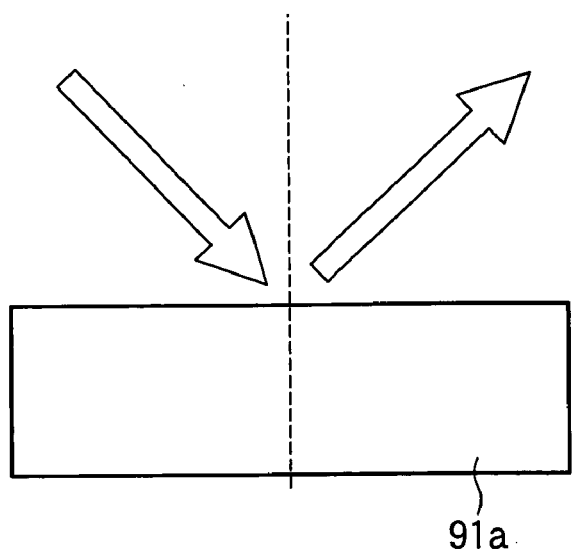
FIGS. 46A to 46C show sectional configurations of reflective sheets.
Figure 46B:
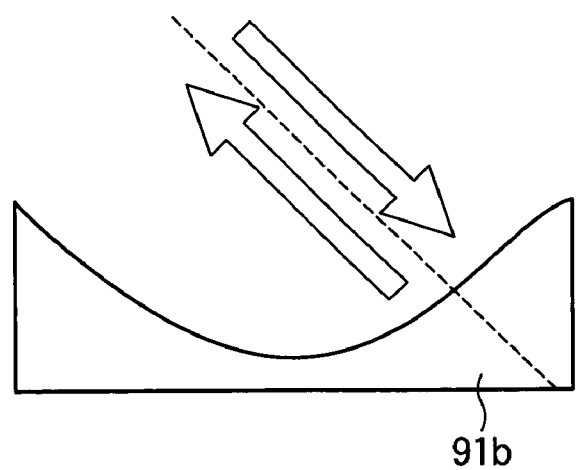
Figure 46C:
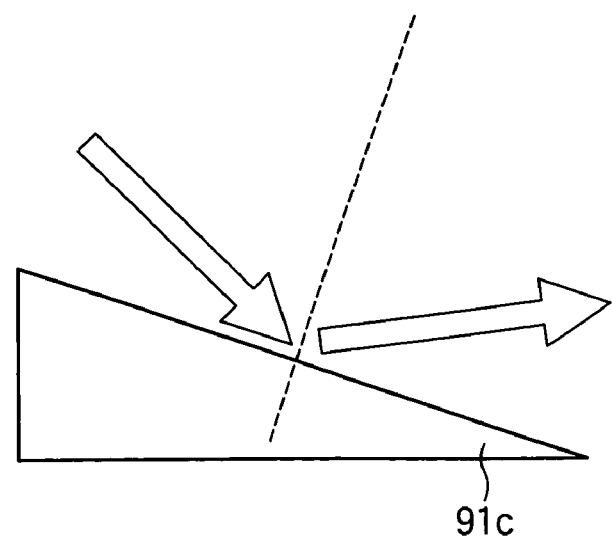

FIGS. 46A, 46B and 46C show sectional configurations of the three types of reflective sheets 91. A reflective sheet 91a shown in FIG. 46A has a smooth surface similarly to reflective sheets in the related art. A reflective sheet 91b shown in FIG. 46B has a continuous conical sectional shape and has a dimension equal to or smaller than a pixel pitch. A reflective sheet 91c shown in FIG. 46C has a continuous wedge-like sectional shape and has a dimension equal to or smaller than the pixel pitch.

Reflected light from the reflective sheet 91 that is in a position apart from the liquid crystal layer has substantially no perceivable parallax in a direction square to the display. In an oblique direction, however, a double image attributable to parallax occurs because of a great deviation of the reflecting position. In the case of the reflective sheet 91a, since incident light is subjected to regular reflection on the surface thereof, a double image occurs when viewed in an oblique direction. In the case of the reflective sheet 91b, however, since incident light is subjected to retroreflection, substantially no double image occurred. In the case of the reflective sheet 91c, since incident light was reflected out of the field of view of a viewer, substantially no double image occurred. While the reflective sheet 91b has a continuous conical sectional shape with a dimension equal to or smaller than the pixel pitch, it may have a plurality of corner cubes. The reflective sheet 91 may be formed of a retroreflective material.

Although no adjustment of a phase difference is performed between transmissive display and reflective display in the present embodiment, similar gradation characteristics are achieved in both modes of display without a phase difference adjustment because the reflective sheet 91 serving as a reflective layer is provided outside the polarizer 70 to achieve similar polarizing characteristics during reflective display and transmissive display. While reflective display had low luminance when no viewing angle control plate 96 was provided on the opposite substrate 4 and when neither ¼ wave plate 94 nor viewing angle control plate 96 was provided, reflective display could be performed with high luminance even in directions other than the direction of regular reflection when the viewing angle control plate 96 was provided on the opposite substrate 4. The luminance of reflective display was lowest when neither ¼ wave plate 94 nor viewing angle control plate 96 was provided.

The present mode for carrying out the invention makes it possible to manufacture a transflective liquid crystal display having display characteristics of both of reflective and transmissive types with simplified processes. It is therefore possible to provide a transflective liquid crystal display at a low cost.

The invention is not limited to the above-described modes for carrying out the same and may be modified in various ways.

For example, while liquid crystal displays having CF layers formed on an opposite substrate 4 have been described as examples in the first and second modes for carrying out the invention, the invention is not limited to them and may be applied to liquid crystal displays having a so-called CF-on-TFT structure in which CF layers are formed on a TFT substrate 2.

What is claimed is:

1. A liquid crystal display comprising:
   a pair of substrates provided opposite to each other;
   a liquid crystal layer sealed between the pair of substrates;
   a pixel region including a reflective area having a reflector for reflecting light entering from the side of one of the pair of substrates and a transmissive area for transmitting light entering from the side of the other of the pair of substrates toward the one of the pair of substrates; and
   a thin film transistor formed at each pixel region,
   wherein the reflector is formed of the same material as that of a gate electrode or drain electrode of the thin film transistor and has a multi-layer structure constituted by a first metal layer having a high reflectivity and a second metal layer having a lower reflectivity than that of the first metal layer,
   the second metal layer is formed above the first metal layer, and
   the reflector includes a reflective surface formed of the first metal layer exposed where the second metal layer is removed.

2. A liquid crystal display according to claim 1, wherein the reflective surface is covered by a transparent electrode.

3. A liquid crystal display according to claim 1, further comprising a color filter layer formed such that the transmittance of the reflective area becomes higher than the transmittance of the transmissive area.

4. A liquid crystal display according to claim 3, wherein the reflective area has a transparent layer formed under or above the color filter layer.

5. A liquid crystal display according to claim 3, wherein the color filter layer is removed completely or halfway in the thickness direction of the layer at least in a part of the reflective area.

6. A liquid crystal display according to claim 5, further comprising a transparent electrode which is formed so as to cover the color filter layer and which applies a voltage to the liquid crystal.

7. A liquid crystal display according to claim 6, wherein the reflective area further has a transparent dielectric layer which is formed under or above the color filter layer or between the same layer and the transparent electrode and which makes the thickness of the liquid crystal layer in a reflective section thereof smaller than that in a transmissive section.

8. A liquid crystal display according to claim 7, wherein the transparent dielectric layer is formed in a region where the color filter layer has been removed or formed so as to cover the region.

9. A liquid crystal display according to claim 1, further comprising a reflective section for reflecting light which has entered the transmissive area from the side of one of the pair of substrates and which has been transmitted by the same and for causing the light to enter the transmissive area again from the side of the other of the pair of substrates, wherein the color filter layer is formed only in the transmissive area in the pixel region.

10. A liquid crystal display according to claim 9, further comprising a backlight unit provided on the side of the other of the pair of substrates, wherein the backlight unit includes a light guide plate and the reflective section that is provided behind the light guide plate.

11. A liquid crystal display according to claim 1, further comprising a pattern for forming irregularities, formed of the same material as any of materials of which the thin film transistor is formed, wherein the reflector is formed on the pattern for forming irregularities and wherein at least a part of the surface of the reflector is inclined relative to a substrate surface.

12. A liquid crystal display according to claim 11, wherein the irregularity forming pattern for forming irregularities has a conductor layer formed of the same material as that of the gate electrode of the thin film transistor.

13. A liquid crystal display according to claim 11, wherein the pattern for forming irregularities has a semiconductor layer formed of the same material as that of an active semiconductor layer of the thin film transistor.

14. A liquid crystal display according to claim 11, wherein the pattern for forming irregularities has a dielectric layer formed of the same material as that of a channel protection film of the thin film transistor.

15. A liquid crystal display according to claim 11, wherein the pattern for forming irregularities is formed by patterning a part of a storage capacitor bus line or separated from the storage capacitor bus line.

16. A liquid crystal display according to claim 15, the width of the part of the storage capacitor bus line including the patterned section is greater than the width of other parts of the storage capacitor bus line.

17. A liquid crystal display comprising:
   a pair of substrates provided opposite to each other;
   a liquid crystal layer sealed between the pair of substrates;
   a pixel region including a reflective area having a reflector for reflecting light entering from the side of one of the pair of substrates and a transmissive area for transmitting light entering from the side of the other of the pair of substrates toward the one of the pair of substrates;
   a thin film transistor formed at each pixel region;
   a color filter layer formed such that the transmittance of the reflective area becomes higher than the transmittance of the transmissive area; and
   a transparent electrode which is formed so as to cover the color filter layer and which applies a voltage to the liquid crystal,
   wherein the reflector is formed of the same material as that of a gate electrode or drain electrode of the thin film transistor and includes a reflective surface formed of a metal having a high reflectivity,
   the color filter layer is removed completely or halfway in the thickness direction of the layer at least in a part of the reflective area, and
   the reflective area further has a transparent dielectric layer which is formed between the transparent electrode and the liquid crystal layer and which decreases an effective voltage applied to the liquid crystal layer.

* * * * *